(12) United States Patent
Machida

(10) Patent No.: US 10,663,733 B2
(45) Date of Patent: May 26, 2020

(54) DISPLAY APPARATUS

(71) Applicant: Sony Corporation, Tokyo (JP)

(72) Inventor: Akio Machida, Kanagawa (JP)

(73) Assignee: Sony Corporation, Tokyo (JP)

(*) Notice: Subject to any disclaimer, the term of this patent is extended or adjusted under 35 U.S.C. 154(b) by 154 days.

(21) Appl. No.: 15/892,653

(22) Filed: Feb. 9, 2018

(65) Prior Publication Data

US 2018/0172997 A1 Jun. 21, 2018

Related U.S. Application Data

(63) Continuation of application No. 15/321,158, filed as application No. PCT/JP2016/057151 on Mar. 8, 2016, now Pat. No. 9,989,769.

(30) Foreign Application Priority Data

Apr. 30, 2015 (JP) ................. 2015-092856

(51) Int. Cl.
*G02B 27/01* (2006.01)
*G02F 1/155* (2006.01)
(Continued)

(52) U.S. Cl.
CPC ....... *G02B 27/0172* (2013.01); *G02B 6/0033* (2013.01); *G02B 27/0176* (2013.01);
(Continued)

(58) Field of Classification Search
CPC .... G02B 6/0033; G02B 5/18; G02B 27/0172; G02B 27/0176; G02B 27/1086;
(Continued)

(56) References Cited

U.S. PATENT DOCUMENTS 4,896,945 A 1/1990 Ooba et al.
4,923,289 A * 5/1990 Demiryont ............ G02F 1/1523
359/265
(Continued)

FOREIGN PATENT DOCUMENTS

CN 102830490 A 12/2012
CN 204210279 U 3/2015
(Continued)

OTHER PUBLICATIONS

Extended European Search Report dated Jan. 24, 2018 in connection with European Application No. 16786205.1.
(Continued)

*Primary Examiner* — William R Alexander
(74) *Attorney, Agent, or Firm* — Wolf, Greenfield & Sacks, P.C.

(57) ABSTRACT

A display apparatus includes a frame mounted on an observer's head, an image display device attached to the frame and a dimming device 700, the image display device includes an image forming device and an optical device 120, 320 having a virtual image forming region 140, 340 where a virtual image is formed on the basis of light emitted from the image forming device, the optical device 120, 320 overlaps with a portion of the dimming device 700, at the time of operation of the dimming device 700, a light blocking ratio of the dimming device 700 is changed over a range of from an upper region 701U to a lower region 701D and/or over a range of from an inner region 701C to an outer region 701S, and a virtual image forming region facing region 701 has a light blocking ratio higher than the light blocking ratio of the lower region 701D or the outer region 701S.

12 Claims, 27 Drawing Sheets

(51) Int. Cl.

| | | |
|---|---|---|
| *G02F 1/157* | (2006.01) | |
| *G02B 27/02* | (2006.01) | |
| *H04N 5/64* | (2006.01) | |
| *F21V 8/00* | (2006.01) | |
| *G02B 27/10* | (2006.01) | |
| *G02F 1/163* | (2006.01) | |
| *G02F 1/1676* | (2019.01) | |
| *G02F 1/1514* | (2019.01) | |
| *G02B 5/18* | (2006.01) | |
| *G02B 26/10* | (2006.01) | |
| *G02F 1/133* | (2006.01) | |
| *G02F 1/15* | (2019.01) | |

(52) U.S. Cl.
CPC ......... *G02B 27/02* (2013.01); *G02B 27/1086* (2013.01); *G02F 1/155* (2013.01); *G02F 1/157* (2013.01); *G02F 1/163* (2013.01); *H04N 5/64* (2013.01); *G02B 5/18* (2013.01); *G02B 26/10* (2013.01); *G02B 27/01* (2013.01); *G02B 27/017* (2013.01); *G02B 2027/0174* (2013.01); *G02B 2027/0178* (2013.01); *G02F 1/13318* (2013.01); *G02F 1/15* (2013.01); *G02F 1/1676* (2019.01); *G02F 2001/15145* (2019.01); *G02F 2201/44* (2013.01)

(58) Field of Classification Search
CPC .................. G02B 27/01; G02B 27/017; G02B 2027/0174; G02B 2027/0178; G02F 1/155; G02F 1/157; G02F 1/163; G02F 1/15; G02F 1/13318
USPC ....................................................... 359/267
See application file for complete search history.

(56) References Cited

U.S. PATENT DOCUMENTS

| | | | |
|---|---|---|---|
| 5,764,407 | A | 6/1998 | Nanba |
| 8,629,831 | B2 | 1/2014 | Park et al. |
| 9,207,456 | B2 | 12/2015 | Hiraide et al. |
| 9,558,540 | B2 * | 1/2017 | Mukawa .............. G06K 9/6201 |
| 9,746,739 | B2 | 8/2017 | Alton et al. |
| 9,753,284 | B2 | 9/2017 | Machida et al. |
| 9,791,701 | B2 | 10/2017 | Ato et al. |
| 2012/0068913 | A1 | 3/2012 | Bar-Zeev et al. |
| 2012/0134543 | A1 | 5/2012 | Fedorovskaya et al. |
| 2012/0306940 | A1 | 12/2012 | Machida et al. |
| 2013/0242392 | A1 * | 9/2013 | Amirparviz ........ G02B 27/0172 359/485.05 |
| 2013/0300766 | A1 * | 11/2013 | Mukawa ............ G02B 27/0179 345/633 |
| 2014/0159995 | A1 * | 6/2014 | Adams ..................... G02C 5/16 345/8 |
| 2015/0077827 | A1 * | 3/2015 | Nguyen .................. G02F 1/155 359/265 |
| 2015/0355521 | A1 * | 12/2015 | Alton ..................... G02F 1/167 250/214 AL |
| 2017/0184857 | A1 | 6/2017 | Ato et al. |
| 2017/0199383 | A1 | 7/2017 | Machida |
| 2017/0315417 | A1 | 11/2017 | Alton et al. |

FOREIGN PATENT DOCUMENTS

| | | |
|---|---|---|
| EP | 2530510 A2 | 12/2012 |
| JP | 63-038921 A | 2/1988 |
| JP | 01-155319 A | 6/1989 |
| JP | 07-306377 A | 11/1995 |
| JP | 2005-138801 A | 6/2005 |
| JP | 2012-252091 A | 12/2012 |

OTHER PUBLICATIONS

International Preliminary Report on Patentability and English translation thereof dated Nov. 9, 2017 in connection with International Application No. PCT/JP2016/057151.
International Search Report and Written Opinion and English translation thereof dated May 17, 2016 in connection with International Application No. PCT/JP2016/057151.
Chinese Office Action dated Dec. 5, 2019 in connection with Chinese Application No. 201680001845.X and English translation thereof.
Japanese Office Action dated Dec. 24, 2019 in connection with Japanese Office Action No. 2016-565359 and English translation thereof.

* cited by examiner

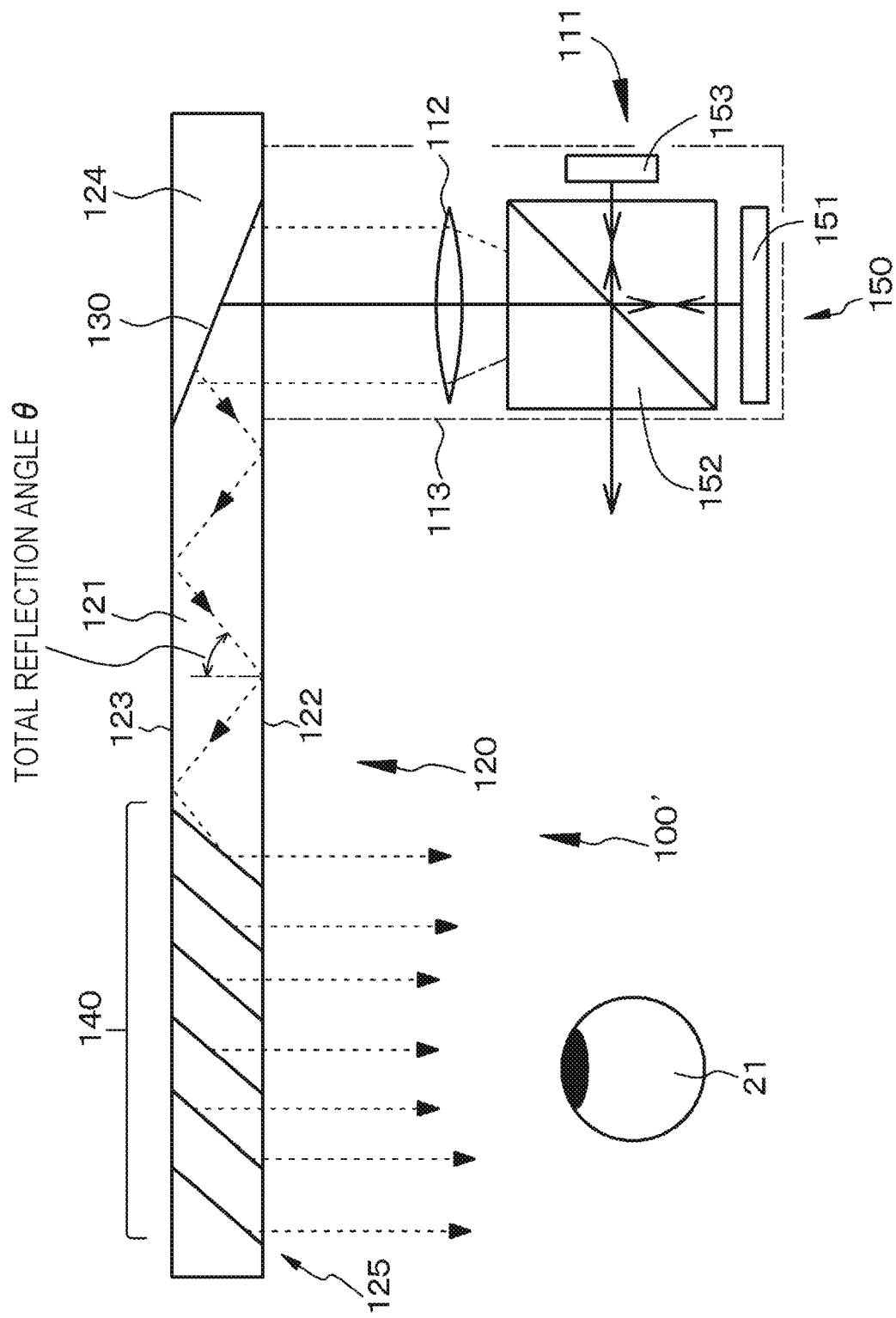

DISPLAY APPARATUS

CROSS REFERENCE TO RELATED APPLICATIONS

This application is a continuation of and claims the benefit under 35 U.S.C. § 120 of U.S. patent application Ser. No. 15/321,158, titled "DISPLAY APPARATUS," filed on Dec. 21, 2016, now U.S. Pat. No. 9,989,769, which claims the benefit under 35 U.S.C. § 371 as a U.S. National Stage Entry of International Application No. PCT/JP2016/057151, filed in the Japanese Patent Office as a Receiving Office on Mar. 8, 2016, which claims priority to Japanese Patent Application Number JP 2015-092856, filed in the Japanese Patent Office on Apr. 30, 2015, each of which is hereby incorporated by reference in its entirety.

TECHNICAL FIELD

The present disclosure relates to a display apparatus, and more particularly, to a display apparatus used for a head mounted display (HMD).

BACKGROUND ART

In recent years, augmented reality (AR) technology of synthesizing and presenting a virtual object as additional information or various types of information as electronic information to a real environment (or a portion thereof) has attracted much attention. In order to implement the augmented reality technology, as an apparatus presenting visual information, for example, a head mounted display has been studied. In addition, as an application field, work supporting in the real environment is expected. For example, providing of road guidance information, providing of technical information to technicians who perform maintenance or the like may be exemplified. Particularly, since there is no possibility that the hands are not blocked, the head mounted display is very convenient. In addition, even in case of intending to enjoy a video or an image while moving outdoors, since the video or image and an external environment can be simultaneously recognized within eyesight, smooth movement can be performed.

A virtual image display apparatus (display apparatus) for allowing a virtual image optical system to enable an observer to observe a two-dimensional image formed by an image forming device as an enlarged virtual image is well known from, for example, Japanese Patent Application Laid-Open No. 2006-162767.

As illustrated in a conceptual diagram of FIG. 26, the image display device 100' is configured to include an image forming device 111 having a plurality of pixels which are arrayed in a two-dimensional matrix shape, a collimating optical system 112 converting light emitted from the pixels of the image forming device 111 to parallel light, and an optical device 120 which light converted to the parallel light in the collimating optical system 112 is incident on and which guides and emits the light. The optical device 120 is configured to include a light guiding plate 121 which propagates the incident light through the inner portion thereof by total reflection and emits the light, a first deflecting unit 130 (configured with, for example, a single-layered light reflecting film) which reflects the light incident on the light guiding plate 121 so that the light incident on the light guiding plate 121 is totally reflected through the inner portion of the light guiding plate 121, and a second deflecting unit 140 (configured with, for example, a multi-layered light reflecting film having a multi-layer stacked structure) which emits the light propagating through the inner portion of the light guiding plate 121 by total reflection from the light guiding plate 121. In addition, for example, if an HMD is configured by using such an image display device 100', a light-weighted, small-sized apparatus can be implemented. In addition, with respect to reference numerals indicating other components in FIG. 26, the image display device of Example 1 described with reference to FIG. 5 is referred to.

Alternatively, a virtual image display apparatus (display apparatus) using a hologram diffraction grating for allowing a virtual image optical system to enable an observer to observe a two-dimensional image formed by an image forming device as an enlarged virtual image is well known from, for example, Japanese Patent Application Laid-Open No. 2007-094175.

As illustrated in a conceptual diagram of FIG. 27, the image display device 300' is basically configured to include an image forming device 111 displaying an image, a collimating optical system 112, and an optical device 320 which light displayed in the image forming device 111 is incident on and which guides the light to observer's pupils 21. Herein, the optical device 320 is configured to include a light guiding plate 321 and a first diffraction grating member 330 and a second diffraction grating member 340 which are configured with reflection type volume hologram diffraction gratings provided to the light guiding plate 321. In addition, light emitted from each pixel of the image forming device 111 is incident on the collimating optical system 112, and a plurality of parallel light beams having difference incident angles with respect to the light guiding plate 321 are generated by the collimating optical system 112 and are incident on the light guiding plate 321. The parallel light is incident from the first plane 322 of the light guiding plate 321 and is emitted. On the other hand, the first diffraction grating member 330 and the second diffraction grating member 340 are attached to the second plane 323 of the light guiding plate 321 which is parallel to the first plane 322 of the light guiding plate 321. In addition, with respect to reference numerals indicating other components in FIG. 27, the image display device of Example 5 described with reference to FIG. 16 is referred to.

In addition, a virtual image based on the image is formed in the image display device 100', 300', so that the observer can view an image of an outside world and the formed virtual image in an overlapped manner.

However, in the case of a peripheral environment where the image display device 100', 300' is located is very bright or according to a content of the formed virtual image, there is a problem in that sufficient contrast is not exhibited in the virtual image observed by the observer. In addition, means for solving the problems, that is, a virtual image display apparatus (display apparatus) having a dimming device are well known from, for example, Japanese Patent Application Laid-Open No. 2012-252091.

CITATION LIST

Patent Document
Patent Document 1: Japanese Patent Application Laid-Open No. 2006-162767
Patent Document 2: Japanese Patent Application Laid-Open No. 2007-094175
Patent Document 3: Japanese Patent Application Laid-Open No. 2012-252091

SUMMARY OF THE INVENTION

Problems to be Solved by the Invention

Herein, sometimes, a display apparatus is required to allow an observer using the display apparatus to safely act in a real environment while surely recognizing an external environment.

Therefore, the present disclosure is to provide a display apparatus having configurations and structures capable of exhibiting high contrast to a virtual image observed by an observer and allowing the observer using the display apparatus to safely act in a real environment while surely recognizing an external environment.

Solutions to Problems

To achieve the above object, a display apparatus according to a first aspect of the present disclosure includes:

(A) a frame mounted on an observer's head;
(B) an image display device attached to the frame; and
(C) a dimming device adjusting a light amount of external light being incident from an external portion, wherein the image display device is configured to include:
  (a) an image forming device; and
  (b) an optical device having a virtual image forming region where a virtual image is formed on the basis of light emitted from the image forming device, the optical device overlaps with at least a portion of the dimming device, when an observer's nose side is referred to as an inner side, an observer's ear side is referred to as an outer side, a region of the dimming device facing the virtual image forming region of the optical device is referred to as a virtual image forming region facing region, a region of the dimming device located in an upper side of the virtual image forming region facing region is referred to as an upper region, a region of the dimming device located in a lower side of the virtual image forming region facing region is referred to as a lower region, a region of the dimming device located in an inner side of the virtual image forming region facing region is referred to as an inner region, and a region of the dimming device located in an outer side of the virtual image forming region facing region is referred to as an outer region, at the time of operation of the dimming device, (i) the light blocking ratio of the dimming device is changed over a range of from the upper region to the lower region, the virtual image forming region facing region has a light blocking ratio higher than the light blocking ratio of the lower region, (ii) the light blocking ratio of the dimming device is changed over a range of from the inner region to the outer region, the virtual image forming region facing region has a light blocking ratio higher than the light blocking ratio of the outer region, or (iii) the light blocking ratio of the dimming device is changed over a range of from the upper region to the lower region, and the light blocking ratio of the dimming device is changed over a range of from the inner region to the outer region, the virtual image forming region facing region has a light blocking ratio higher than the light blocking ratios of the lower region and the outer region.

To achieve the above object, a display apparatus according to a second aspect of the present disclosure includes:

(A) a frame mounted on an observer's head;
(B) an image display device attached to the frame; and
(C) a dimming device adjusting a light amount of external light being incident from an external portion, wherein the image display device is configured to include:
  (a) an image forming device; and
  (b) an optical device having a virtual image forming region where a virtual image is formed on the basis of light emitted from the image forming device, the dimming device is configured to include:
  a first substrate;
  a second substrate facing the first substrate;
  a first transparent electrode provided on a facing surface of the first substrate facing the second substrate;
  a second transparent electrode provided on a facing surface of the second substrate facing the first substrate;
  a first electrode formed to be in contact with a portion of the first transparent electrode;
  a second electrode formed to be in contact with a portion of the second transparent electrode; and
  a dimming layer interposed between the first transparent electrode and the second transparent electrode, the optical device overlaps with at least a portion of the dimming device, and a projection image of the first electrode on the first substrate and a projection image of the second electrode on the first substrate do not overlap with each other.

Effects of the Invention

Since the dimming device is provided to the display apparatus according to the first and second aspects of the present disclosure, high contrast can be exhibited to the virtual image observed by the observer, and furthermore, the observer using the display apparatus can surely recognize the external environment. In addition, the light blocking ratio of the dimming device is changed over a range of from the upper region to the lower region, the light blocking ratio of the dimming device is changed over a range of from the inner region to outer region, or the light blocking ratio of the dimming device is changed over a range of from the upper region to the lower region and changed over a range of from the inner region to the outer region, and the light blocking ratio of the lower region or the light blocking ratio of the outer region has a low value. Alternatively, since the projection image of the first electrode on the first substrate and the projection image of the second electrode on the first substrate do not overlap with each other, a change in light blocking ratio occurs. Therefore, an observer using the display apparatus can surely visually recognize the feet and the side of the body, so that the observer can safely act in a real environment. In addition, the effects disclosed in the specification are exemplary ones but not restrictive ones, and there may be additional effects.

BRIEF DESCRIPTION OF DRAWINGS

FIG. 26 is a conceptual diagram of an image display device in a display apparatus in the related art.

MODE FOR CARRYING OUT THE INVENTION

Figure 1A:
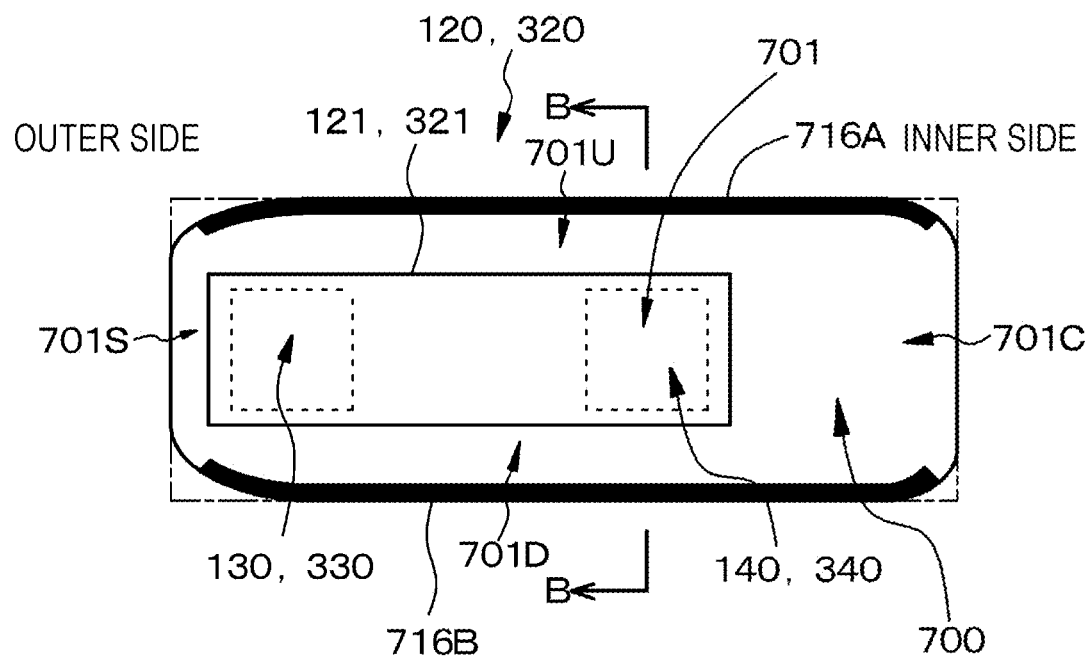
FIG. 1A is a schematic front diagram of an optical device and a dimming device in a display apparatus of Example 1.

Hereinafter, the present disclosure will be described on the basis of examples with reference to the drawings. However, the present disclosure is not limited to the examples, and various numerical values and materials in the examples are exemplary ones. In addition, the description will be made in the following order.

1. Display Apparatus according to First and Second Aspects of the Present Disclosure, Overall Description 2. Example 1 (Display Apparatus according to First and Second Aspects of the Present Disclosure, Display Apparatus of First Embodiment, Optical Device of First-A Structure, Image Forming Device of First Configuration)

3. Example 2 (Modification of Example 1, Display Apparatus of Second Embodiment, Optical Device of First-A Structure, Image Forming Device of First Configuration)

4. Example 3 (Another Modification of Example 1, Display Apparatus of Third Embodiment, Optical Device of First-A Structure, Image Forming Device of First Configuration)

5. Example 4 (Modification of Examples 1 to 3, Optical Device of First-A Structure, Image Forming Device of Second Configuration)

6. Example 5 (Another Modification of Examples 1 to 3, Optical Device of First-B Structure, Image Forming Device of First Configuration)

7. Example 6 (Still Another Modification of Examples 1 to 3, Optical Device of First-B Structure, Image Forming Device of Second Configuration)

8. Example 7 (Still Another Modification of Examples 1 to 3, Optical Device of Second Structure, Image Forming Device of Second Configuration)

9. Example 8 (Modification of Examples 1 to 7)

10. Example 9 (Another Modification of Examples 1 to 7)

11. Example 10 (Modification of Examples 1 to 9)

12. Example 11 (Modification of Example 10)

13. Others

<Display Apparatus According to First and Second Aspects of the Present Disclosure, Overall Description>

In a display apparatus according to a second aspect of the present disclosure, a projection image of a virtual image forming region on a first substrate may be embodied to be located between a projection image of a first electrode on the first substrate and a projection image of a second electrode on the first substrate.

In a display apparatus according to a first aspect of the present disclosure, a dimming device may be embodied to be configured to include a first substrate, a second substrate facing the first substrate, a first transparent electrode provided on a facing surface of the first substrate facing the second substrate, a second transparent electrode provided on a facing surface of the second substrate facing the first substrate, a first electrode formed to be in contact with a portion of the first transparent electrode, a second electrode formed to be in contact with a portion of the second transparent electrode, and a dimming layer interposed between the first transparent electrode and the second transparent electrode. In addition, in this case, the projection image of the first electrode on the first substrate and the projection image of the second electrode on the first substrate may be embodied not to overlap with each other. Furthermore, in this case, alternatively, in the display apparatus according to the second aspect of the present disclosure including the above-described exemplary embodiment, the dimming device may be embodied to be configured with an optical shutter utilizing color change of a substance generated by an oxidation-reduction reaction of an inorganic or organic electrochromic material. Specifically, the dimming layer may be embodied to include an inorganic or organic electrochromic material, and further, the dimming layer may be embodied to have, from the first transparent electrode side, a stack structure of inorganic electrochromic material layers of $WO_3$ layer/$Ta_2O_5$ layer/$Ir_xSn_{1-x}O$ layer or a stack structure of inorganic electrochromic material layers of $WO_3$ layer/$Ta_2O_5$ layer/$IrO_x$ layer. Instead of the $WO_3$ layer, a $MoO_3$ layer or a $V_2O_5$ layer can be used. Moreover, instead of the $IrO_x$ layer, a $ZrO_2$ layer or a zirconium phosphate layer can be used, or a Prussian blue complex/nickel-substituted Prussian blue complex and the like can also be used. For example, as the organic electrochromic material, electrochromic materials described in Japanese Patent Application Laid-Open No. 2014-111710 and Japanese Patent Application Laid-Open No. 2014-159385 can also be used.

The display apparatus according to the first and second aspects of the present disclosure including the above-described various exemplary embodiments may have a configuration where at the time of operation of the dimming device, the second electrode is applied with a voltage higher than that of the first electrode, the light blocking ratio of the dimming device is changed over a range of from an upper region to a lower region, a virtual image forming region facing region has a light blocking ratio higher than the light blocking ratio of the lower region, the first electrode is arranged in the upper region, and the second electrode is arranged in the lower region. The display apparatus having the configuration is, for the convenience, referred to as the "display apparatus of the first embodiment". Therefore, in the display apparatus of the first embodiment, the first electrode may be configured to extend to an inner region.

For simplifying the description hereinafter, a planar shape of the virtual image forming region of the optical device and a planar shape of the virtual image forming region facing region of the dimming device are set to be a rectangle. In addition, for simplifying the description hereinafter, an outer shape of the dimming device is set to be a quadrangle. Each of the four sides of the quadrangle may be configured with a segment or may be configured with a portion of a curved line, and the vertexes of the quadrangle may be rounded. However, the planar shape of the virtual image forming region of the optical device and the outer shape of the dimming device are not limited thereto. In the case where the planar shape of the virtual image forming region is not rectangular, a rectangle may be assumed to circumscribe the outline of the virtual image forming region, four points where virtual lines connecting the center of the rectangle and the vertexes of the rectangle and the outline of the virtual image forming region intersect each other may be defined as virtual vertexes, and portions of the outline of the virtual image forming region which connect the virtual vertexes may be defined as sides. In the case where the outer shape of the dimming device is not a quadrangle, a rectangle may be assumed to circumscribe the outline of the dimming device, four points where virtual lines connecting the center of the rectangle and the vertexes of the rectangle and the outline of the dimming device intersect each other may be defined as virtual vertexes, and portions of the outline of the dimming device which connect the virtual vertexes may be defined as sides. One side of the quadrangle constituting the outer shape of the dimming device and facing the upper side of the virtual image forming region facing region is, for the convenience, referred to as an "upper side of the dimming device". One side of the quadrangle constituting the outer shape of the dimming device and facing the lower side of the virtual image forming region facing region is, for the convenience, referred to as a "lower side of the dimming device". One side of the quadrangle constituting the outer shape of the dimming device and facing the lateral side of the inner side of the virtual image forming region facing region is, for the convenience, referred to as an "inner lateral side of the dimming device". One side of the quadrangle constituting the outer shape of the dimming device and facing the lateral side of the outer side of the virtual image forming region facing region is, for the convenience, referred to as an "outer lateral side of the dimming device".

In the display apparatus of the first embodiment, the first electrode is arranged in the upper region. Specifically, it is preferable that the first electrode is arranged along the upper side of the dimming device. In this case, a minimum value of the length of the first electrode may be set to be a length corresponding to the length of the upper side of the virtual image forming region facing region, and a maximum value of the length of the first electrode may be set to be the length of the upper side of the dimming device. In addition, the first electrode may be configured to extend to the inner region. Specifically, it is preferable that the first electrode is arranged along the inner lateral side of the dimming device. Furthermore, it is preferable that the distal end of the first electrode extends to an extension line of the upper side of the virtual image forming region facing region. Alternatively, it is more preferable that the distal end of the first electrode extends through the bisecting point of the lateral side of the inner side of the virtual image forming region facing region to a virtual line parallel to the upper side of the virtual image forming region facing region. Alternatively, it is furthermore preferable that the distal end of the first electrode extends to an extension line of the lower side of the virtual image forming region facing region.

On the other hand, in the display apparatus of the first embodiment, the second electrode is arranged in the lower region. Specifically, it is preferable that second electrode is arranged along the lower side of the dimming device. A minimum value of the length of the second electrode may be set to be a length corresponding to the length of the lower side of the virtual image forming region facing region, and a maximum value of the length of the second electrode may be set to be the length of the lower side of the dimming device. In addition, the second electrode may be configured to extend to the outer region. Specifically, it is preferable that the second electrode is arranged along the outer lateral side of the dimming device. Furthermore, it is preferable that a distal end of the second electrode extends to an extension line of the lower side of the virtual image forming region facing region. Alternatively, it is more preferable that a distal end of the second electrode extends through the bisecting point of the lateral side of the outer side of the virtual image forming region facing region to a virtual line parallel to the lower side of the virtual image forming region facing region. Alternatively, it is furthermore preferable that a distal end of the second electrode extends to an extension line of the upper side of the virtual image forming region facing region.

Alternatively, in the display apparatus according to the first and second aspects of the present disclosure including the above-described various exemplary embodiments may have a configuration where at the time of operation of the dimming device, the second electrode is applied with a voltage higher than that of the first electrode, the light blocking ratio of the dimming device is changed over a range of from the inner region to the outer region, the virtual image forming region facing region has a light blocking ratio higher than the light blocking ratio of the outer region, the first electrode is arranged in the inner region, and the second electrode is arranged in the outer region. The display apparatus having the configuration is, for the convenience, referred to as the "display apparatus of the second embodiment". In addition, in the display apparatus of the second embodiment, the first electrode may be configured to extend to the upper region. Alternatively, the first electrode may be configured to extend to the lower region. Alternatively, the first electrode may be configured to extend to the upper region and the lower region.

In the display apparatus of the second embodiment, the first electrode is arranged in the inner region. Specifically, it is preferable that the first electrode is arranged along the inner lateral side of the dimming device. In this case, the minimum value of the length of the first electrode may be set to be a length corresponding to the length of the lateral side of the inner side of the virtual image forming region facing region, and the maximum value of the length of the first electrode may be set to be the length of the inner lateral side of the dimming device. In addition, the first electrode may be configured to extend to the upper region. Specifically, it is preferable that the first electrode is arranged along the upper side of the dimming device. Furthermore, it is more preferable that the distal end of the first electrode extends to an extension line of the lateral side of the inner side of the virtual image forming region facing region. Alternatively, it is preferable that the distal end of the first electrode extends through the bisecting point of the upper side of the virtual image forming region facing region to the lateral side of the inner side of the virtual image forming region facing region. Alternatively, it is furthermore preferable that the distal end of the first electrode extends to an extension line of the lateral side of the outer side of the virtual image forming region facing region. Similarly, the first electrode may be configured to extend to the lower region. Specifically, it is preferable that the first electrode is arranged along the lower side of the dimming device. Furthermore, it is preferable that the distal end of the first electrode extends to an extension line of the lateral side of the inner side of the virtual image forming region facing region. Alternatively, it is more preferable that the distal end of the first electrode extends through the bisecting point of the lower side of the virtual image forming region facing region to a virtual line parallel to the lateral side of the inner side of the virtual image forming region facing region. Alternatively, it is furthermore preferable that the distal end of the first electrode extends to an extension line of the lateral side of the outer side of the virtual image forming region facing region.

On the other hand, in the display apparatus of the second embodiment, the second electrode is arranged in the outer region. Specifically, it is preferable that the second electrode is arranged along the outer lateral side of the dimming device. The minimum value of the length of the second electrode may be set to be a length corresponding to the length of lateral side of the outer side of the virtual image forming region facing region, and the maximum value of the length of the second electrode may be set to be the length of the outer lateral side of the dimming device. In addition, the second electrode may be configured to extend to the lower region. Specifically, it is preferable that the second electrode is arranged along the lower side of the dimming device. Furthermore, it is preferable that the distal end of the second electrode extends to an extension line of the lateral side of the outer side of the virtual image forming region facing region. Alternatively, it is more preferable that the distal end of the second electrode extends through the bisecting point of the lower side of the virtual image forming region facing region to a virtual line parallel to the lateral side of the outer side of the virtual image forming region facing region. Alternatively, it is furthermore preferable that the distal end of the second electrode extends to an extension line of the lateral side of the inner side of the virtual image forming region facing region.

Alternatively, the display apparatus according to the first and second aspects of the present disclosure including the above-described various exemplary embodiments may have a configuration where at the time of operation of the dimming device, the second electrode is applied with a voltage higher than that of the first electrode, the light blocking ratio of the dimming device is changed over a range of from the upper region to the lower region, the light blocking ratio of the dimming device is changed over a range of from the inner region to the outer region, the virtual image forming region facing region has a light blocking ratio higher than the light blocking ratios of the lower region and the outer region, first electrode is arranged in the upper region, and the second electrode is arranged in the outer region. The display apparatus having the configuration is, for the convenience, referred to as the "display apparatus of the third embodiment". In addition, in the display apparatus of the third embodiment, the first electrode may be configured to extend to the inner region. Alternatively, the second electrode may be configured to extend to the lower region. Alternatively, the first electrode may be configured to extend to the inner region, and the second electrode may be configured to extend to the lower region.

In the display apparatus of the third embodiment, the first electrode is arranged in the upper region. Specifically, it is preferable that the first electrode is arranged along the upper side of the dimming device. In this case, the minimum value of the length of the first electrode may be set to be a length corresponding to the length of the upper side of the virtual image forming region facing region, and the maximum value of the length of the first electrode may be set to be the length of the upper side of the dimming device. In addition, the first electrode may be configured to extend to the inner region. Specifically, it is preferable that the first electrode is arranged along the inner lateral side of the dimming device. Furthermore, it is preferable that the distal end of the first electrode extends to an extension line of the upper side of the virtual image forming region facing region. Alternatively, it is more preferable that the distal end of the first electrode extends through the bisecting point of the lateral side of the inner side of the virtual image forming region facing region to a virtual line parallel to the upper side of the virtual image forming region facing region. Alternatively, it is furthermore preferable that the distal end of the first electrode extends to an extension line of the lower side of the virtual image forming region facing region. On the other hand, the second electrode is arranged in the outer region. Specifically, it is preferable that the second electrode is arranged along the outer lateral side of the dimming device. In this case, the minimum value of the length of the second electrode may be set to be a length corresponding to the length of the lateral side of the outer side of the virtual image forming region facing region, and the maximum value of the length of the second electrode may be set to be the length of the outer lateral side of the dimming device. In addition, the second electrode may be configured to extend to the lower region. Specifically, it is preferable that the second electrode is arranged along the lower side of the dimming device. Furthermore, it is preferable that the distal end of the second electrode extends to an extension line of the lateral side of the outer side of the virtual image forming region facing region. Alternatively, it is more preferable that the distal end of the second electrode extends through the bisecting point of the lower side of the virtual image forming region facing region to a virtual line parallel to the lateral side of the outer side of the virtual image forming region facing region. Alternatively, it is furthermore preferable that the distal end of the second electrode extends to an extension line of the lateral side of the inner side of the virtual image forming region facing region.

In the display apparatus according to the first and second aspects of the present disclosure including the above-described various exemplary embodiments and configurations, a frame may be embodied to include a front portion disposed on the observer's front, two temple portions pivotally attached via hinges to two ends of the front portion, and nose pads, and the dimming device may be embodied to be provided to the front portion. In addition, in this case, the optical device may be embodied to be attached to the dimming device. In addition, the optical device may be attached to the dimming device in a closely contacted state or may be attached to the dimming device in a spaced state. Furthermore, in this case, the front portion may be embodied to have a rim; the dimming device may be embodied to be fitted into the rim. Furthermore, projection images of the first and second electrodes may be embodied to be included in a projection image of the rim. In addition, in the display apparatus according to the first and second aspects of the present disclosure including the above-described various exemplary embodiments and configurations, the devices may be arranged in the order of the optical device and the dimming device from the observer side, or the devices may be arranged in the order of the dimming device and the optical device.

Furthermore, in the display apparatus according to the first and second aspects of the present disclosure including the above-described various exemplary embodiments and configurations, the optical device may be embodied to be configured to include:

(b-1) a light guiding plate allowing the light incident from the image forming device to propagate through an inner portion thereof by total reflection and, after that, to emit toward an observer;

(b-2) a first deflecting unit deflecting the light incident on the light guiding plate so that the light incident on the light guiding plate is totally reflected by the inner portion of the light guiding plate; and (b-3) a second deflecting unit deflecting, several times, the light propagating the inner portion of the light guiding plate by total reflection in order to emit the light propagating through the inner portion of the light guiding plate by total reflection from the light guiding plate, and the virtual image forming region of the optical device is configured by the second deflecting unit. Herein, such an optical device is, for the convenience, referred to as the "optical device of the first structure". In addition, the term "total reflection" denotes internal total reflection or total reflection in the inner portion of the light guiding plate. The second deflecting unit (virtual image forming region) is located in a projection image of the dimming device. Furthermore, the second deflecting unit or the first and second deflecting units may be embodied to be covered with the one of the substrates constituting the dimming device.

In the display apparatus according to the first and second aspects of the present disclosure, the light blocking ratio of the dimming device is changed over a range of from the upper region to the lower region, or the light blocking ratio of the dimming device is changed over a range of from the inner region to the outer region. Alternatively, the light blocking ratio of the dimming device is changed over a range of from the upper region to the lower region, the light blocking ratio of the dimming device is changed over a range of from the inner region to the outer region, and the light blocking ratio may be gradually changed (namely, may be continuously changed). The light blocking ratio may be configured to be changed stepwise according to arrangement state or shape of the electrodes or the transparent electrodes. The light blocking ratio may be configured to be changed from a certain value continuously or stepwise. Namely, the dimming device may be configured in a state that the dimming device is colored with gradation, may be configured in a state that color is changed stepwise, or may be configured in a state that color is changed continuously or stepwise from a state that the dimming device is colored in certain color. The light blocking ratio may be controlled by voltages applied to the first electrode and the second electrode. A potential difference between the first electrode and the second electrode may be controlled, and the voltage applied to the first electrode and the voltage applied to the second electrode may be independently controlled. In case of performing adjustment of the light blocking ratio, a test pattern may be displayed on the optical device.

The display apparatus according to the first and second aspects of the present disclosure including the above-described various exemplary embodiments and configurations (hereinafter, collectively referred to as the "display apparatus or the like of the present disclosure") may be embodied to further include an illuminance sensor (environmental illuminance measurement sensor) measuring illuminance of an environment where the display apparatus is located, wherein the light blocking ratio of the dimming device is controlled on the basis of a measurement result of the illuminance sensor (environmental illuminance measurement sensor). Alternatively, the display apparatus may be embodied to further include an illuminance sensor (environmental illuminance measurement sensor) measuring illuminance of an environment where the display apparatus is located, wherein luminance of the image formed by the image forming device is controlled on the basis of a measurement result of the illuminance sensor (environmental illuminance measurement sensor). These embodiments may be combined.

Alternatively, the display apparatus may be embodied to further include a second illuminance sensor (in some cases, for the convenience, referred to as a "transmitted light illuminance measurement sensor") measuring illuminance based on light being incident from an external environment and passing through the dimming device, wherein the light blocking ratio of the dimming device is controlled on the basis of a measurement result of the second illuminance sensor (transmitted light illuminance measurement sensor). Alternatively, the display apparatus may be embodied to further include a second illuminance sensor (transmitted light illuminance measurement sensor) measuring illuminance based on light being incident from an external environment and passing through the dimming device, wherein luminance of the image formed by the image forming device is controlled on the basis of a measurement result of the second illuminance sensor (transmitted light illuminance measurement sensor). In addition, it is preferable that the second illuminance sensor (transmitted light illuminance measurement sensor) may be embodied to be arranged to be closer to the observer than to the optical device. At least two second illuminance sensors (transmitted light illuminance measurement sensors) are arranged to perform illuminance measurement based on the light passing through a high light blocking ratio portion and illuminance measurement based on the light passing through a low light blocking ratio portion. These embodiments may be combined. Furthermore, such embodiments and the embodiment where control is performed on the basis of the measurement result of the above-described illuminance sensor (environmental illuminance measurement sensor) may be combined.

The illuminance sensor (environmental illuminance measurement sensor, transmitted light illuminance measurement sensor) may be configured with a well-known illuminance sensor, and the control of the illuminance sensor may be performed on the basis of a well-known control circuit.

A maximum light transmittance of the dimming device may be configured to be 50% or more, and a minimum light transmittance of the dimming device may be configured to be 30% or less. In addition, as the upper limit of the maximum light transmittance of the dimming device, 99% may be exemplified, and as the lower limit of the minimum light transmittance of the dimming device, 1% may be exemplified. Herein, the following relationship is satisfied.

(Light Transmittance)=1−(Light Blocking Ratio)

A connector may be attached to the dimming device, and the dimming device may be electrically connected to a control circuit for controlling the light blocking ratio of the dimming device (for example, included in a control device for controlling the image forming device) through the connector and a wire line.

In some cases, the light passing through the dimming device may be configured to be colored in desired color by the dimming device. In addition, in this case, the color to be colored by the dimming device may be embodied to be variable, or the color to be colored by the dimming device may be embodied to be fixed. In addition, in the former case, for example, a dimming device colored in red, a dimming device colored in green, and a dimming device colored in blue may be embodied to be stacked. In addition, in the latter case, the color colored by the dimming device is not limited, but brown may be exemplified.

The dimming layer of the dimming device provided to the dimming device or the like of the present disclosure may be embodied to include an electrophoretic dispersion liquid as well as an electrochromic material. The dimming device may be embodied by an optical shutter according to an electro-deposition method (electro-deposition, electric-field deposition) utilizing electro-deposition/dissociation phenomenon occurring due to a reversible redox reaction of metal (for example, silver particles), and namely, the dimming layer may be embodied to include an electrolyte containing metal ions.

Herein, the electrophoretic dispersion liquid is configured with a large number of charged electrophoretic particles and a dispersion medium having a color different from that of the electrophoretic particles. For example, as the case where patterning is performed on the first transparent electrode and patterning is not performed on the second transparent electrode (so-called, a solid electrode configuration), in the case where the electrophoretic particles are negatively charged, if a relatively negative voltage is applied to the first transparent electrode and a relatively positive voltage is applied to the second transparent electrode, the negatively-charged electrophoretic particles migrate to cover the second transparent electrode. Therefore, the light blocking ratio of the dimming device becomes high. On the other hand, on the contrary, if a relatively positive voltage is applied to the first transparent electrode and a relatively negative voltage is applied to the second transparent electrode, the electrophoretic particles migrate to cover the first transparent electrode. Therefore, the light blocking ratio of the dimming device becomes low. By appropriately performing such voltage application to the transparent electrodes, the control of the light blocking ratio of the dimming device can be performed. The voltages may be DC voltages or may be AC voltages. The shape of the patterned first transparent electrode may be a shape capable of facilitating optimization of the value of the light blocking ratio of the dimming device when the electrophoretic particles migrate to cover the first transparent electrode so that the light blocking ratio of the dimming device becomes low, and the shape may be determined by performing various tests. If necessary, an insulating layer may be formed on the transparent electrode. As a material constituting such an insulating layer, for example, there can be mentioned colorless and transparent insulating resins, and specific examples thereof may include an acrylic resin, an epoxy resin, a fluorine resin, a silicone resin, a polyimide resin, and a polystyrene resin.

As the ratio of the amount of electrophoretic particles to the amount of a dispersion liquid (dispersion medium) in an electrophoretic dispersion liquid, a range of 0.1 parts by mass to 15 parts by mass, preferably 1 part by mass to 10 parts by mass of electrophoretic particles to 100 parts by mass of the dispersion liquid (dispersion medium) can be exemplified. As the dispersion liquid (dispersion medium) for dispersing the electrophoretic particles, a colorless transparent liquid having high insulating properties, specifically, a non-polar dispersion medium, more specifically, aliphatic hydrocarbon, aromatic hydrocarbon, halogenated hydrocarbon, silicone oil, and the like can be mentioned. Herein, examples of the aliphatic hydrocarbon may include pentane, hexane, cyclohexane, heptane, octane, nonane, decane, dodecane, ligroin, solvent naphtha, kerosene, normal paraffin, and isoparaffin. Further, examples of the aromatic hydrocarbon may include benzene, toluene, xylene, and alkylbenzene. Examples of the silicone oil may include various dimethylpolysiloxane including modified silicone oil. More specifically, Isopar G, Isopar H, Isopar L, Isopar M, Exxsol D30, Exxsol D40, Exxsol D80, Exxsol D110, and Exxsol D130 manufactured by Exxon Mobil Corporation, IP Solvent 1620, IP Solvent 2028, and IP Solvent 2835 manufactured by Idemitsu Petrochemical Company, Ltd., Shellsol 70, Shellsol 71, Shellsol 72, Shellsol A, and Shellsol AB manufactured by Shell Chemicals Japan Ltd., and Naphthesol L, Naphthesol M, and Naphthesol H manufactured by Nippon Petrochemical Company, Ltd. can be mentioned. Incidentally, these can be used singly or two or more kinds thereof can be mixed to use.

A structure in which an electrophoretic dispersion liquid is sealed in a microcapsule may be adopted. Microcapsules can be obtained by a well-known method such as an interfacial polymerization method, an in-situ polymerization method, or a coacervation method. Excellent light transmitting characteristics are required for materials constituting microcapsules, and specifically, urea-formaldehyde resins, melamine-formaldehyde resins, polyester resins, polyurethane resins, polyamide resins, polyethylene resins, polystyrene resins, polyvinyl alcohol resins, gelatin, or copolymers thereof can be exemplified. A method for disposing microcapsules on a substrate is not particularly limited, but for example, an ink jet method can be mentioned. Incidentally, microcapsules may be fixed on a substrate using a light transmitting binder resin in order to prevent misalignment of microcapsules disposed on the substrate. As the light transmitting binder resin, water-soluble polymers, specifically, for example, polyvinyl alcohol, polyurethane, polyester, acrylic resins, and silicone resins can be mentioned.

When a positive charge control agent is used to charge electrophoretic particles with a positive charge although it is not particularly necessary to use a charge control agent in electrophoretic particles, as the positive charge control agent, for example, nigrosine dyes such as Nigrosine Base EX (manufactured by Orient Chemical Industries Co., Ltd.), quaternary ammonium salts such as P-51 (manufactured by Orient Chemical Industries Co., Ltd.) and Copy Charge PX VP435 (manufactured by Hoechst Japan Co., Ltd.), alkoxylated amines, alkylamides, molybdic acid chelate pigments, imidazole compounds such as PLZ1001 (manufactured by SHIKOKU CHEMICALS CORPORATION), and transparent or white onium compounds can be mentioned. Incidentally, as onium compounds, primary to quaternary compounds can be freely selected from ammonium compounds, sulfonium compounds, and phosphonium compounds, and for example, a substituent bonded to a nitrogen, sulfur, or phosphorous atom is an alkyl group or an aryl group, and as salts, halogen elements represented by chlorine, a hydroxyl group, and a carboxylic acid group are preferred as the counter ion; however, salts are not limited thereto. Among them, primary to tertiary amine salts and quaternary ammonium salts are particularly preferred. When a negative charge control agent is used to charge electrophoretic particles with a negative charge, as the negative charge control agent, for example, metal complexes such as Bontron S-22, Bontron S-34, Bontron E-81, and Bontron E-84 (all manufactured by Orient Chemical Industries Co., Ltd.) and Spiron Black TRH (manufactured by Hodogaya Chemical Co., Ltd.), thioindigo pigments, quaternary ammonium salts such as Copy Charge NX VP434 (manufactured by Hoechst Japan Co., Ltd.), calixarene compounds such as Bontron E-89 (manufactured by Orient Chemical Industries Co., Ltd.), boron compounds such as LR147 (manufactured by Japan Carlit Co., Ltd.), fluorine compounds such as magnesium fluoride and fluorinated carbon, publicly known metal soaps such as aluminum stearate, calcium stearate, aluminum laurate, barium laurate, sodium oleate, zirconium octylate, and cobalt naphthenate, salicylic acid-based metal complexes with azine compounds, and phenol-based condensates can be mentioned. As the added amount of the charge control agent, 100 parts by mass to 300 parts by mass with respect to 100 parts by mass of electrophoretic particles can be exemplified.

As the dispersion liquid (dispersion medium) constituting the electrophoretic dispersion liquid, non-ionic surfactants such as sorbitan fatty acid esters (for example, sorbitan monooleate, sorbitan monolaurate, sorbitan sesqueoleate, and sorbitan trioleate); polyoxyethylene sorbitan fatty acid esters (for example, polyoxyethylene sorbitan monostearate and polyoxyethylenesorbitanmonooleate); polyethylene glycol fatty acid esters (for example, polyoxyethylene monostearate and polyethylene glycol diisostearate); polyoxyethylene alkylphenyl ethers (for example, polyoxyethylene nonylphenyl ether and polyoxyethylene octylphenyl ether); and aliphatic diethanolamides can be used. Further, as a polymeric dispersing agent, for example, styrene-maleic acid resins, styrene-acrylic resins, rosin, urethane-based polymer compounds of BYK-160, BYK-162, BYK-164, and BYK-182 (manufactured by BYK Chemie GmbH), urethane-based dispersing agents EFKA-47 and LP-4050 (manufactured by EFKA Company, Ltd.), polyester-based polymer compound Solsperse 24000 (manufactured by Zeneca Corporation), and aliphatic diethanolamide-based polymer compound Solsperse 17000 (manufactured by Zeneca Corporation) can be mentioned. In addition, as other polymeric dispersing agents, random copolymers with monomers capable of forming segments which can be solvated to a dispersion medium such as lauryl methacrylate, stearyl methacrylate, 2-ethylhexyl methacrylate, and cetyl methacrylate, monomers capable of forming segments which are difficult for solvation to a dispersion medium such as methyl methacrylate, ethyl methacrylate, isopropyl methacrylate, styrene, and vinyltoluene, and monomers having polar functional groups, and graft copolymers disclosed in Japanese Patent Application Laid-Open No. 3-188469 can be mentioned. As monomers having polar functional groups, monomers having acidic functional groups such as acrylic acid, methacrylic acid, itaconic acid, fumaric acid, maleic acid, and styrenesulfonic acid; monomers having basic functional groups such as dimethylaminoethyl methacrylate, diethylaminoethyl methacrylate, vinylpyridine, vinylpyrrolidine, vinylpiperidine, and vinyl lactam; salts thereof; styrene-butadiene copolymers, and block copolymers of styrene and long chain alkyl methacrylate disclosed in Japanese Patent Application Laid-Open No. 60-10263 can be mentioned. Moreover, dispersing agents of graft copolymers disclosed in Japanese Patent Application Laid-Open No. 3-188469 may be added. As the added amount of the dispersing agent, 0.01 parts by mass to 5 parts by mass with respect to 100 parts by mass of electrophoretic particles can be exemplified. Ionic surfactants may be added in order to more effectively induce electrophoretic movement of electrophoretic particles. As a specific example of anionic surfactants, sodium dodecylbenzenesulfonate, sodium dodecylsulfate, sodium alkylnaphthalenesulfonate, and sodium dialkyl sulfosuccinate can be mentioned. Further, as a specific example of cationic surfactants, alkylbeneznedimethylammonium chloride, alkyltrimethylammonium chloride, and distearylammonium chloride can be mentioned. Furthermore, ionic additives soluble in a non-polar dispersion medium such as trifluorosulfonylimide salts, trifluoroacetate salts, and trifluorosulfate salts may be added. As the added amount of the ionic additive, 1 part by mass to 10 parts by mass with respect to 100 parts by mass of electrophoretic particles can be exemplified.

As electrophoretic particles, carbon black (black), various metal oxides, phthalocyanine dyes (cyan), Direct Blue 199 (Project Cyan), Magenta 377 (magenta), Reactive Red 29 (magenta), Reactive Red 180 (magenta), and azo dyes (yellow, for example, Yellow 104, Ilford AG, Rue de l'Industrie, CH-1700 Fribourg, Switzerland) can be exemplified.

When the dimming layer is configured by an electrolyte layer containing metal ions, it is desirable that the metal ions are formed by silver ions, and the electrolyte contains at least one salt (referred to as "supporting electrolyte salt") selected from the group consisting of LiX, NaX, and KX (provided that, X is a fluorine atom, a chlorine atom, a bromine atom, or an iodine atom).

As a coloring material colored by electrochemical reduction/oxidation reaction and associated precipitation and dissolution, metal ions are contained in the electrolyte. In addition, by the electrochemical precipitation/dissolution reaction of the metal ions, coloring and decoloring occur, and the light blocking ratio of the dimming device is changed. In other words, the operation of the dimming device of such a display device may be so-called operation causing a deposition reaction of the metal by electrolytic plating and an elution reaction of the deposited metal to reversibly occur. In this way, metal ions which can realize color generation and extinction by electrochemical precipitation/dissolution are not particularly limited, but in addition to silver (Ag) described above, ions of each of bismuth (Bi), copper (Cu), sodium (Na), lithium (Li), iron (Fe), chromium (Cr), nickel (Ni), and cadmium (Cd), and combinations of these ions can be exemplified. Of them, particularly preferred metal ions are silver (Ag) and bismuth (Bi). Silver and bismuth can allow reversible reaction to easily proceed and have a high degree of discoloration at the time of precipitation.

Further, metal ions are contained in the electrolyte, and specifically, a substance containing metal ions is dissolved in the electrolyte. More specifically, as the substance containing metal ions, for example, at least one kind of silver halides such as AgF, AgCl, AgBr, and AgI, preferably, AgI or AgBr can be mentioned, and the substance containing these metal ions is dissolved in the electrolyte. As the concentration of the silver halide, for example, 0.03 to 2.0 mol/L can be mentioned.

Although the electrolyte containing the metal ions is sealed between the first substrate and the second substrate, herein, the electrolyte may be configured with an electrolytic solution or a polymer electrolyte. Herein, as an electrolytic solution, electrolytic solutions in which a metal salt or an alkyl quaternary ammonium salt is contained in a solvent can be used. Specifically, as the electrolyte, water, ethyl alcohol, isopropyl alcohol, 2-ethoxyethanol, 2-methoxyethanol, propylene carbonate, dimethyl carbonate, ethylene carbonate, γ-butyrolactone, acetonitrile, sulfolane, dimethoxyethane, dimethylformamide (DMF), diethylformamide (DEF), dimethylsulfoxide (DMSO), N,N-dimethylacetamide (DMAA), N-methylpropionic acid amide (MPA), N-methylpyrrolidone (MP), dioxolan (DOL), ethyl acetate (EA), tetrahydrofuran (THF), methyltetrahydrofuran (MeTHF), or mixtures thereof can be used. Further, as a matrix (base material) polymer used for a polymer electrolyte, a polymeric material having a repeating unit of alkylene oxide, alkyleneimine, or alkylene sulfide in a main skeleton unit or a side chain unit, or in both a main skeleton unit and a side chain unit, a copolymer containing a plurality of units that are different from one another, a polymethyl methacrylate derivative, polyvinylidene fluoride, polyvinylidene chloride, polyacrylonitrile, a polycarbonate derivative, or a mixture thereof can be exemplified. When the electrolyte is formed by a polymer electrolyte, the electrolyte may be a single layer or may have a stack structure in which a plurality of polymer electrolytes are stacked.

A matrix polymer which is swollen by adding water or an organic solvent may also be used. Particularly, in the case where a response speed or the like is required, by adding water or an organic solvent to the matrix polymer, the metal ions contained in the electrolyte can be easily moved.

Incidentally, depending on characteristics of the matrix polymer and desired electrochemical reaction, when hydrophilicity is required, water, ethyl alcohol, isopropyl alcohol, or a mixture thereof are preferably added; meanwhile, when hydrophobicity is required, propylene carbonate, dimethyl carbonate, ethylene carbonate, γ-butyrolactone, acetonitrile, sulfolane, dimethoxyethane, ethyl alcohol, isopropyl alcohol, dimethylformamide, dimethyl sulfoxide, dimethylacetamide, n-methylpyrrolidone, or a mixture thereof is preferably added.

As described above, by the deposition of the metal on the second electrode and the dissolution of the metal in the electrolyte based on applying of voltages to the first electrode and the second electrode, the coloring and decoloring of the dimming device (specifically, an electro-deposition type dimming device) occur. Herein, in general, a plane of the layer configured with the metal deposited on the second electrode which is in contact with the electrolyte becomes uneven and exhibits blackish color, and the plane of the metal layer which is in contact with the second electrode has a shape of a mirror plane. Therefore, incase of using as the dimming device, it is preferable that the plane of the metal layer which is in contact with the electrolyte faces the observer. In other words, it is preferable that the first substrate is embodied to be arranged to be closer to the observer than to the second substrate.

As described above, when a salt (supporting electrolyte salt) containing ion species different from metal ion species to be precipitated or dissolved is added to an electrolyte, electrochemical precipitation/dissolution reaction can be performed more effectively and stably. As such a supporting electrolyte salt, lithium salts, potassium salts, sodium salts, and tetraalkyl quaternary ammonium salts described above can be exemplified. Herein, as the lithium salts, specifically, LiCl, LiBr, LiI, LiBF$_4$, LiClO$_4$, LiPF$_6$, LiCF$_3$SO$_3$, and the like can be exemplified. Further, as the potassium salts, specifically, KCl, KI, KBr, and the like can be exemplified. Furthermore, as the sodium salts, specifically, NaCl, NaI, NaBr, and the like can be exemplified. Further, as the tetraalkyl quaternary ammonium salts, specifically, tetraethylammonium fluoroborate, tetraethylammonium perchlorate, tetrabutylammonium fluoroborate, tetrabutylammonium perchlorate, tetrabutylammonium halide salts, and the like can be exemplified. Incidentally, the alkyl chain lengths of the quaternary ammonium salts described above may not be aligned. The supporting electrolyte salt may be added, for example, at a concentration of about ½ to 5 times the substance containing metal ions. Further, inorganic particles may be mixed as a coloring agent in an electrolyte formed by a polymer electrolyte.

In addition, in order to reversibly and efficiently perform electrochemical reaction, particularly, precipitation/dissolution of metals, at least one kind of additives including a growth inhibitor, a stress inhibitor, a brightener, a complexing agent, and a reducing agent may be added to the electrolyte. As such additives, organic compounds including a group having an oxygen atom or a sulfur atom are preferred, and for example, at least one kind selected from the group consisting of thiourea, 1-aryl-2-thiourea, mercaptobenzimidazole, coumalin, phthalic acid, succinic acid, salicylic acid, glycolic acid, dimethylamine borane (DMAB), trimethylamine borane (TMAB), tartaric acid, oxalic acid, and D-glucono-1, 5-lactone is preferably added. In particular, when mercaptobenzimidazole based on mercaptoalkylimidazole is added, reversibility is improved and excellent effects of long-term storage stability and high-temperature storage stability can be obtained, which is preferable.

As materials constituting the transparent first substrate and second substrate constituting the dimming device, specifically, a transparent glass substrate such as soda-lime glass or white plate glass, a plastic substrate, a plastic sheet, and a plastic film can be exemplified. Herein, as plastic, polyethylene terephthalate, polyethylene naphthalate, polycarbonate, a cellulose ester such as acetylcellulose, a fluorinated polymer such as a copolymer of polyvinylidene fluoride or polytetrafluoroethylene and hexafluoropropylene, a polyether such as polyoxymethylene, a polyolefin such as polyacetal, polystyrene, polyethylene, polypropylene, or a methyl pentene polymer, a polyimide such as polyamidimide or polyetherimide, polyamide, polyethersulfone, polyphenylenesulfide, polyvinylidene fluoride, tetra acetyl cellulose, brominatedphenoxy, polyarylate, polysulfone, or the like can be exemplified. A plastic sheet or a plastic film may have rigidity that allows the sheet or the film not to easily bend, or may have flexibility. When the first substrate and the second substrate are constituted by transparent plastic substrates, a barrier layer formed by an inorganic material or an organic material may be formed on an inner plane of the substrates.

The first substrate and the second substrate are sealed and adhered together by a sealing member in their outer edges. As the sealing member that is also called a sealant, various kinds of thermosetting, photo-curable, moisture-curable, and anaerobic-curable resins such as an epoxy resin, a urethane resin, an acrylic resin, a vinyl acetate resin, an ene-thiol-based resin, a silicone-based resin, or a modified polymer resin can be used.

In a configuration where the one of the substrates constituting the dimming device also functions as a constituting member of the optical device, a total weight of the display apparatus can be reduced, and thus, there is no problem in that a user of the display apparatus feels discomfort. In addition, the other substrate may be configured to be thinner than the one substrate.

The first transparent electrode may be patterned or may not be patterned. Also, the second transparent electrode may be patterned or may not be patterned. As materials constituting the first transparent electrode and the second transparent electrode, specifically, an indium-tin complex oxide (ITO, Indium Tin Oxide, including Sn-doped $In_2O_3$, crystalline ITO, and amorphous ITO), fluorine-doped $SnO_2$ (FTC)), IFO (F-doped $In_2O_3$), antimony-doped $SnO_2$ (ATO), $SnO_2$, ZnO (including Al-doped ZnO and B-doped ZnO), an indium-zinc complex oxide (IZO, Indium Zinc Oxide), a spinel-type oxide, an oxide having the structure $YbFe_2O_4$, or a conductive polymer such as polyaniline, polypyrrole, or polythiophene can be exemplified; however, the materials are not limited thereto, and a combination of two or more kinds thereof can be used. For example, the first electrode and the second electrode of which planar shapes are thin lines can be formed by metals such as gold, silver, copper, aluminum, nickel, and titanium, or alloys thereof. The first electrode and the second electrode are demanded to have electric resistance lower than those of the first transparent electrode and the second transparent electrode. The first transparent electrode, the second transparent electrode, the first electrode, and the second electrode can be formed on the basis of a physical vapor deposition method (PVD method) such as a vacuum deposition method or a sputtering method, various chemical vapor deposition methods (CVD methods), or various kinds of coating. The patterning of the electrodes and the transparent electrodes can be performed using an arbitrary method such as an etching method, a lift-off method, or a method using various kinds of masking.

The optical device is of a transflective type (see-through type). Specifically, at least portions of the optical device facing the observer's eyeballs (pupils) are configured to be transflective (see-through), so that the observer can see an outside scene through the portions of the optical device and the dimming device. The observer observes brightness of the light passing through the dimming device and the optical device, and the observer may manually control and adjust the light blocking ratio by manipulating a switch, a button, a dial, a slider, a knob, or the like. Alternatively, the light blocking ratio may be controlled and adjusted on the basis of the above-described measurement result of the second illuminance sensor (transmitted light illuminance measurement sensor) measuring illuminance based on light being incident from an external environment and passing through the dimming device. In addition, in the control and adjustment of the light blocking ratio, specifically, the voltages applied to the first electrode and the second electrode may be controlled. At least two second illuminance sensors (transmitted light illuminance measurement sensors) are arranged to perform illuminance measurement based on the light passing through a high light blocking ratio portion and illuminance measurement based on the light passing through a low light blocking ratio portion. The display apparatus may have one image display device or may have two image display devices. In case of having two image display devices, the one dimming device and the other dimming device are provided to adjust voltages applied to the first electrode and the second electrode, so that equalization of the light blocking ratio of the one dimming device and the light blocking ratio of the other dimming device can be facilitated. The light blocking ratio of the one dimming device and the light blocking ratio of the other dimming device may be controlled for example, on the basis of a measurement result of the above-described second illuminance sensor (transmitted light illuminance measurement sensor) measuring illuminance based on light being incident from an external environment and passing through the dimming device or may be manually controlled and adjusted by an observer observing brightness of the light passing through the one dimming device and the optical device and brightness of the light passing through the other dimming device and the optical device and the observer manipulating a switch, a button, a dial, a slider, a knob, or the like. In case of performing adjustment of the light blocking ratio, a test pattern may be displayed on the optical device.

In the specification, the case of using the term "transflective" does not denote that ½ (50%) of incident light is transmitted or reflected, but the case denotes that a portion of the incident light is transmitted and the remaining light is reflected.

Herein, in the optical device of the first structure, as described above, the first deflecting unit may be configured to reflect the light incident on the light guiding plate, and the second deflecting unit may be configured to transmit and reflect, several times, the light propagating through the inner portion of the light guiding plate by total reflection. In addition, in this case, the first deflecting unit may be configured to function as a reflecting mirror, and the second deflecting unit may be configured to function as a transflective mirror. In addition, such an optical device of the first structure is, for the convenience, referred to as the "optical device of the first-A structure".

In such an optical device of the first-A structure, the first deflecting unit may be configured with, for example, a metal including an alloy or may be configured with a light reflecting film (a kind of a mirror) reflecting the light incident on the light guiding plate or a diffraction grating (for example, a hologram diffraction grating film) diffracting the light incident on the light guiding plate. Alternatively, the first deflecting unit may be configured with, for example, a multi-layer stacked structure where a plurality of dielectric stacked films are stacked, a half mirror, or a polarized beam splitter. In addition, the second deflecting unit may be configured with a multi-layer stacked structure where a plurality of dielectric stacked films are stacked, a half mirror, a polarized beam splitter, or a hologram diffraction grating film. In addition, the first deflecting unit and the second deflecting unit are arranged in the light guiding plate (incorporated into an inner portion of the light guiding plate). In the first deflecting unit, the parallel light incident on the light guiding plate is reflected or diffracted so that the parallel light incident on the light guiding plate is totally reflected in the inner portion of the light guiding plate. On the other hand, in the second deflecting unit, the parallel light propagating through the inner portion of the light guiding plate by total reflection is, several times, reflected or diffracted to be emitted from the light guiding plate in a parallel light state.

Alternatively, the first deflecting unit may be configured to diffract and reflect the light incident on the light guiding plate, and the second deflecting unit may be configured to diffract and reflect, several times, the light propagating through the inner portion of the light guiding plate. In addition, in this case, the first deflecting unit and the second deflecting unit may be embodied to be configured with a diffraction grating element. Furthermore, the diffraction grating element may be configured with a reflection type diffraction grating element or may be configured with a transmission type diffraction grating element. Alternatively, the one diffraction grating element may be configured with a reflection type diffraction grating element, and the other diffraction grating element may be configured with a transmission type diffraction grating element. In addition, as a reflection type diffraction grating element, a reflection type volume hologram diffraction grating may be exemplified. In some cases, the first deflecting unit configured with the reflection type volume hologram diffraction grating is, for the convenience, referred to as the "first diffraction grating member", and the second deflecting unit configured with the reflection type volume hologram diffraction grating is, for the convenience, referred to as the "second diffraction grating member". In addition, such an optical device of the first structure is, for the convenience, referred to as the "optical device of the first-B structure".

A mono-colored (for example, green) image display can be performed by the image display device in the display apparatus or the like of the present disclosure. In addition, in this case, for example, a viewing angle may be configured to be divided by two parts (more specifically, for example, bisected), and the first deflecting unit may be configured to be formed by stacking two diffraction grating members corresponding to the two-divided viewing angle groups. Alternatively, in case of performing color image display, the first diffraction grating member or the second diffraction grating member may be configured by stacking P layers of the diffraction grating layers configured with reflection type volume hologram diffraction gratings so as to cope with the diffraction and reflection of the P types of light having different P types (for example, P=3, and three types of red, green, and blue) of wavelength bands (or wavelengths). Interference fringe corresponding to one type of wavelength band (or wavelength) is formed in each diffraction grating layer. Alternatively, P types of interference fringe may be configured to be formed in the first diffraction grating member or the second diffraction grating member configured with one layer of the diffraction grating layer in order to cope with the diffraction and reflection of P types of light having different P types of wavelength bands (or wavelengths). Alternatively, in a structure, for example, a diffraction grating member configured with a diffraction grating layer configured with a reflection type volume hologram diffraction grating which diffracts and reflects light having a red wavelength band (or wavelength) may be arranged in the first light guiding plate, a diffraction grating member configured with a diffraction grating layer configured with a reflection type volume hologram diffraction grating which diffracts and reflects light having a green wavelength band (or wavelength) may be arranged in the second light guiding plate, a diffraction grating member configured with a diffraction grating layer configured with a reflection type volume hologram diffraction grating which diffracts and reflects light having a blue wavelength band (or wavelength) may be arranged in the third light guiding plate, and the first light guiding plate, the second light guiding plate and the third light guiding plate may be stacked with gaps. Alternatively, for example, a viewing angle may be configured to be divided by three parts, and the first diffraction grating member or the second diffraction grating member may be configured to be formed by stacking the diffraction grating layers corresponding to the viewing angles. In addition, by employing such a configuration, when the light having each wavelength band (or wavelength) is diffracted and reflected in the first diffraction grating member or the second diffraction grating member, increasing of diffraction efficiency, increasing of a diffraction receiving angle, and optimizing of a diffraction angle can be facilitated. It is preferable that a protective member is arranged so that the reflection type volume hologram diffraction grating is not in direct contact with the atmosphere.

As a material constituting the first diffraction grating member and the second diffraction grating member, a photopolymer material may be exemplified. The constituent material or basic structure of the first diffraction grating member and the second diffraction grating member configured with the reflection type volume hologram diffraction grating may be configured to be the same as the constituent material or structure of the reflection type volume hologram diffraction grating of the related art. The reflection type volume hologram diffraction grating denotes a hologram diffraction grating which diffracts and reflects only +first order diffracted light. The interference fringe is formed in the diffraction grating member in a range of from the inner portion to the surface thereof, and a method of forming the associated interference fringe itself may be configured to be the same as a forming method of the related art. Specifically, for example, a member (for example, a photopolymer material) constituting the diffraction grating member is irradiated with object light from a first predetermined direction of the one side, and at the same time, and the member constituting the diffraction grating member is irradiated with reference light from a second predetermined direction of the other side, so that the interference fringe formed by the object light and the reference light may be recorded in the inner portion of the member constituting the diffraction grating member. By appropriately selecting the first predetermined direction, the second predetermined direction, the wavelength of the object light, and the wavelength of the reference light, a desired pitch of the interference fringe and a desired slant angle of the interference fringe on the surface of the diffraction grating member can be obtained. The slant angle of the interference fringe denotes an angle between the surface of the diffraction grating member (or the diffraction grating layer) and the interference fringe. In the case where the first diffraction grating member and the second diffraction grating member are configured in a stack structure of the P layers of the diffraction grating layers configured with reflection type volume hologram diffraction gratings, in the stacking of the diffraction grating layers, the P layers of the diffraction grating layers are separately fabricated, and after that, the P layers of the diffraction grating layer are stacked (adhered) by using, for example, UV curing type adhesive. In addition, one layer of the diffraction grating layer is fabricated by using an adhesive photopolymer material, and after that, by attaching the adhesive photopolymer material on the layer, the diffraction grating layer is fabricated, so that the P layers of the diffraction grating layers may be fabricated.

Alternatively, in the image display device of the display apparatus or the like of the present disclosure, the optical device may be embodied to be configured with a transflective mirror which light emitted from the image forming device is incident on and which emits the light toward observer's pupils, or the optical device may be embodied to be configured with a polarized beam splitter (PBS). A virtual image forming region of the virtual image forming region of the optical device is configured by the transflective mirror or the polarized beam splitter. In a structure, the light emitted from the image forming device may propagate through air to be incident on the transflective mirror or the polarized beam splitter. In a structure, the light may propagate through an inner portion of a transparent member (specifically, a member configured with a similar material as that constituting the later-described light guiding plate) such as a glass plate or a plastic plate to be incident on the transflective mirror or the polarized beam splitter. The transflective mirror or the polarized beam splitter may be attached to the image forming device through the transparent member, and the transflective mirror or the polarized beam splitter may be attached to the image forming device through a member different from the transparent member. Herein, such an optical device is, for the convenience, referred to as the "optical device of the second structure". The transflective mirror may be configured with the first deflecting unit of the optical device of the first-A structure, for example, a light reflecting film (a kind of a mirror) which is made of a metal including an alloy and reflects light or a diffraction grating (for example, a hologram diffraction grating film). Alternatively, the optical device may be embodied to be configured with a prism which the light emitted from the image forming device is incident on and which emits the light toward the observer's pupil.

In the image display device of the display apparatus or the like of the present disclosure including the above-described various exemplary embodiments and configurations, the image forming device may be embodied to have a plurality of pixels which are arrayed in a two-dimensional matrix shape. In addition, the configuration of such an image forming device is, for the convenience, referred to as the "image forming device of the first configuration".

As the image forming device of the first configuration, for example, an image forming device configured to include a reflection type spatial light modulator and a light source, an image forming device configured to include a transmission type spatial light modulator and a light source, or an image forming device configured with a light emitting element such as an organic electro luminescence (EL), an inorganic EL, a light emitting diode (LED), or a semiconductor laser element may be exemplified. Among the image forming devices, the image forming device configured to include a reflection type spatial light modulator and a light source is preferred. As the spatial light modulator, a light valve, for example, a transmission type or reflection type liquid crystal display apparatus such as a liquid crystal on silicon (LCOS), a digital micromirror device (DMD) may be exemplified. As the light source, a light emitting element may be exemplified. Furthermore, the reflection type spatial light modulator may be configured as a polarized beam splitter which reflects a portion of the light from the liquid crystal display apparatus and the light source and guides the portion of the light to the liquid crystal display apparatus and transmits a portion of the light reflected by the liquid crystal display apparatus and guides the portion of the light to the optical system. As the light emitting element constituting the light source, a red light emitting element, a green light emitting element, a blue light emitting element, and a white light emitting element may be exemplified. Alternatively, by color-mixing red light, green light, and blue light emitted from a red light emitting element, a green light emitting element, and a blue light emitting element using light pipes and by performing luminance equalizing, white light may be obtained. As the light emitting element, for example, a semiconductor laser element, a solid-state laser, or an LED may be exemplified. The number of pixels may be determined on the basis of specifications required for the image display device. As a specific value of the number of pixels, 320×240, 432×240, 640×480, 1024×768, 1920×1080, or the like may be exemplified.

Alternatively, in the image display device of the display apparatus or the like of the present disclosure including the above-described various exemplary embodiments and configurations, the image forming device may be embodied to be configured to include a light source and a scanning unit which scans parallel light emitted from the light source. In addition, such a configuration of the image forming device is, for the convenience, referred to as the "image forming device of the second configuration".

As the light source of the image forming device of the second configuration, a light emitting element may be exemplified. Specifically, a red light emitting element, a green light emitting element, a blue light emitting element, or a white light emitting element may be exemplified. Alternatively, by color-mixing red light, green light, and blue light emitted from a red light emitting element, a green light emitting element, and a blue light emitting element using light pipes and by performing luminance equalizing, white light may be obtained. As a light emitting element, for example, a semiconductor laser element, a solid-state laser, or an LED may be exemplified. The number of pixels (virtual pixels) in the image forming device of the second configuration may be determined on the basis of specifications required for the image display device. As a specific value of the number of pixels (virtual pixels), 320×240, 432×240, 640×480, 1024×768, 1920×1080, or the like may be exemplified. In addition, as the case of performing color image display, in the case where the light source is configured to include a red light emitting element, a green light emitting element, and a blue light emitting element, it is preferable that color combining is performed by using, for example, a crossed prism. As the scanning unit, micro electro mechanical systems (MEMS) or a galvano mirror having a micromirror which horizontally and vertically scans the light emitted from the light source, for example, which is rotatable in two dimensional directions may be exemplified.

In the image forming device of the first configuration or the image forming device of the second configuration of the image display device having the optical device of the first structure, the optical system (an optical system converting emitted light into parallel light, sometimes, referred to as a "parallel light emitting optical system", specifically, for example, a collimating optical system or a relay optical system) allows the light as a plurality of parallel light beams to be incident on the light guiding plate. The requirement for the parallel light is on the basis of the fact that light wavefront information at the time of incidence of the light on the light guiding plate needs to be retained through the first deflecting unit and the second deflecting unit even after the light is emitted from the light guiding plate. In addition, in order to generate the plurality of parallel light beams, specifically, for example, a light emitting portion of the image forming device may be located, for example, at a point of a focal length in the parallel light emitting optical system. The parallel light emitting optical system has a function of converting position information of a pixel into angle information in the optical system of the optical device. As the parallel light emitting optical system, an optical system having an overall positive optical power formed by using one or a combination of a convex lens, a concave lens, a free curved surface prism, and a hologram lens may be exemplified. A light-blocking portion having an opening portion may be arranged between the parallel light emitting optical system and the light guiding plate so that undesired light emitted from the parallel light emitting optical system is not incident on the light guiding plate.

The light guiding plate has two parallel planes (first plane and second plane) extending in parallel to an axial line (the longitudinal direction and the horizontal direction and corresponding to the X axis) of the light guiding plate. In addition, the width direction (the height direction and the vertical direction) of the light guiding plate corresponds to the Y axis. When the plane of the light guiding plate which the light is incident one is denoted by a light-guiding-plate light incident plane and the plane of the light guiding plate which emits the light is denoted by a light-guiding-plate light emitting plane, the light-guiding-plate light incident plane and the light-guiding-plate light emitting plane may be configured with the first plane, the light-guiding-plate light incident plane may be configured with the first plane, or the light-guiding-plate light emitting plane may be configured with the second plane. The interference fringe of the diffraction grating member extends substantially in parallel to the Y axis. As a material constituting the light guiding plate, a glass including an optical glass such as quartz glass or BK7 and a plastic material (for example, PMMA, a polycarbonate resin, an acrylic resin, a non-crystalline polypropylene-based resin, or a styrene resin including an AS resin) may be exemplified. The shape of the light guiding plate is not limited to a flat plate, but the light guiding plate may have a curved shape.

In the display apparatus or the like of the present disclosure, a light blocking member which blocks external light from being incident on the optical device may be configured to be arranged in the region of the optical device which the light emitted from the image forming device is incident on. The light blocking member which blocks external light from being incident on the optical device is arranged in the region of the optical device which the light emitted from the image forming device is incident on, and thus, although an incident light amount of the external light is changed due to the operation of the dimming device, since the external light is not incident on the region of the optical device which the light emitted from the image forming device is incident on, there is no deterioration in image display quality of the display apparatus due to generation of undesired stray light or the like. In addition, it is preferable that the region of the optical device which the light emitted from the image forming device is incident on is embodied to be included in the projection image of the light blocking member on the optical device.

The light blocking member may be configured to be arranged in a side opposite to the side where the image forming device of the optical device is arranged to be separated from the optical device. In the display apparatus of such a configuration, the light blocking member may be fabricated with, for example, a non-transparent plastic material. Such a light blocking member may be embodied to extend integrally from the casing of the image display device, to be attached to the casing of the image display device, to extend integrally from the frame, or to be attached to the frame. Alternatively, the light blocking member may be configured to be arranged in a portion of the optical device in a side opposite to the side where the image forming device is arranged. The light blocking member may be configured to be arranged in the dimming device. In addition, the light blocking member configured with a non-transparent material may be formed on the surface of the optical device, for example, on the basis of a physical vapor deposition method (PVD method) or a chemical vapor deposition method (CVD method), may be formed by a printing method or the like, may be adhered with a film, a sheet, or a foil configured with a non-transparent material (a plastic material, a metal material, an alloy material, or the like). It is preferable that a projection image of an end portion of the dimming device on the optical device is configured to be included in a projection image of the light blocking member on the optical device.

In the display apparatus or the like of the present disclosure, as described above, the frame may be configured to include a front portion disposed on an observer's front and two temple portions pivotally attached via hinges to two ends of the front portion. In addition, a modern portion is attached to the distal end of each temple portion. Although the image display device is attached to the frame, specifically, for example, the image forming device may be attached to the temple portions. In addition, the front portion and the two temple portions may be configured integrally. Namely, as the entire of the display apparatus or the like of the present disclosure is viewed, the frame has substantially the same as that of typical glasses. The material constituting the frame including the pad portions may be configured with the same material as that constituting the typical glass such as a metal, an alloy, a plastic, or a combination thereof. Furthermore, in a configuration, nose pads may be attached to the front portion. Namely, as the display apparatus or the like of the present disclosure is viewed overall, the assembly of the frame (including the rim) and the nose pads has substantially the same structure as typical glasses. The nose pad may also have well-known configurations and structures.

In addition, in the display apparatus or the like of the present disclosure, in terms of design or mounting easiness, it is preferable that a wire line (a signal line, a power line, or the like) from one or two image forming devices is embodied to pass through the inner portions of the temple portion and the modern portion and extend from the distal end of the modern portion to the outside to be connected to a control device (a control circuit or a control unit). Furthermore, each image forming device may be embodied to have a headphone portion, and a wire line for the headphone portion from each image forming device may be embodied to pass through the inner portions of the temple portion and the modern portion and extend from the distal end of the modern portion to the headphone portion. As a headphone portion, for example, an earbud-type headphone portion or a canal-type headphone portion may be exemplified. More specifically, in an embodiment, it is preferable that the wire line for the headphone portion extends from the distal end of the modern portion to the headphone portion so as to wrap around the back side of the auricle (concha). In addition, in an embodiment, an imaging device may be attached to the central portion of the front portion. Specifically, the imaging device is configured to include a solid-state imaging element configured with, for example, a CCD or CMOS sensor and a lens. The wire line from the imaging device may be connected through, for example, the front portion to the one image display device (or the image forming device), and furthermore, the wire line may be included in the wire line extending from the image display device (or the image forming device).

For example, a head mounted display (HMD) can be configured by the display apparatus or the like of the present disclosure. In addition, by doing so, a light-weighted, small-sized display apparatus can be implemented, and at the time of mounting the display apparatus, discomfort can be greatly reduced.

Furthermore, production cost can be reduced. Alternatively, the display apparatus or the like of the present disclosure may be applied to a head up display (HUD) provided to a cockpit or the like of a vehicle or an airplane. Specifically, in an HUD where the virtual image forming region where the virtual image is formed on the basis of the light emitted from the image forming device is provided to the windshield of the cockpit or the like of the vehicle or the airplane, or in an HUD where a combiner having the virtual image forming region where the virtual image is formed on the basis of the light emitted from the image forming device is provided to the windshield of the cockpit or the like of a vehicle or an airplane, the virtual image forming region or the combiner may be configured to overlap with at least a portion of the dimming device.

Example 1

Figure 1B:
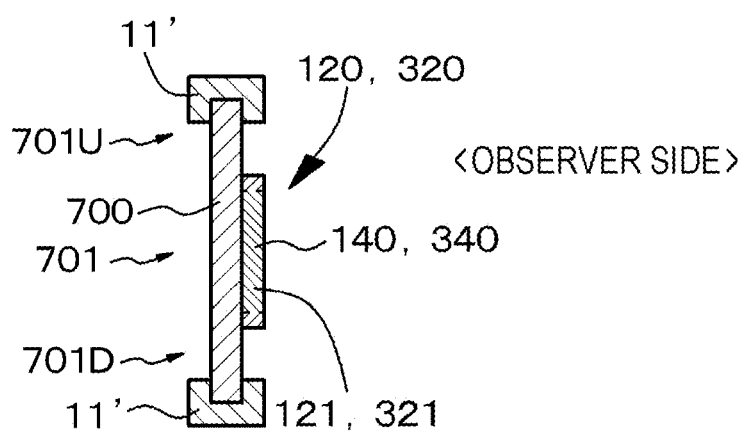
FIG. 1B is a schematic cross-sectional diagram of the optical device and the dimming device taken along line B-B of FIG. 1A.
Figure 3A:
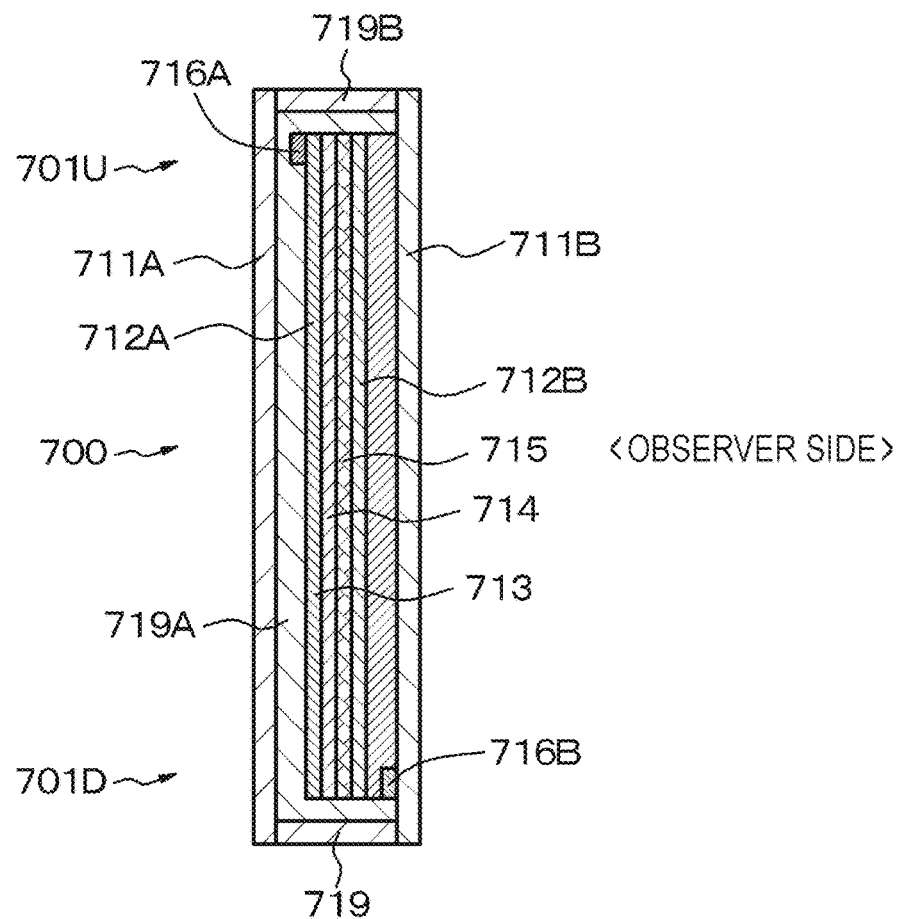
FIG. 3A is a schematic diagram illustrating of the dimming device in the display apparatus of Example 1 similarly taken along line B-B of FIG. 1.
Figure 3B:
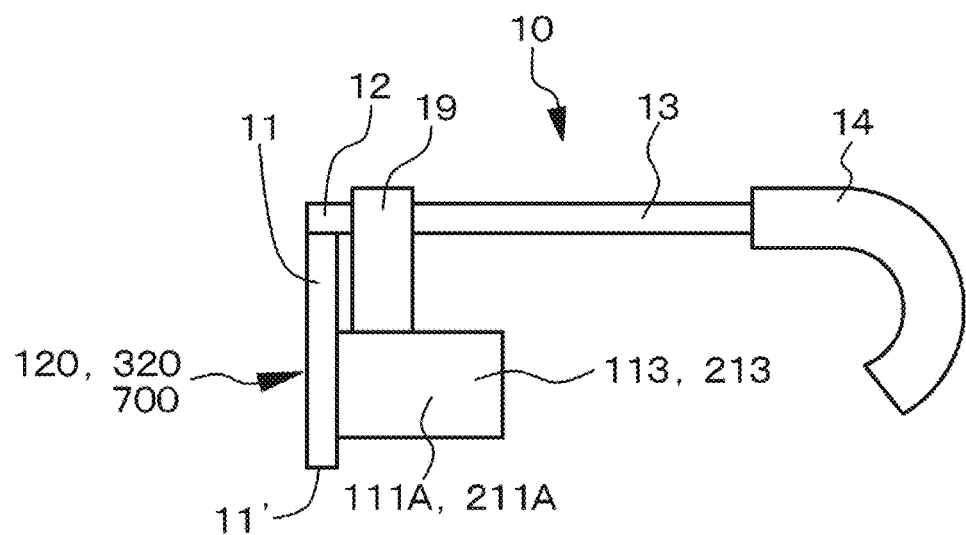
FIG. 3B is a schematic side diagram of the display apparatus of Example 1.
Figure 4A:
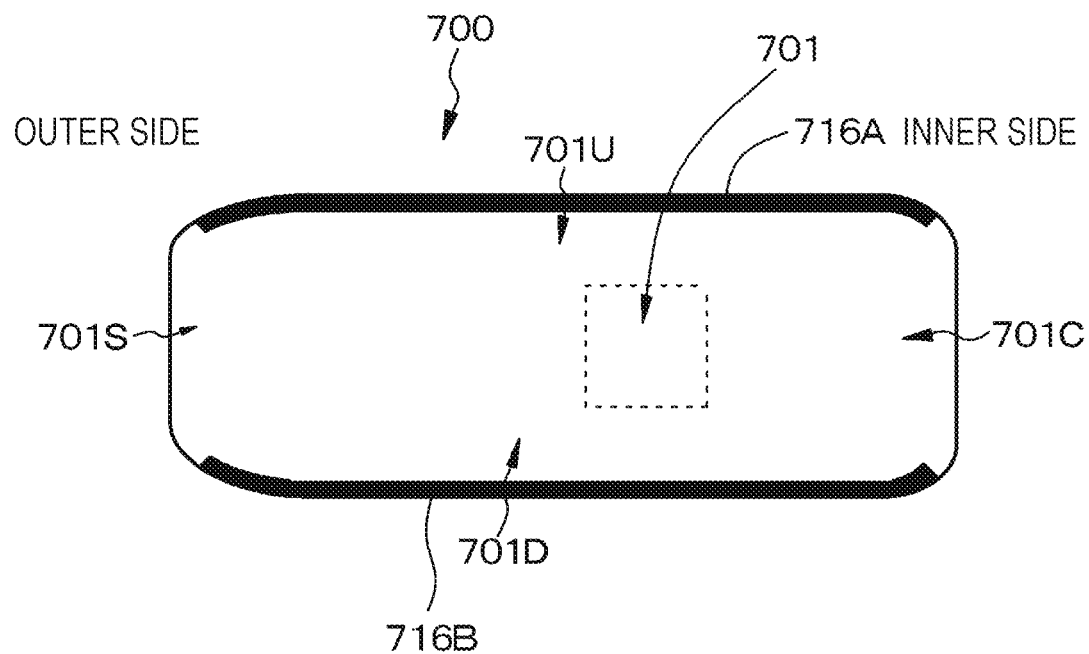
FIG. 4A is a schematic front diagram of the dimming device before operation in the display apparatus of Example 1.
Figure 4B:
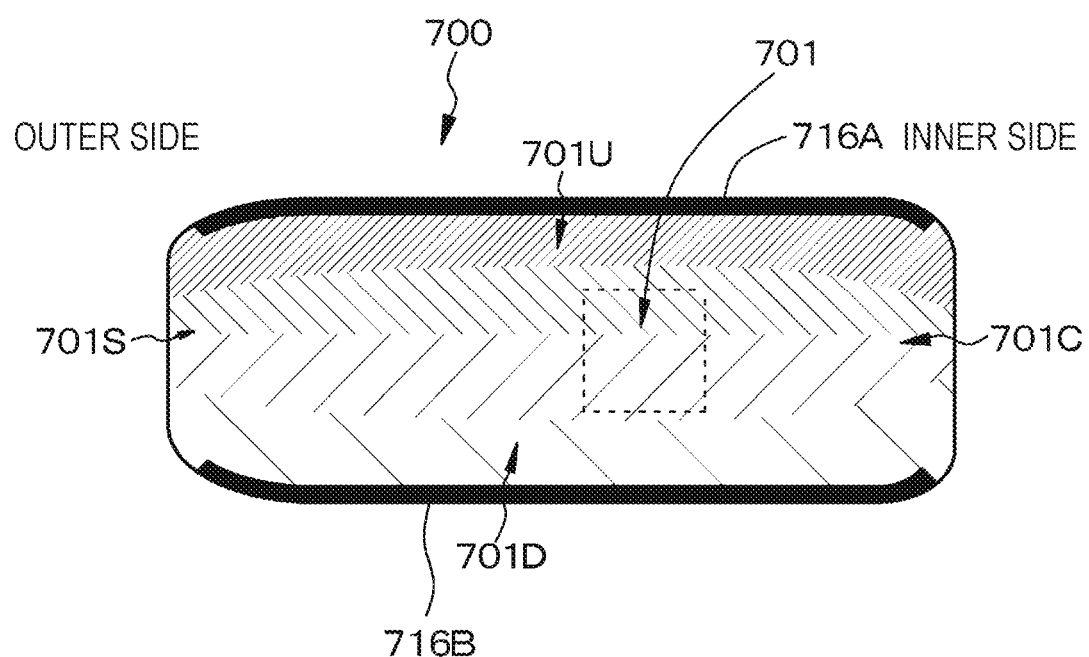
FIG. 4B is a schematic front diagram of the dimming device after operation.
Figure 5:
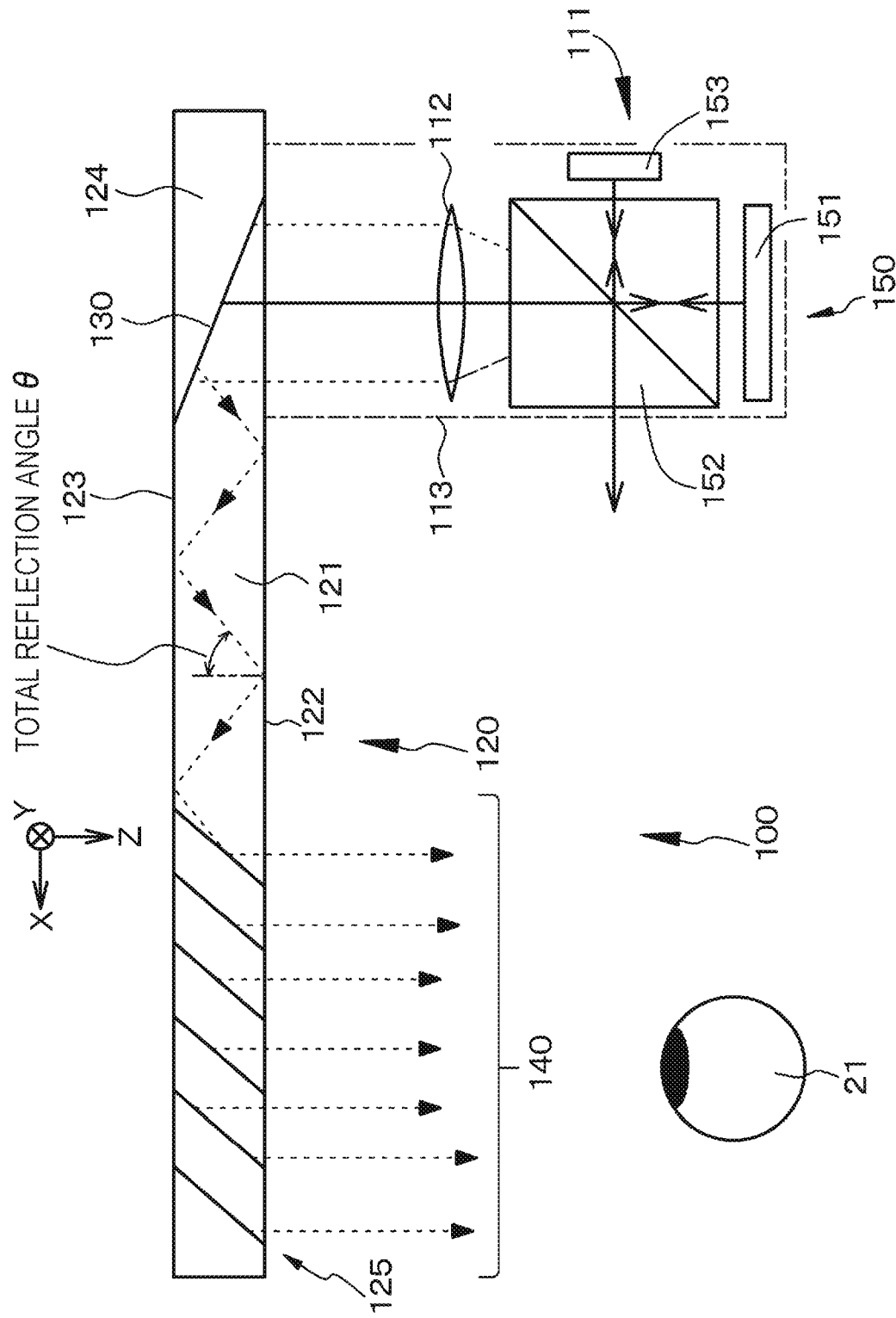
FIG. 5 is a conceptual diagram of an image display device in the display apparatus of Example 1.
Figure 6:
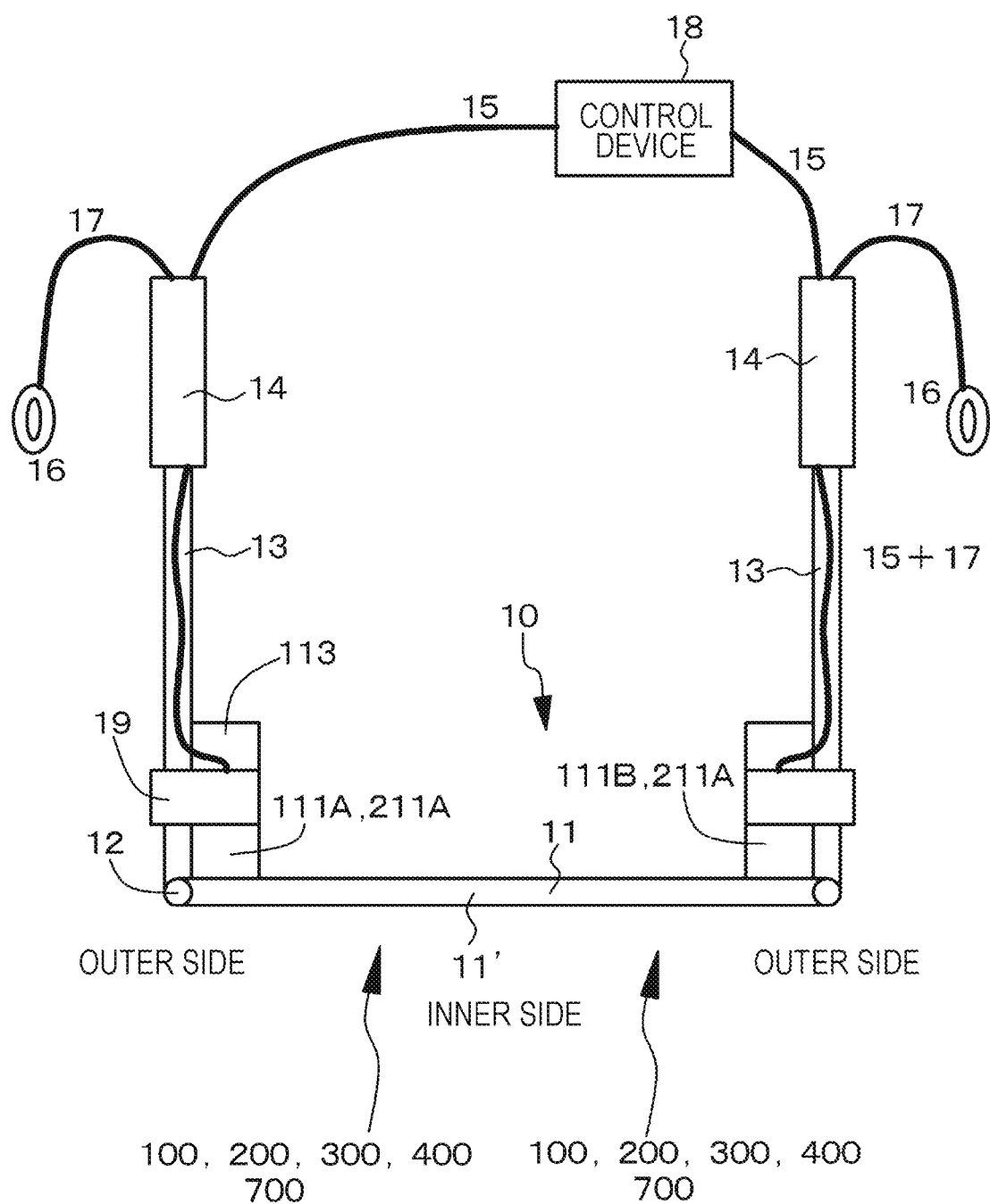
FIG. 6 is a schematic diagram of the display apparatus of Example 1 as viewed from the upper side.
Figure 10A:
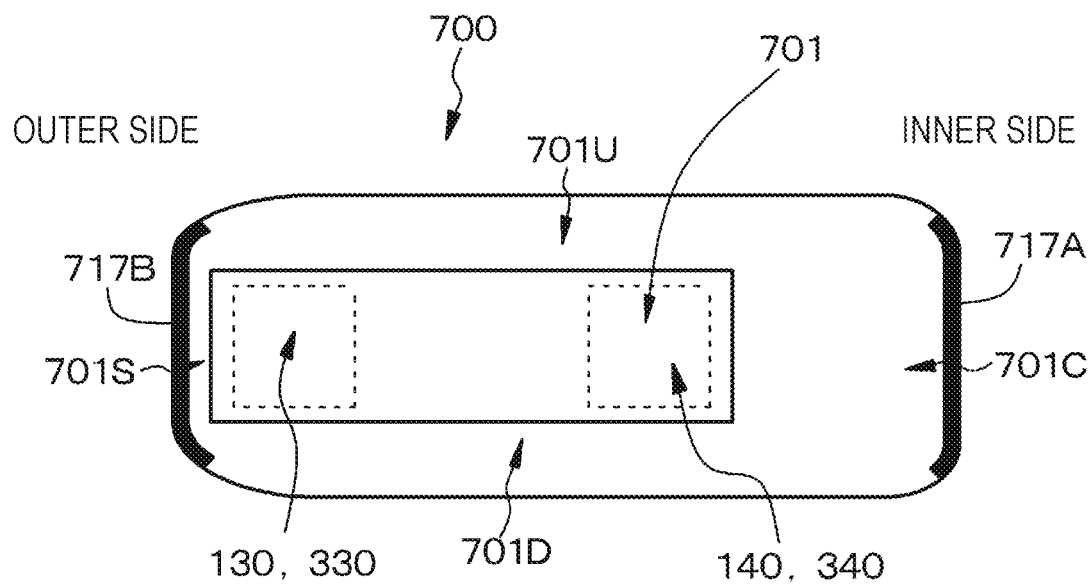
FIG. 10A is a schematic front diagram of a dimming device before operation in a display apparatus of Example 2.
Figure 10B:
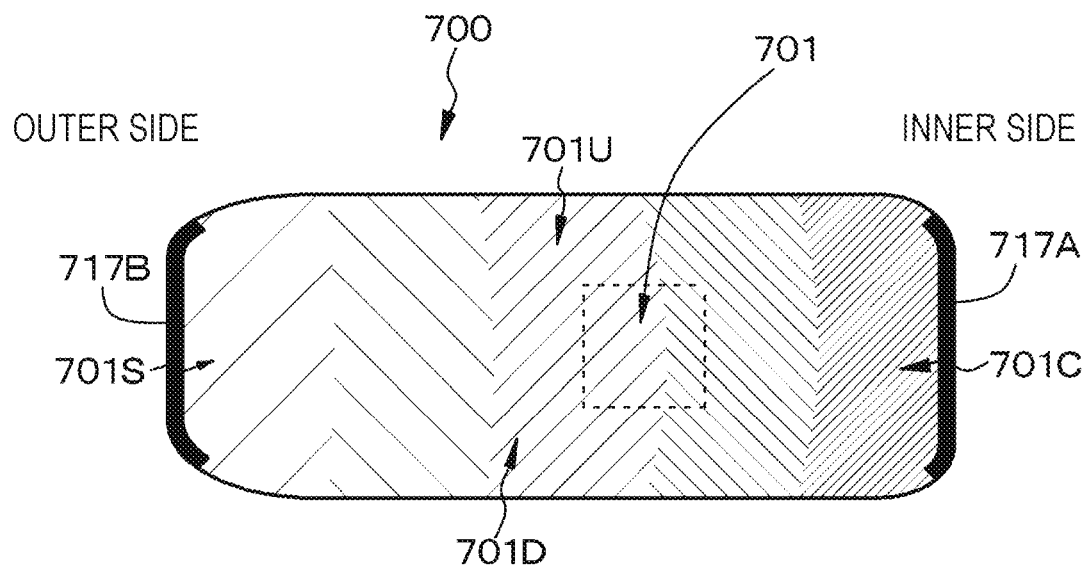
FIG. 10B is a schematic front diagram of a dimming device after operation.
Figure 11A:
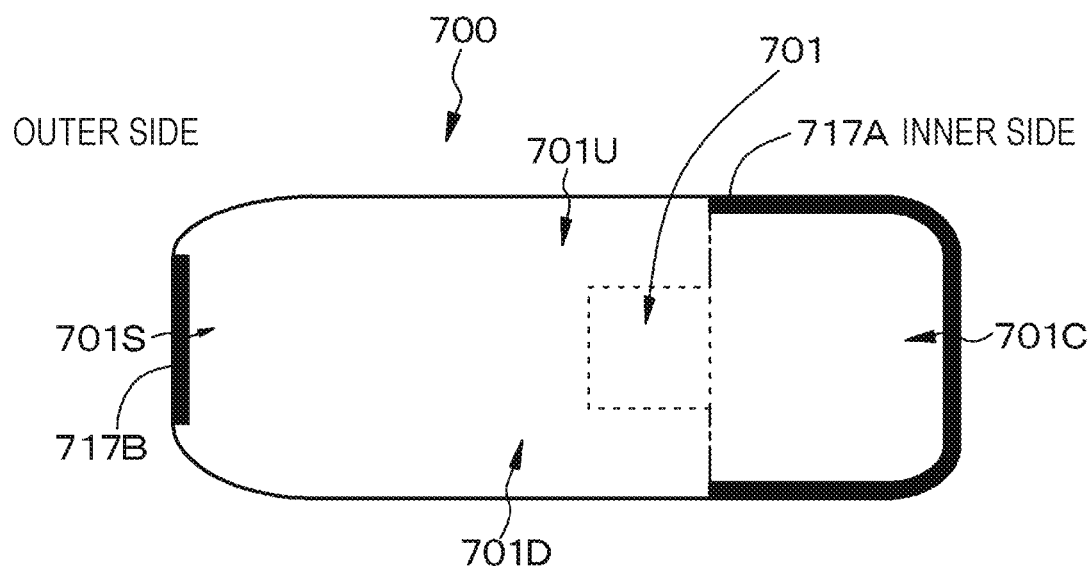
FIGS. 11A and 11B are schematic front diagrams of a modified example of the dimming device in the display apparatus of Example 2.
Figure 11B:
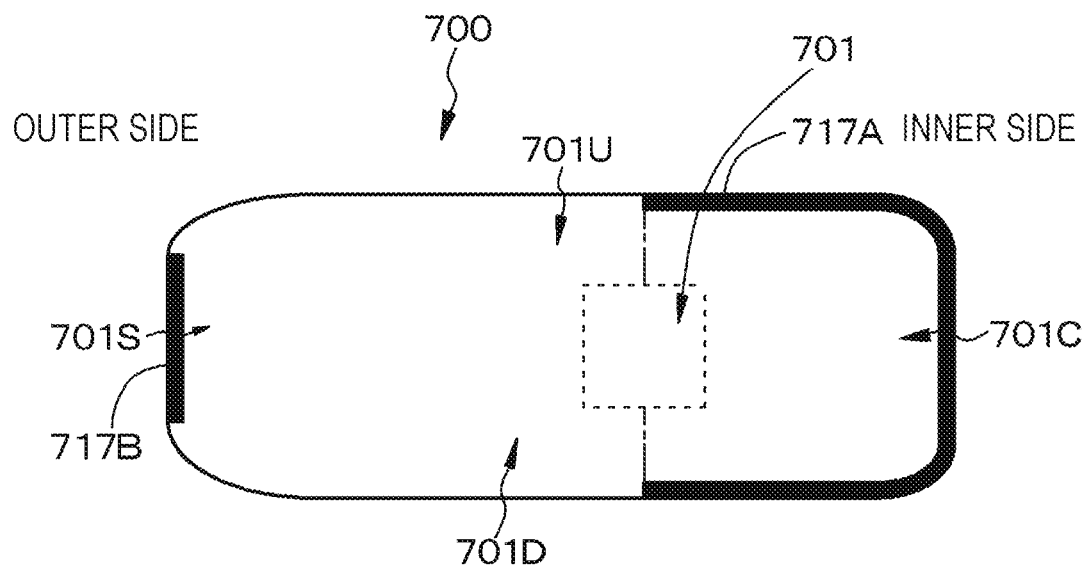

Example 1 relates to the display apparatus according to the first and second aspects of the present disclosure (specifically, a head mounted display: HMD), and specifically, relates to the display apparatus of the first embodiment including the optical device of the first structure (more specifically, the optical device of the first-A structure) and the image forming device of the first configuration. A schematic front diagram of the optical device and the dimming device (for right eye) of the display apparatus of Example 1 is illustrated in FIG. 1A; a schematic cross-sectional diagram taken along line B-B of FIG. 1A is illustrated in FIG. 1B; a schematic cross-sectional diagram of the dimming device similarly taken along line B-B of FIG. 1A is illustrated in FIG. 3A; and a schematic side diagram of the display apparatus (mainly for right eye) as the display apparatus is viewed from the left eye side is illustrated in FIG. 3B. In addition, a schematic front diagram of the dimming device of the display apparatus of Example 1 before operation is illustrated in FIG. 4A, and a schematic front diagram of the dimming device during the operation is illustrated in FIG. 4B. Furthermore, a conceptual diagram of the image display device of the display apparatus of Example 1 is illustrated in FIG. 5, and a schematic diagram as the display apparatus of Example 1 is viewed from the upper side is illustrated in FIG. 6. In addition, in FIG. 4B or the later-described FIG. 10B, as a region has a higher light blocking ratio of the dimming device, the region is schematically illustrated by providing finer slant lines. In addition, in actual cases, the light blocking ratio is not changed stepwise as schematically illustrated in FIG. 4B and FIG. 10B, but the light blocking ratio is gradually changed. Namely, the dimming device is in a state that color gradation is provided. However, the light blocking ratio may be configured to be changed stepwise according to arrangement state or shape of the electrodes or the transparent electrodes. Namely, the dimming device may be in a state that color is changed stepwise.

The display apparatus of Example 1 or the later-described Examples 2 to 11 is configured to include (A) a frame 10 mounted on an observer's head, (B) an image display device 100, 200, 300, 400, 500 attached to the frame 10, and (C) a dimming device 700 adjusting a light amount of external light being incident from an external portion. In addition, although the display apparatus of the example is configured specifically as a binocular type having two image display devices, the display apparatus may be configured as a uniocular type having one image display device. In addition, the image forming device 111, 211 displays a mono-colored image.

In addition, the image display device 100, 200, 300, 400, 500 of Example 1 or the later-described Examples 2 to 11 is configured to include (a) an image forming device 111, 211, and (b) an optical device 120, 320, 520 having a virtual image forming region where a virtual image is formed on the basis of light emitted from the image forming device 111, 211. Furthermore, the image display device 100, 200, 300, 400 of Example 1 or the later-described Examples 2 to 6 and Examples 8 to 11 is configured to include (c) an optical system (parallel light emitting optical system) 112, 254 converting the light emitted from the image forming device 111, 211 to parallel light, wherein, light flux formed as the parallel light in the optical system 112, 254 is incident on the optical device 120, 320 to be guided and emitted.

The optical device 120, 320 of Example 1 or the later-described Examples 2 to 6 and Examples 8 to 11 has the first structure and is configured to include (b-1) a light guiding plate 121, 321 allowing the light incident from the image forming device 111, 211 to propagate through an inner portion thereof by total reflection and, after that, to emit toward an observer, (b-2) a first deflecting unit 130, 330 deflecting the light incident on the light guiding plate 121, 321 so that the light incident on the light guiding plate 121, 321 is totally reflected by the inner portion of the light guiding plate 121, 321, and (b-3) a second deflecting unit 140, 340 deflecting, several times, the light propagating through the inner portion of the light guiding plate 121, 321 in order to emit the light propagating through the inner portion of the light guiding plate 121, 321 from the light guiding plate 121, 321. In addition, the virtual image forming region of the optical device is configured by the second deflecting unit 140, 340. In addition, the second deflecting unit (virtual image forming region) 140, 340 is located in the projection image of the dimming device 700. Furthermore, the second deflecting unit 140, 340 is covered with the one of the substrates constituting the dimming device 700. The optical device 120, 320 is of a see-through type (transflective type).

Alternatively, if described in accordance with the display apparatus according to the second aspect of the present disclosure, the display apparatus of Example 1 is configured to include (A) a frame 10 mounted on an observer's head (B) an image display device 100, 200, 300, 400, 500 attached to the frame 10, and (C) a dimming device 700 adjusting a light amount of external light being incident from an external portion. In addition, the image display device 100, 200, 300, 400, 500 is configured to include (a) an image forming device 111, 211, and (b) an optical device 120, 320, 520 having a virtual image forming region where a virtual image is formed on the basis of light emitted from the image forming device 111, 211. Furthermore, the dimming device 700 is configured to include a first substrate 711A, a second substrate 711B facing the first substrate 711A, a first transparent electrode 712A provided on a facing surface of the first substrate 711A facing the second substrate 711B, a second transparent electrode 712B provided on a facing surface of the second substrate 711B facing the first substrate 711A, a first electrode 716A, 717A, 718A formed to be in contact with a portion of the first transparent electrode 712A, a second electrode 716B, 717B, 718B formed to be in contact with a portion of the second transparent electrode 712B, and a dimming layer interposed between the first transparent electrode 712A and the second transparent electrode 712B. Herein, the optical device 120, 320, 520 overlaps with at least a portion of the dimming device 700, and a projection image 716A, 717A, 718A of the first electrode on the first substrate 711A and a projection image of the second electrode 716B, 717B, 718B on the first substrate 711A do not overlap with each other. In addition, a projection image of the virtual image forming region (second deflecting unit 140, 340) on the first substrate 711A is located between the projection image 716A, 717A, 718A of the first electrode on the first substrate 711A and the projection image of the second electrode 716B, 717B, 718B on the first substrate 711A.

Herein, in Example 1, the first deflecting unit 130 and the second deflecting unit 140 are arranged in the light guiding plate 121. Therefore, the first deflecting unit 130 reflects the light incident on the light guiding plate 121, and the second deflecting unit 140 transmits and reflects, several times, the light propagating through the inner portion of the light guiding plate 121 by total reflection. Namely, the first deflecting unit 130 functions as a reflecting mirror, and the second deflecting unit 140 functions as a transflective mirror. More specifically, the first deflecting unit 130 provided in the inner portion of the light guiding plate 121 is configured with a light reflecting film (a kind of a mirror) which is made of aluminum (Al) and reflects the light incident on the light guiding plate 121. On the other hand, the second deflecting unit 140 provided in the inner portion of the light guiding plate 121 is configured with multi-layer stacked structure where a plurality of dielectric stacked films are stacked. The dielectric stacked film is configured with, for example, a $TiO_2$ film as a high dielectric material and a $SiO_2$ film as a low dielectric material. A multi-layer stacked structure where a plurality of dielectric stacked films are stacked is disclosed in Japanese Patent Application National Publication (Laid-Open) No. 2005-521099. Six layers of dielectric stacked films are illustrated in the drawings, but the present disclosure is not limited thereto. A thin piece configured to the same material as the material constituting the light guiding plate 121 is interposed between the dielectric stacked films. In addition, in the first deflecting unit 130, the parallel light incident on the light guiding plate 121 is reflected (or diffracted) so that the parallel light incident on the light guiding plate 121 is totally reflected in the inner portion of the light guiding plate 121. On the other hand, in the second deflecting unit 140, the parallel light propagating through the inner portion of the light guiding plate 121 by total reflection is, several times, reflected (or diffracted), so that the parallel light is emitted toward the observer's pupils 21 in the state of the parallel light from the light guiding plate 121.

With respect to the first deflecting unit 130, a slant plane where the first deflecting unit 130 is to be formed may be provided in the light guiding plate 121 by cutting a portion 124 where the first deflecting unit 130 of the light guiding plate 121 is to be provided, a light reflecting film may be deposited in vacuum on the associated slant plane, and after that, the cut portion 124 of the light guiding plate 121 may be adhered to the first deflecting unit 130. In addition, the second deflecting unit 140 may be fabricated by manufacturing a multi-layer stacked structure where multiple layers of the same material (for example, glass) as the material constituting the light guiding plate 121 and the dielectric stacked film (for example, the film may be formed in a vacuum deposition method) are stacked, forming a slant plane by cutting a portion 125 where the second deflecting unit 140 of the light guiding plate 121 is provided, adhering the multi-layer stacked structure to the associated slant plane, and performing polishing and the like to smoothen the outline. By doing so, the optical device 120 where the first deflecting unit 130 and the second deflecting unit 140 are provided in the light guiding plate 121 can be obtained.

Herein, in Example 1, the later-described Examples 2 to 6, or Examples 8 to 11, the light guiding plate 121, 321 configured with an optical glass or a plastic material is configured to include two parallel planes (first plane 122, 322 and second plane 123, 323) which extend in parallel to the light propagating direction (X axis) by internal total reflection of the light guiding plate 121, 321. The first plane 122, 322 and the second plane 123, 323 face each other. In addition, the parallel light is incident from the first plane 122, 322 corresponding to the light incident plane and propagates through the inner portion by total reflection, and after that, the parallel light is emitted from the first plane 122, 322 corresponding to the light emitting plane. However, the present disclosure is not limited thereto, but the light incident plane may be configured with the second plane 123, 323, and the light emitting plane may be configured with the first plane 122, 322.

In the Example 1 or the later-described Example 5, the image forming device 111 is the image forming device of the first configuration and has a plurality of pixels arrayed in a two dimensional matrix shape. Specifically, the image forming device 111 is configured to include a reflection type spatial light modulator 150 and a light source 153 configured with a light emitting diode emitting white light. The entire image forming device 111 may be accommodated in the casing 113 (in FIG. 5, indicated by a one-dot dashed line), and an opening portion (not shown) is provided to the associated casing 113, so that the light is emitted from the optical system (a parallel light emitting optical system, a collimating optical system) 112 through the opening portion. The reflection type spatial light modulator 150 is configured to include a liquid crystal display apparatus (LCD) 151 configured with an LCOS as a light valve and a polarized beam splitter 152 which reflects a portion of the light from the light source 153 to guide the light to the liquid crystal display apparatus 151 and passes a portion of the light reflected by the liquid crystal display apparatus 151 to guide the light to the optical system 112. The liquid crystal display apparatus 151 has a plurality (for example, 640×480) of pixels (liquid crystal cells) which are arrayed in a two-dimensional matrix shape. The polarized beam splitter 152 has well-known configurations and structures. The unpolarized light emitted from the light source 153 collides with the polarized beam splitter 152. The P-polarized light component passes through the polarized beam splitter 152 to be emitted to the outside of the system. On the other hand, the S-polarized light component is reflected on the polarized beam splitter 152 to be incident on the liquid crystal display apparatus 151 and is reflected in the inner portion of the liquid crystal display apparatus 151 to be emitted from the liquid crystal display apparatus 151. Herein, among the light beams which are emitted from the liquid crystal display apparatus 151, a large amount of the P-polarized light component is included in the light emitted from the pixels displaying "white", and a large amount of the S-polarized light component is included in the light emitted from the pixels displaying "black". Therefore, among the light beams which are emitted from the liquid crystal display apparatus 151 and collide with the polarized beam splitter 152, the P-polarized light component passes through the polarized beam splitter 152 to be guided to the optical system 112. On the other hand, the S-polarized light component is reflected on the polarized beam splitter 152 to be returned to the light source 153. The optical system 112 is configured with, for example, a convex lens, and in order to generate parallel light, an image forming device 111 (more specifically, a liquid crystal display apparatus 151) is arranged at a point (position) of a focal length of the optical system 112.

The frame 10 is configured to include a front portion 11 disposed on the observer's front, two temple portions 13 pivotally attached via hinges 12 to two ends of the front portion 11, and modern portions (referred to as tip cells, ear piece, or ear pads) 14 which are attached to the distal ends of the temple portions 13. In addition, nose pads (not shown) are attached. Namely, an assembly of the frame 10 and the nose pads basically has substantially the same structure as that of typical glasses. Furthermore, each casing 113 is detachably attached to the temple portion 13 by an attachment member 19. The frame 10 is fabricated by using a metal or a plastic. In addition, each casing 113 may be non-detachably attached to the temple portion 13 by the attachment member 19. In addition, although each casing 113 is attached to the inner side of the temple portion 13, each casing may be attached to the outer side of the temple portion 13.

Furthermore, a wire line (a signal line, a power line, and the like) 15 extending from the one image forming device 111A passes through the inner portions of the temple portion 13 and the modern portion 14 and extends from the distal end of the modern portion 14 to the outside to be connected to the control device (control circuit, control unit) 18. Furthermore, each image forming device 111A, 111B has a headphone portion 16, and a wire line 17 for the headphone portion extending from each image forming device 111A, 111B passes through the inner portions of the temple portion 13 and the modern portion 14 and extends from the distal end of the modern portion 14 to the headphone portion 16. More specifically, the wire line 17 for the headphone portion extends from the distal end of the modern portion 14 to the headphone portion 16 so as to wrap around the back side of the auricle (concha). According to such a configuration, a neat display apparatus can be achieved without giving an impression that the headphone portions 16 and the wire lines 17 for the headphone portions are randomly arranged.

Figure 2A:
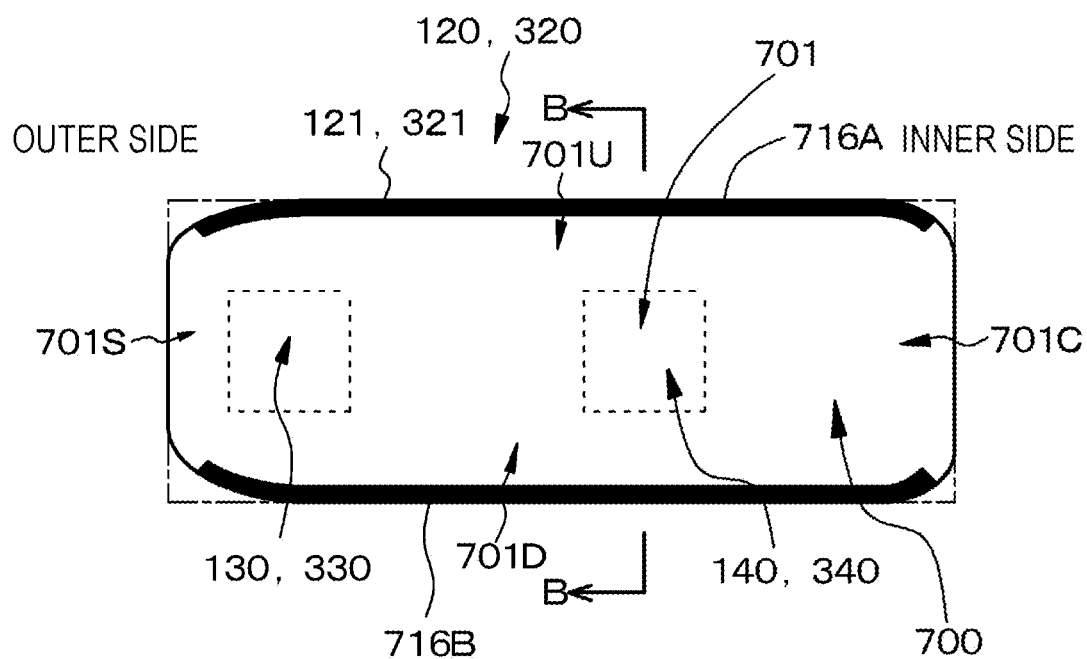
FIG. 2A is a schematic front diagram of an optical device and a dimming device of a modified example of the display apparatus of Example 1.
Figure 2B:
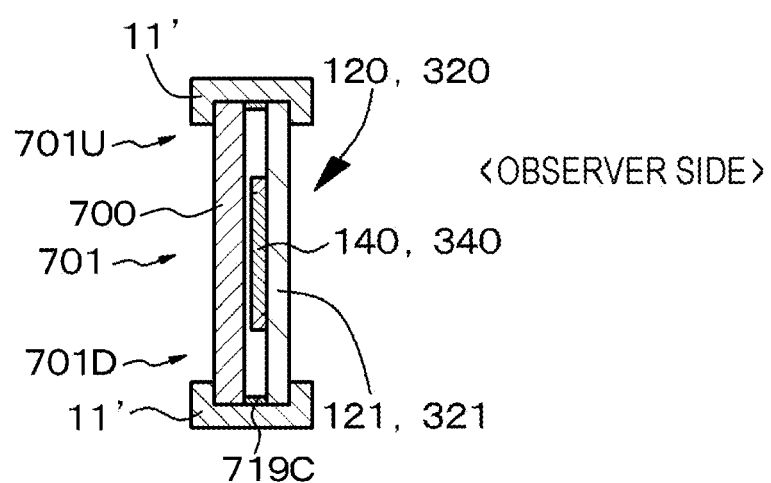
FIG. 2B is a schematic cross-sectional diagram of the optical device and the dimming device taken along line B-B of FIG. 2A.

In Example 1 or the later-described Examples 2 to 11, the optical device 120, 320, 520 overlaps with at least a portion of the dimming device 700 which is a kind of an optical shutter. Specifically, in the examples illustrated in FIGS. 1A and 1B, the optical device 120, 320, 520 overlaps with a portion of the dimming device 700. However, but not limited thereto, the optical device 120, 320, 520 may overlap with the dimming device 700. Namely, the outer shape of the optical device 120, 320, 520 (more specifically, the light guiding plate 121, 321 constituting the optical device) or the light guiding member 602, 612, 622 may be configured to be the same as the outer shape of the dimming device 700. A schematic front diagram of the optical device and the dimming device in such an embodiment (namely, a modified example of the display apparatus of Example 1) is illustrated in FIG. 2A, and a schematic cross-sectional diagram of the optical device and the dimming device taken along line B-B of FIG. 2A is illustrated in FIG. 2B. In the modified example, a gap is provided between the dimming device 700 and the light guiding plate 121, 321, and the dimming device 700 and the light guiding plate 121, 321 are bonded at the outer peripheral portion by an adhesive 719C. In Examples described hereinafter, similar configuration may be provided. In addition, by doing so, the outer edge of the light guiding plate 121, 321 is concealed by the later-described rim 11', so that the outer edge of the light guiding plate 121, 321 cannot be visually recognized.

Herein, an observer's nose side is referred to as an inner side; an observer's ear side is referred to as an outer side; a region of the dimming device 700 facing the virtual image forming region of the optical device (second deflecting unit 140, 340) is referred to as a virtual image forming region facing region 701; a region of the dimming device 700 located to be upper than the virtual image forming region facing region 701 is referred to as an upper region 701U; a region of the dimming device 700 located to be lower than the virtual image forming region facing region 701 is referred to as a lower region 701D; a region of the dimming device 700 located to be inner than the virtual image forming region facing region 701 is referred to as an inner region 701C; and a region of the dimming device 700 located to be outer than the virtual image forming region facing region 701 is referred to as an outer region 701S. A connector (not shown) is connected to the dimming device 700, and the dimming device 700 is electrically connected through the connector and a wire line to a control circuit (specifically, a control device 18) for controlling the light blocking ratio of the dimming device 700.

In addition, in the display apparatus of Example 1, at the time of operation of the dimming device 700, the light blocking ratio of the dimming device is changed over a range of from the upper region 701U to the lower region 701D, and the virtual image forming region facing region 701 has a light blocking ratio higher than the light blocking ratio of the lower region 701D.

Herein, in the display apparatus of Example 1 or the later-described Examples 2 to 11, the dimming device 700 is provided to the front portion 11. In addition, the optical device 120, 320 is attached to the dimming device 700. The front portion 11 has a rime 11', and the dimming device 700 is fitted into the rim 11'. The later-described projection images of the first and second electrodes are included in a projection image of the rim 11'. Although the devices are arranged in the order of the optical device 120, 320 and the dimming device 700 from the observer side, the devices may be arranged in the order of the dimming device 700 and the optical device 120, 320.

In the display apparatus of Example 1 or the later-described Examples 2 to 11, as described above, the dimming device 700 is configured to include a first substrate 711A, a second substrate 711B facing the first substrate 711A, a first transparent electrode 712A provided on a facing surface of the first substrate 711A facing the second substrate 711B, a second transparent electrode 712B provided on a facing surface of the second substrate 711B facing the first substrate 711A, a first electrode 716A, 717A, 718A formed to be in contact with a portion of the first transparent electrode 712A, a second electrode 716B, 717B, 718B formed to be in contact with a portion of the second transparent electrode 712B, and a dimming layer interposed between the first transparent electrode 712A and the second transparent electrode 712B.

Further, the projection image of the first electrode 716A, 717A, 718A on the first substrate 711A and the projection image 716B, 717B, 718B of the second electrode on the first substrate 711A do not overlap with each other. The dimming device 700 is configured with an optical shutter utilizing color change of a substance generated by an oxidation-reduction reaction of an electrochromic material. Specifically, the dimming layer contains an electrochromic material. More specifically, the dimming layer has a stack structure of a $WO_3$ layer 713/a $Ta_2O_5$ layer 714/an $Ir_XSn_{1-X}O$ layer 715 from the first transparent electrode side. The $WO_3$ layer 713 emits color through reduction. Further, the $Ta_2O_5$ layer 714 constitutes the solid electrolyte and the $Ir_XSn_{1-X}O$ layer 715 emits color through oxidation. A protective layer 719A formed by a SiN layer, a $SiO_2$ layer, an $Al_2O_3$ layer, and a $TiO_2$ layer or a stacked film thereof is formed between the first transparent electrode 712A, the first electrode 716A, 717A, 718A, and the first substrate 711A. When the protective layer 719A is formed, it is possible to impart the ion blocking property of inhibiting ion immigration, the waterproof property, moisture-proof property, and scratch resistance to the dimming device. Further, the first substrate 711A and the second substrate 711B are sealed at the outer edges thereof by a sealing member 719B which is formed by an ultraviolet curable epoxy resin, an ultraviolet curable resin such as an epoxy resin that is cured by ultraviolet rays or heat, or a thermosetting resin. The first substrate 711A and the second substrate 711B are formed by a polyethylene naphthalate (PEN) resin, a polyether sulfone (PES) resin, a cycloolefin polymer (COP) resin, colorless and transparent polyimide resin, a TAC film, or a high transparent self-adhesive acrylic film, but the materials are not limited thereto. The first transparent electrode 712A and the second transparent electrode 712B which are formed by ITO are not patterned, and are so-called solid electrodes. Further, the first electrode 716A and the second electrode 716B which are patterned into a thin line shape are formed by metal materials such as nickel, copper, titanium, and an Al/Ni stacked structure. The dimming device 700 itself can be produced by a well-known method.

In the $Ir_XSn_{1-X}O$ layer 715, Ir and $H_2O$ are reacted with each other to exist as iridium hydroxide $Ir(OH)_n$. When a negative potential is applied to the first electrode 716A and a positive potential is applied to the second electrode 716B, the proton $H^+$ moves from the $Ir_XSn_{1-X}O$ layer 715 to the $Ta_2O_5$ layer 714, emission of an electron occurs toward the second transparent electrode 712B, and the subsequent oxidation reaction proceeds so that the $Ir_XSn_{1-X}O$ layer 715 is colored.

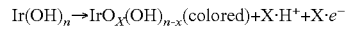

Meanwhile, the proton $H^+$ in the $Ta_2O_5$ layer 714 moves into the $WO_3$ layer 713, an electron is injected from the first transparent electrode 712A to the $WO_3$ layer 713, and in the $WO_3$ layer 713, the subsequent oxidation reaction proceeds so that the $WO_3$ layer 713 is colored.

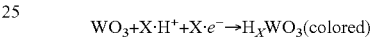

To the contrary, when a positive potential is applied to the first electrode 716A and a negative potential is applied to the second electrode 716B, in the $Ir_XSn_{1-X}O$ layer 715, the reduction reaction proceeds in the direction opposite to the above-described reaction direction, and the $Ir_XSn_{1-X}O$ layer 715 is discolored. In the $WO_3$ layer 713, the oxidation reaction proceeds in the direction opposite to the above-described reaction direction, and the $WO_3$ layer 713 is discolored. Incidentally, $H_2O$ is contained in the $Ta_2O_5$ layer 714, and when a voltage is applied to the first electrode and the second electrode, dissociation occurs. The proton $H^+$ and $OH^-$ ion state is included, and this contributes to coloration reaction and discoloration reaction.

In the display apparatus of Example 1 or the later-described Examples 2 to 11, the planar shapes of the virtual image forming region 140, 340 of the optical device and the virtual image forming region facing region 701 of the dimming device 700 are rectangles. In addition, the outer shape of the dimming device 700 is a quadrangle configured with four side segments, and vertexes of the quadrangle are rounded. However, the planar shape of the virtual image forming region 140, 340 of the optical device and the outer shape of the dimming device are not limited thereto. One side of the quadrangle constituting the outer shape of the dimming device 700 facing the upper side of the virtual image forming region facing region 701 is, for the convenience, referred to as an upper side of the dimming device; one side of the quadrangle constituting the outer shape of the dimming device 700 facing the lower side of the virtual image forming region facing region 701 is, for the convenience, referred to as a lower side of the dimming device; one side of the quadrangle constituting the outer shape of the dimming device 700 facing the lateral side of the inner side of the virtual image forming region facing region 701 is, for the convenience, referred to as an inner lateral side of the dimming device; and one side of the quadrangle constituting the outer shape of the dimming device 700 facing the lateral side of the outer side of the virtual image forming region facing region 701 is, for the convenience, referred to as an outer lateral side of the dimming device. In addition, the upper side and the lower side of the virtual image forming region facing region 701 extend in the horizontal direction (X axial direction), and the lateral side of the inner side and the lateral side of the outer side of the virtual image forming region facing region 701 extend in the vertical direction (Y axial direction).

In the display apparatus of Example 1, at the time of operation of the dimming device, a voltage higher than that of the first electrode 716A is applied to the second electrode 716B. In addition, the light blocking ratio of the dimming device is changed over a range of from the upper region 701U to the lower region 701D, and the virtual image forming region facing region 701 has a light blocking ratio higher than the light blocking ratios of the lower region 701D. The first electrode 716A is arranged in the upper region 701U, and the second electrode 716B is arranged in the lower region 701D. Specifically, the first electrode 716A is arranged along the upper side of the dimming device 700. The minimum value of the length of the first electrode 716A may be set to be a length corresponding to the length of the upper side of the virtual image forming region facing region 701, and as illustrated in FIG. 1A, the maximum value of the length of the first electrode 716A may be set to be the length of the upper side of the dimming device 700. On the other hand, the second electrode 716B is arranged in the lower region 701D, and specifically, the second electrode 716B is arranged in the lower side of the dimming device 700. The minimum value of the length of the second electrode 716B may be set to be a length corresponding to the length of the lower side of the virtual image forming region facing region 701, and as illustrated in FIG. 1A, the maximum value of the length of the second electrode 716B may be set to be the length of the lower side of the dimming device 700.

Since the dimming device is provided to the display apparatus of Example 1, high contrast can be exhibited to the virtual image observed by the observer, and furthermore, the observer using the display apparatus can surely recognize the external environment. In addition, the light blocking ratio of the dimming device is changed over a range of from the upper region to the lower region (in the later-described Example, the light blocking ratio is changed over a range of from the inner region to the outer region or changed over a range of from the upper region to the lower region and changed over a range of from the inner region to the outer region), and furthermore, the light blocking ratio of the lower region (in the later-described Example, the light blocking ratio of the outer region or of the lower region and the outer region) has a low value. Therefore, the observer using the display apparatus can surely visually recognize the feet (in the later-described Example, the side of the body or the feet and the side of the body), so that the observer can safely act in a real environment.

In addition, if a voltage is applied between the first electrode and the second electrode, a potential difference occurs between the first transparent electrode and the second transparent electrode. Herein, due to the potential gradient occurring in the transparent electrodes, the potential difference occurring between the first transparent electrode and the second transparent electrode is decreased as it is away from the first electrode. In addition, a small amount of leak current occurs between the first transparent electrode and the second transparent electrode. The phenomenon that the leak current occurs is prominent in the case where the dimming layer contains an electrochromic material. In addition, from such a result, only by optimizing the position and portion where the first electrode is provided and the position and portion where the second electrode is provided, specifically, by arranging the first electrode and the second electrode so that the projection image of the first electrode on the first substrate and the projection image of the second electrode on the first substrate do not overlap with each other, the light blocking ratio of the dimming device is changed over a range of from the upper region to the lower region, and the virtual image forming region facing region is in a state of having a light blocking ratio higher than the light blocking ratio of the lower region. Namely, despite very simple configurations and structures, the light blocking ratio of the dimming device can be surely changed over a range of from the upper region to the lower region, and the virtual image forming region facing region is in a state of having a light blocking ratio higher than the light blocking ratio of the lower region. In other words, the dimming device is in a state that color gradation is provided.

Figure 7A:
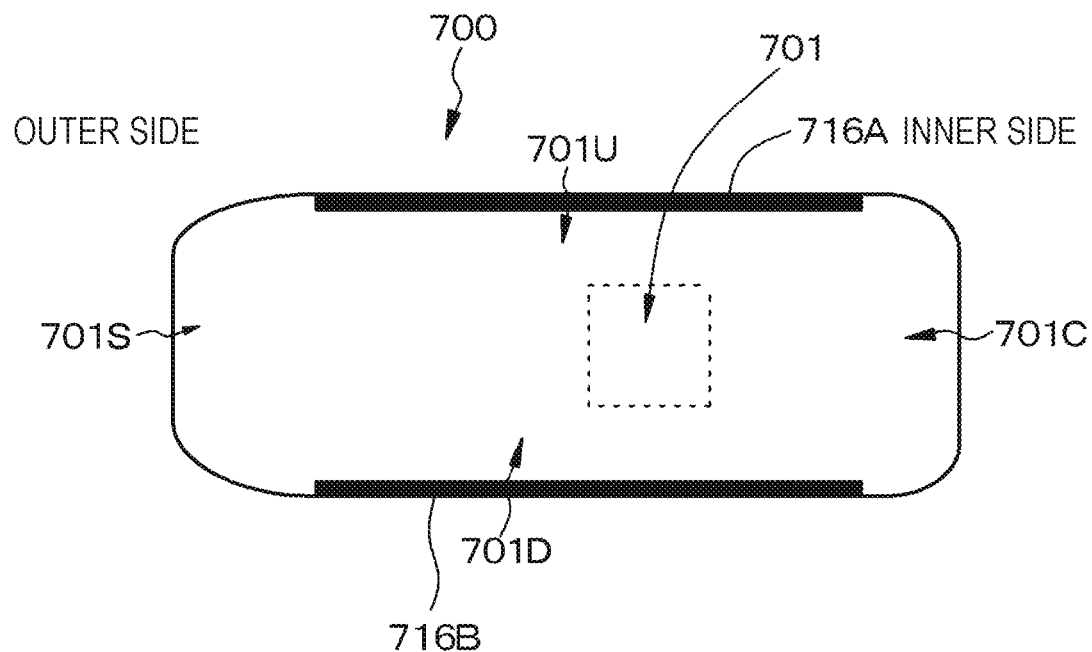
FIGS. 7A and 7B are schematic front diagrams of a modified example of the dimming device in the display apparatus of Example 1.
Figure 7B:
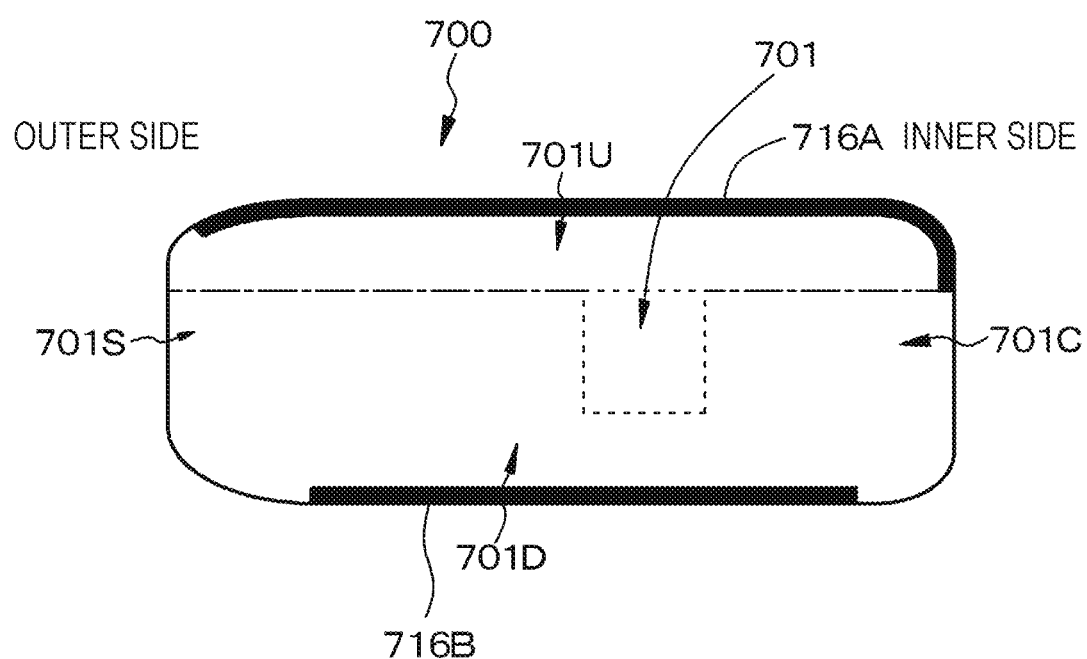

In addition, as illustrated in a schematic front diagram of FIG. 7A, the lengths of the first electrode 716A and the second electrode 716B may be smaller than the lengths of the upper side and the lower side of the dimming device 700. In addition, as illustrated in schematic front diagrams of FIGS. 7B, 8A, and 8B, the first electrode 716A may extend to the inner region 701C, and the first electrode 716A may be arranged along the inner lateral side of the dimming device 700. Herein, in the example illustrated in FIG. 7B, the distal end of the first electrode 716A extends to an extension line (in FIG. 7B, indicated by a one-dot dashed line) of the upper side of the virtual image forming region facing region 701. In the example illustrated in FIG. 8A, the distal end of the first electrode 716A extends through the bisecting point of the lateral side of the inner side of the virtual image forming region facing region 701 to a virtual line (in FIG. 8A, indicated by a one-dot dashed line) parallel to the upper side of the virtual image forming region facing region 701. In the example illustrated in FIG. 8B, the distal end of the first electrode 716A extends to an extension line (in FIG. 8B, indicated by a one-dot dashed line) of the lower side of the virtual image forming region facing region 701. As illustrated in a schematic front diagram of FIG. 9, the second electrode 716B may be configured to extend to the outer region 701S and may be arranged along the outer lateral side of the dimming device 700.

Example 2

Example 2 is a modification of Example 1 and relates to a display apparatus of the second embodiment including the optical device of the first-A structure and the image forming device of the first configuration. A schematic front diagram of the dimming device of the display apparatus of Example 2 before operation is illustrated in FIG. 10A, and a schematic front diagram of the dimming device during operation is illustrated in FIG. 10B. In the display apparatus of Example 2, the optical device 120, 320 overlaps with at least a portion of the dimming device 700. At the time of operation of the dimming device 700, the light blocking ratio of the dimming device 700 is changed over a range of from the inner region 701C to the outer region 701S, and the virtual image forming region facing region 701 has a light blocking ratio higher than the light blocking ratio of the outer region 701S.

Specifically, in the display apparatus of Example 2, at the time of operation of the dimming device 700, a voltage higher than that of the first electrode 717A is applied to the second electrode 717B, the light blocking ratio of the dimming device 700 is changed over a range of from the inner region 701C to the outer region 701S, and the virtual image forming region facing region 701 has a light blocking ratio higher than the light blocking ratio of the outer region 701S. In addition, the first electrode 717A is arranged in the inner region 701C, and the second electrode 717B is arranged in the outer region 701S. In the examples illustrated in FIGS. 10A and 10B, the first electrode 717A is arranged along the inner lateral side of the dimming device 700, and the length of the first electrode 717A is equal to the length of the inner lateral side of the dimming device 700. On the other hand, the second electrode 717B is arranged along the outer later side of the dimming device 700, and the length of the second electrode 717B is equal to the length of the outer lateral side of the dimming device 700.

The configurations and structures of the display apparatus of Example 2 have similar configurations and structures as the display apparatus described in Example 1 except for the above differences, and thus, detailed description thereof is omitted.

The first electrode 717A may be configured to extend to the upper region 701U; the first electrode 717A may be configured to extend to the lower region 701D; or the first electrode 717A may be configured to extend to the upper region 701U and the lower region 701D.

In the examples illustrated in schematic front diagrams of FIGS. 11A, 11B, 12A, and 12B, the first electrode 717A extends to the upper region 701U and the lower region 701D, and the first electrode 717A is arranged along the upper side and the lower side of the dimming device 700. In addition, in the example illustrated in FIG. 11A, the distal end of the first electrode 717A extends to an extension line (in FIG. 11A, indicated by a one-dot dashed line) of the lateral side of the inner side of the virtual image forming region facing region 701. In addition, in the example illustrated in FIG. 11B, the distal end of the first electrode 717A extends through the bisecting point of the upper side of the virtual image forming region facing region 701 to a virtual line (in FIG. 11B, indicated by a one-dot dashed line) parallel to the lateral side of the inner side of the virtual image forming region facing region 701. Furthermore, in the example illustrated in FIG. 12A, the distal end of the first electrode 717A extends to an extension line (in FIG. 12A, indicated by a one-dot dashed line) of the later side of the outer side of the virtual image forming region facing region 701. In addition, in the example illustrated in FIG. 12B, the distal end of the first electrode 717A extends over the extension line of the lateral side of the outer side of the virtual image forming region facing region 701. In addition, in the examples illustrated in FIGS. 11A, 11B, 12A, and 12B, the example where the first electrode 717A extends to the upper region 701U and the lower region 701D is illustrated, but the first electrode 717A may extend to the upper region 701U, or the first electrode 717A may extend to the lower region 701D. Although not shown, the second electrode 717B may be configured to extend to the lower region 701D.

Example 3

Figure 13A:
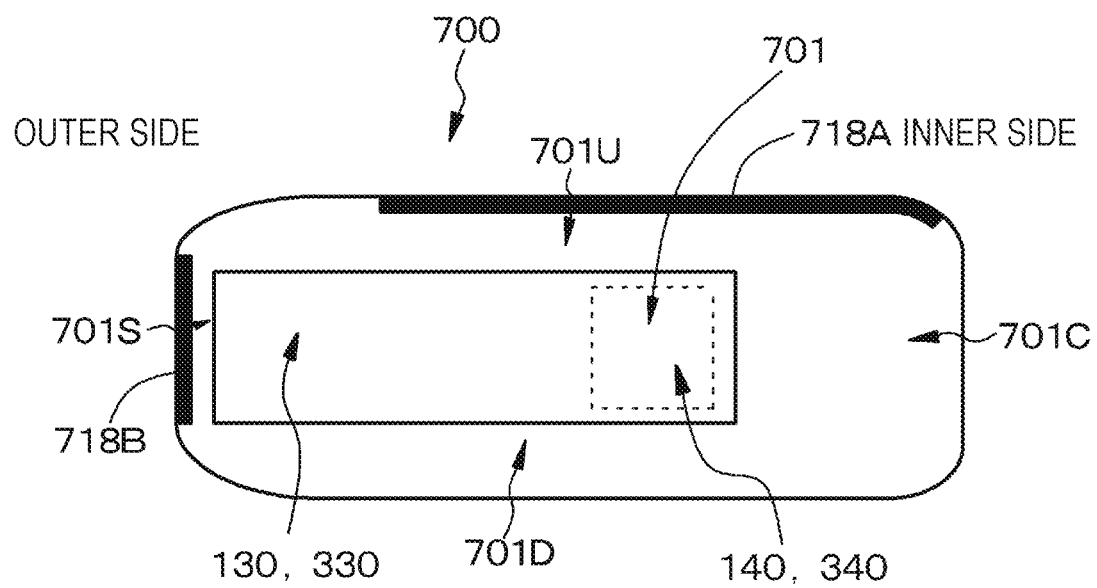
FIGS. 13A and 13B are schematic front diagrams of a modified example of the dimming device in the display apparatus of Example 3.

Example 3 is also a modification of Example 1 and relates to the display apparatus of the third embodiment including the optical device of the first-A structure and the image forming device of the first configuration. A schematic front diagram of a dimming device of the display apparatus of Example 3 is illustrated in FIG. 13A. An optical device 120, 320 overlaps with at least a portion of the dimming device 700, and at the time of operation of the dimming device 700, the light blocking ratio of the dimming device 700 is changed over a range of from an upper region 701U to a lower region 701D, and the light blocking ratio of the dimming device 700 is changed over a range of from an inner region 701C to an outer region 701S. A virtual image forming region facing region 701 has a light blocking ratio higher than the light blocking ratios of the lower region 701D and the outer region 701S.

Specifically, in the display apparatus of Example 3, at the time of operation of the dimming device 700, a voltage higher than that of the first electrode 718A is applied to the second electrode 718B, so that the light blocking ratio of the dimming device 700 is changed over a range of from the upper region 701U to the lower region 701D, and the light blocking ratio of the dimming device 700 is changed over a range of from the inner region 701C to the outer region 701S. Therefore, the virtual image forming region facing region 701 has a light blocking ratio higher than the light blocking ratios of the lower region 701D and the outer region 701S. In addition, the first electrode 718A is arranged in the upper region 701U, and the second electrode 718B is arranged in the outer region 701S. In the example illustrated in FIG. 13A, the first electrode 718A is arranged along the inner lateral side of the dimming device 700, and the length of the first electrode 718A is smaller than the length of the inner lateral side of the dimming device 700. On the other hand, the second electrode 718B is arranged along the outer lateral side of the dimming device 700, and the length of the second electrode 718B is smaller than the length of the outer lateral side of the dimming device 700.

The configurations and structures of the display apparatus of Example 3 have similar configurations and structures as the display apparatus described in Example 1 except for the above differences, and thus, detailed description thereof is omitted.

The first electrode 718A may be configured to extend to the inner region 701C; the second electrode 718B may be configured to extend to the lower region 701D; or the first electrode 718A may be configured to extend to the inner region 701C and the second electrode 718B may be configured to extend to the lower region 701D.

Figure 13B:
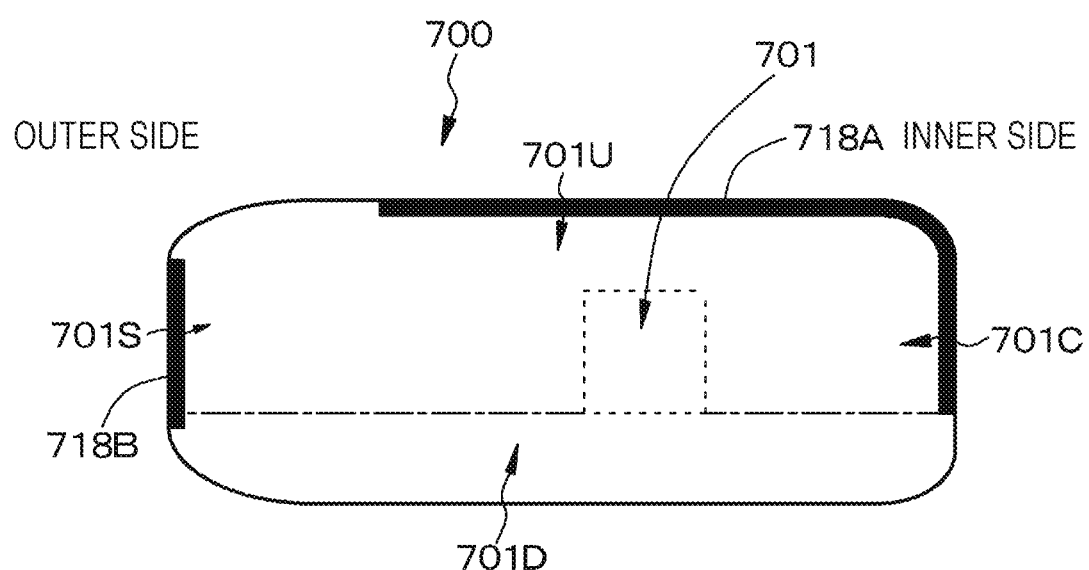
Figure 14A:
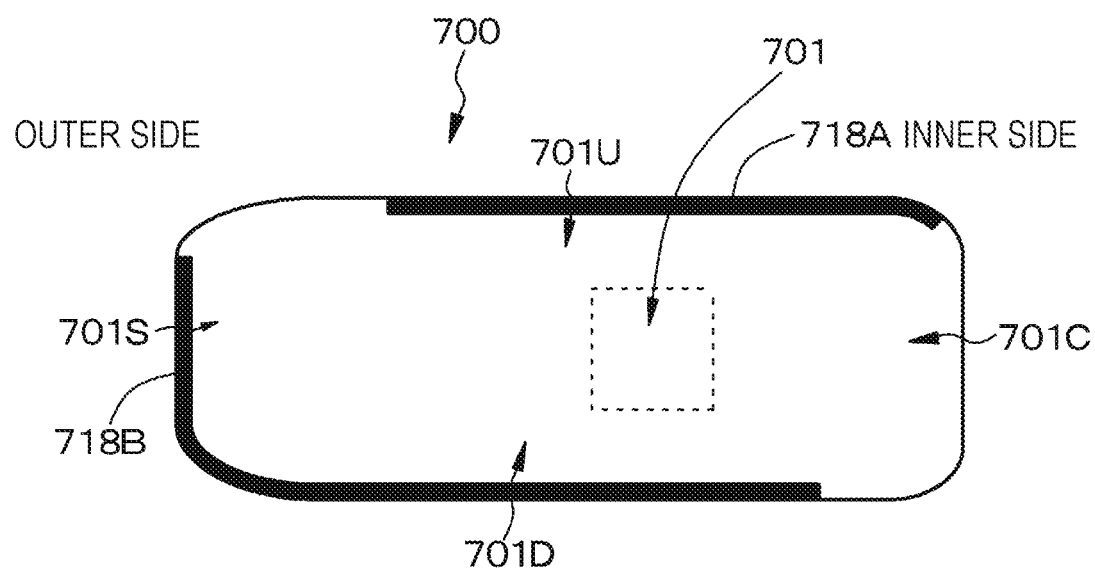
FIGS. 14A and 14B are schematic front diagrams of another modified example of the dimming device in the display apparatus of Example 3.
Figure 14B:
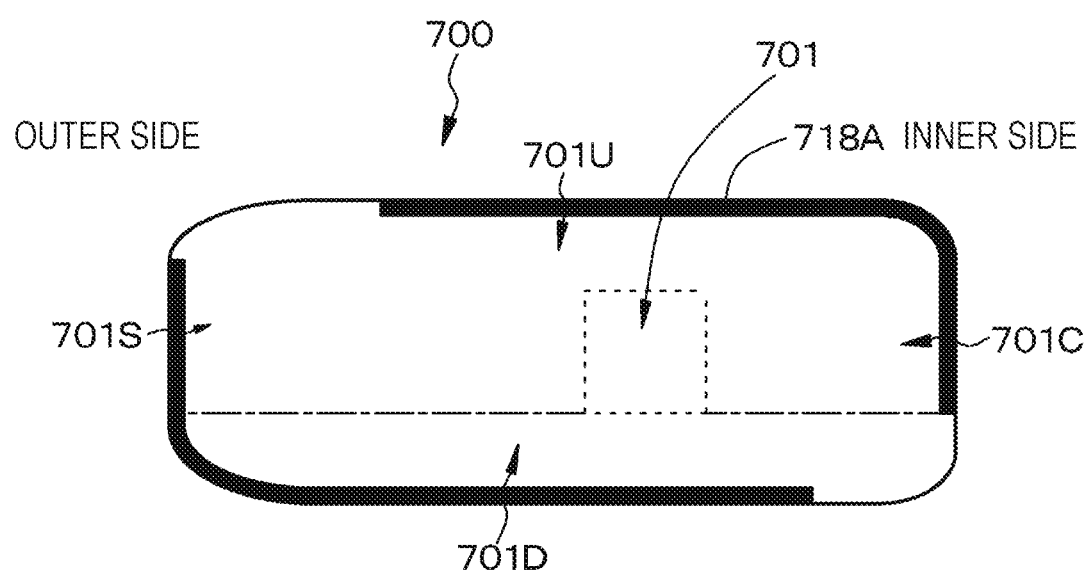

In the example illustrated in FIG. 13B, the first electrode 718A extends to the inner region 701C and is arranged along the inner lateral side of the dimming device 700. In addition, the distal end of the first electrode 718A extends to an extension line (in FIG. 13B, indicated by a one-dot dashed line) of the lower side of the virtual image forming region facing region 701. In addition, the distal end of the first electrode 718A may extend to an extension line of the upper side of the virtual image forming region facing region 701. Alternatively, the distal end of the first electrode 718A may extend through the bisecting point of the lateral side of the inner side of the virtual image forming region facing region 701 to a virtual line parallel to the upper side of the virtual image forming region facing region 701. In addition, in the example illustrated in FIG. 14A, the second electrode 718B extends to the lower region 701D and is arranged along the lower side of the dimming device 700. In addition, the distal end of the second electrode 718B may extend to an extension line of the lateral side of the outer side of the virtual image forming region facing region 701, may extend through the bisecting point of the lower side of the virtual image forming region facing region 701 to a virtual line parallel to the lateral side of the outer side of the virtual image forming region facing region 701, or may extend to an extension line of the lateral side of the inner side of the virtual image forming region facing region 701. Furthermore, in the example illustrated in FIG. 14B, the first electrode 718A extends to the inner region 701C and is arranged along the inner lateral side of the dimming device 700, and the second electrode 718B extends to the lower region 701D and is arranged along the lower side of the dimming device 700.

Example 4

Figure 15:
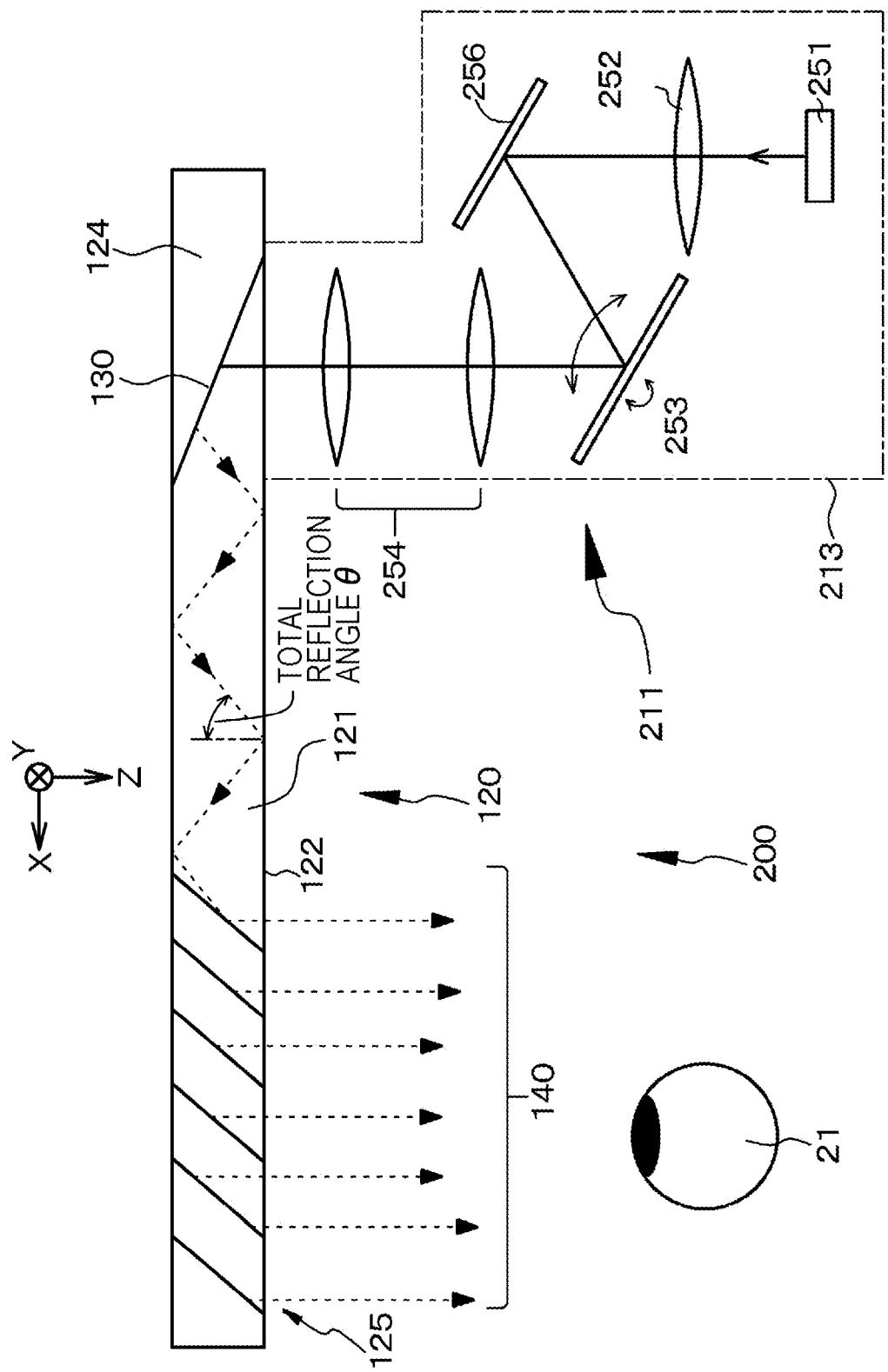
FIG. 15 is a conceptual diagram of an image display device in a display apparatus of Example 4.

Example 4 is a modification of Examples 1 to 3 and relates to the optical device of the first-A structure and the image forming device of the second configuration. As a conceptual diagram of the image display device 200 of the display apparatus (head mounted display) of Example 4 is illustrated in FIG. 15, in Example 4, the image forming device 211 is configured as the image forming device of the second configuration. Namely, the image forming device includes a light source 251 and a scanning unit 253 which scans parallel light emitted from the light source 251. More specifically, the image forming device 211 is configured to include a light source 251, a collimating optical system 252 converting light emitted from the light source 251 to parallel light, a scanning unit 253 scanning the parallel light emitted from the collimating optical system 252, and a relay optical system 254 relaying the parallel light scanned by the scanning unit 253 and emitting the light. In addition, the entire image forming device 211 is accommodated in a casing 213 (in FIG. 15, indicated by a one-dot dashed line), and an opening portion (not shown) is provided to the associated casing 213, so that light is emitted through the opening portion from the relay optical system 254. In addition, each casing 213 is detachably attached to the temple portion 13 by an attachment member 19.

The light source 251 is configured with a light emitting element emitting white light. In addition, the light emitted from the light source 251 is incident on the collimating optical system 252 having a totally positive optical power and is emitted as parallel light. In addition, the parallel light is reflected by a total reflection mirror 256 and is horizontally and vertically scanned by the scanning unit 253 configured with a MEMS which can two-dimensionally scans the incident parallel light by setting a micromirror rotatably in two dimensional directions, and thus, a kind of two-dimensional imaging is obtained, so that virtual pixels (the number of pixels may set to be, for example, the same as that of Example 1) is generated. In addition, the light from the virtual pixels passes through the relay optical system (parallel light emitting optical system) 254 configured with a well-known relay optical system and, the light flux of the parallel light is incident on the optical device 120.

The optical device 120 which the light flux converted to the parallel light by the relay optical system 254 is incident on and which guides the light to be emitted has the same configurations and structures as those of the optical device described in Example 1, and thus, detailed description thereof is omitted. In addition, as described above, the display apparatus of Example 4 has substantially the same configurations and structures as those of the display apparatus of Examples 1 to 3 except that the image forming device 211 is different, and thus, detailed description thereof is omitted.

Example 5

Figure 16:
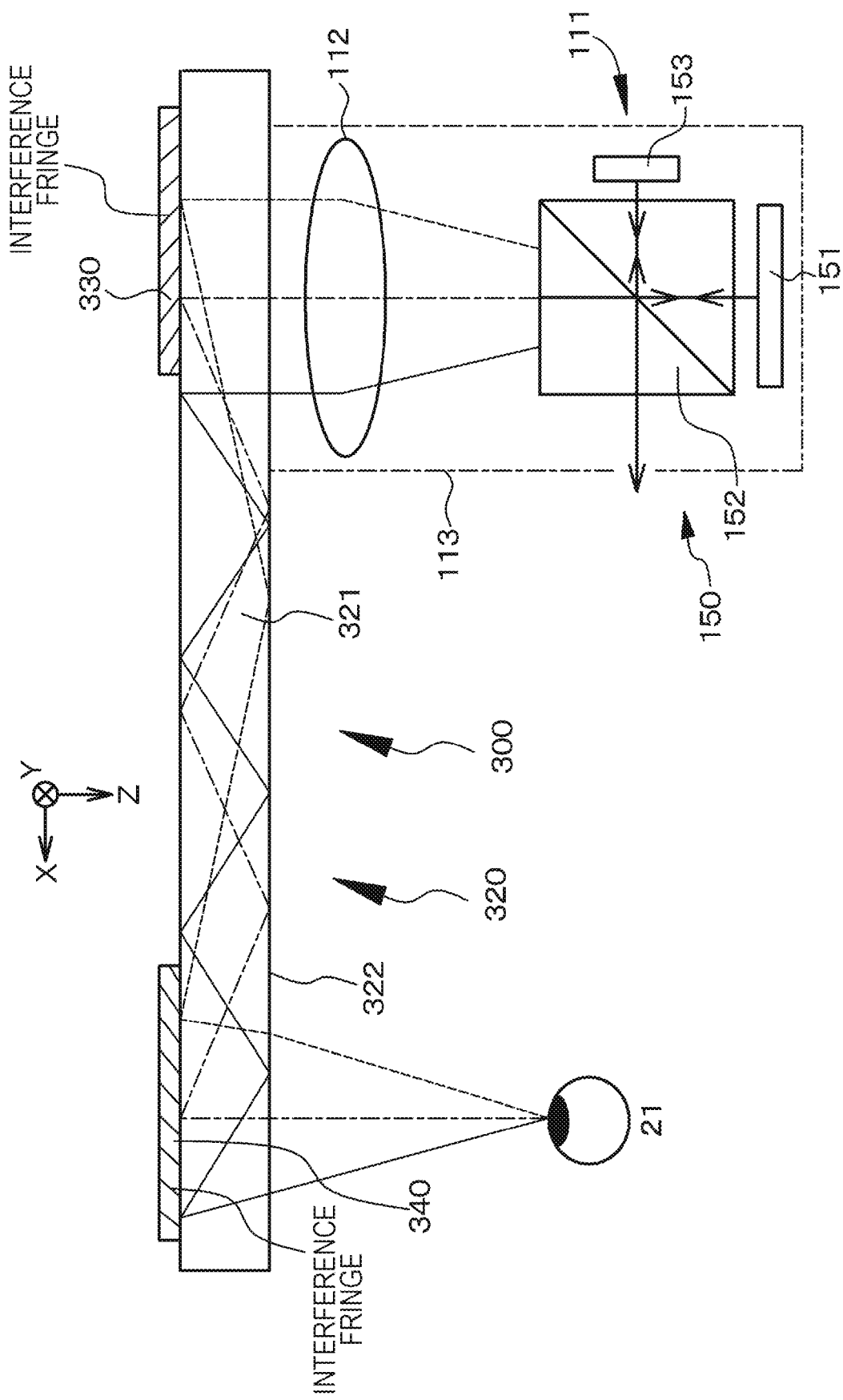
FIG. 16 is a conceptual diagram of an image display device in a display apparatus of Example 5.
Figure 17:
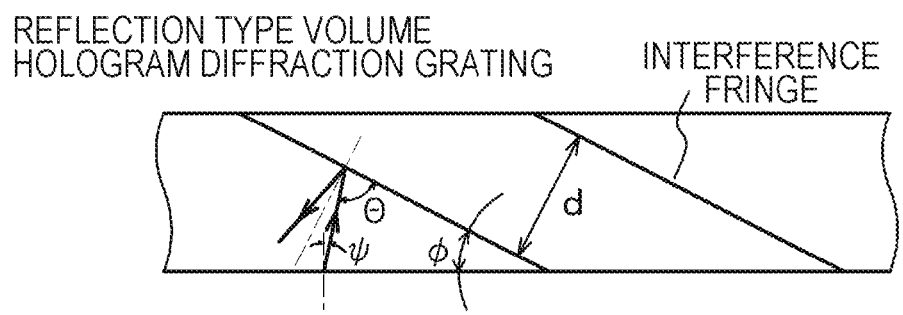
FIG. 17 is a schematic enlarged partial cross-sectional diagram of a reflection type volume hologram diffraction grating in the display apparatus of Example 5.

Example 5 is a modification of Examples 1 to 3 and relates to the optical device of the first-B structure and the image forming device of the first configuration. A conceptual diagram of the image display device 300 of the display apparatus (head mounted display) of Example 5 is illustrated in FIG. 16. In addition, a schematic enlarged partial diagram of a reflection type volume hologram diffraction grating is illustrated in FIG. 17. In Example 5, similarly to Example 1, the image forming device 111 is configured with the image forming device of the first configuration. In addition, the configurations and structures of the optical device 320 are basically the same as those of the optical device 120 of Example 1 except that the configurations and structures of the first deflecting unit and the second deflecting unit are different.

In Example 5, the first deflecting unit and the second deflecting unit are arranged on a plane of the light guiding plate 321 (specifically, a second plane 323 of the light guiding plate 321). Therefore, the first deflecting unit diffracts and reflects the light incident on the light guiding plate 321, and the second deflecting unit diffracts and reflects, several times, the light propagating through the inner portion of the light guiding plate 321 by total reflection. Herein, the first deflecting unit and the second deflecting unit are configured with a diffraction grating element, specifically, a reflection type diffraction grating element, more specifically, a reflection type volume hologram diffraction grating. In the description hereinafter, the first deflecting unit configured with a reflection type volume hologram diffraction grating is, for the convenience, referred to as the "first diffraction grating member 330"; and the second deflecting unit configured with a reflection type volume hologram diffraction grating is, for the convenience, referred to as the "second diffraction grating member 340".

In addition, in Example 5 or the later-described Example 6, the first diffraction grating member 330 and the second diffraction grating member 340 have a configuration formed by stacking one layer of the diffraction grating layer. In addition, interference fringe corresponding to one type of wavelength band (or wavelength) is formed in each diffraction grating layer configured with a photopolymer material, and the diffraction grating layer is fabricated by a method in the related art. A pitch of the interference fringe formed in the diffraction grating layer (diffractive optical element) is constant, and the interference fringe has a shape of a straight line and is parallel to the Y axis. In addition, the axial line of the first diffraction grating member 330 and the axial line of the second diffraction grating member 340 are parallel to the X axis, and the normal line thereof is parallel to the Z axis.

A schematic enlarged partial diagram of a reflection type volume hologram diffraction grating is illustrated in FIG. 17. The interference fringe having a slant angle φ is formed in the reflection type volume hologram diffraction grating. Herein, the slant angle φ denotes an angle between a surface of the reflection type volume hologram diffraction grating and the interference fringe. The interference fringe is formed over a range of from an inner portion of the reflection type volume hologram diffraction grating to the surface thereof. The interference fringe satisfies Bragg's condition. Herein, the Bragg's condition indicates a condition satisfying the following Formula (A). In Formula (A), m denotes a positive integer, λ denotes wavelength, d denotes a pitch of grating planes (an interval of virtual planes including the interference fringe in the direction of the normal line), and θ denotes a complementary angle of an angle of incidence on the interference fringe. In addition, in the case where light enters the diffraction grating member at an incident angle φ, the relationship among θ, the slant angle φ, and the incident angle φ is expressed by Formula (B).

$$m \cdot \lambda = 2 \cdot d \cdot \sin(\theta) \quad (A)$$

$$\theta = 90° - (\phi + \varphi) \quad (B)$$

As described above, the first diffraction grating member 330 is provided (adhered) to the second plane 323 of the light guiding plate 321 to diffract and reflect the parallel light incident on the light guiding plate 321 so the parallel light incident from the first plane 322 on the light guiding plate 321 is totally reflected in the inner portion of the light guiding plate 321. Furthermore, as described above, the second diffraction grating member 340 is provided (adhered) to the second plane 323 of the light guiding plate 321 to diffract and reflect, several times, the parallel light propagating through the inner portion of the light guiding plate 321 by total reflection and to emits the parallel light from the first plane 322 in the state of the parallel light from the light guiding plate 321.

In addition, in the light guiding plate 321, the parallel light propagates through the inner portion thereof by total reflection, and after that, the parallel light is emitted. At this time, since the light guiding plate 321 is thin and the optical path of the light propagating through the inner portion of the light guiding plate 321 is long, the number of times of total reflection for approaching the second diffraction grating member 340 is different corresponding to a viewing angle. More specifically, among the parallel light beams incident on the light guiding plate 321, the number of times of reflection of the parallel light incident at an angle in the direction being close to the second diffraction grating member 340 is smaller than the number of times of reflection of the parallel light incident on the light guiding plate 321 at an angle in the direction being far away from the second diffraction grating member 340. This is because, among the parallel light beams which are diffracted and reflected in the first diffraction grating member 330, the parallel light which is incident on the light guiding plate 321 at an angle in the direction being close to the second diffraction grating member 340 is smaller than the parallel light which is incident on the light guiding plate 321 at the angle in the opposite direction in terms of the angle between the light propagating through the inner portion of the light guiding plate 321 and the normal line of the light guiding plate 321 at the time of colliding the inner plane of the light guiding plate 321. In addition, the shape of the interference fringe formed in the inner portion of the second diffraction grating member 340 and the shape of the interference fringe formed in the inner portion of the first diffraction grating member 330 have a symmetric relationship with respect to a virtual plane perpendicular to the axial line of the light guiding plate 321. In a structure, the planes of the first diffraction grating member 330 and the second diffraction grating member 340 which do not face the light guiding plate 321 may be covered with a transparent resin plate or a transparent resin film, so that the first diffraction grating member 330 and the second diffraction grating member 340 can be prevented from being damaged. In addition, a transparent protective film may be adhered to the first plane 322, so that the light guiding plate 321 can be protected.

The later-described light guiding plate 321 of Example 6 basically has the same configurations and structures as those of the light guiding plate 321 described above.

As described above, the display apparatus of Example 5 has substantially the same configurations and structures as those of the display apparatus of Examples 1 to 3 except that the optical device 320 is different, and thus, detailed description thereof is omitted.

Example 6

Figure 18:
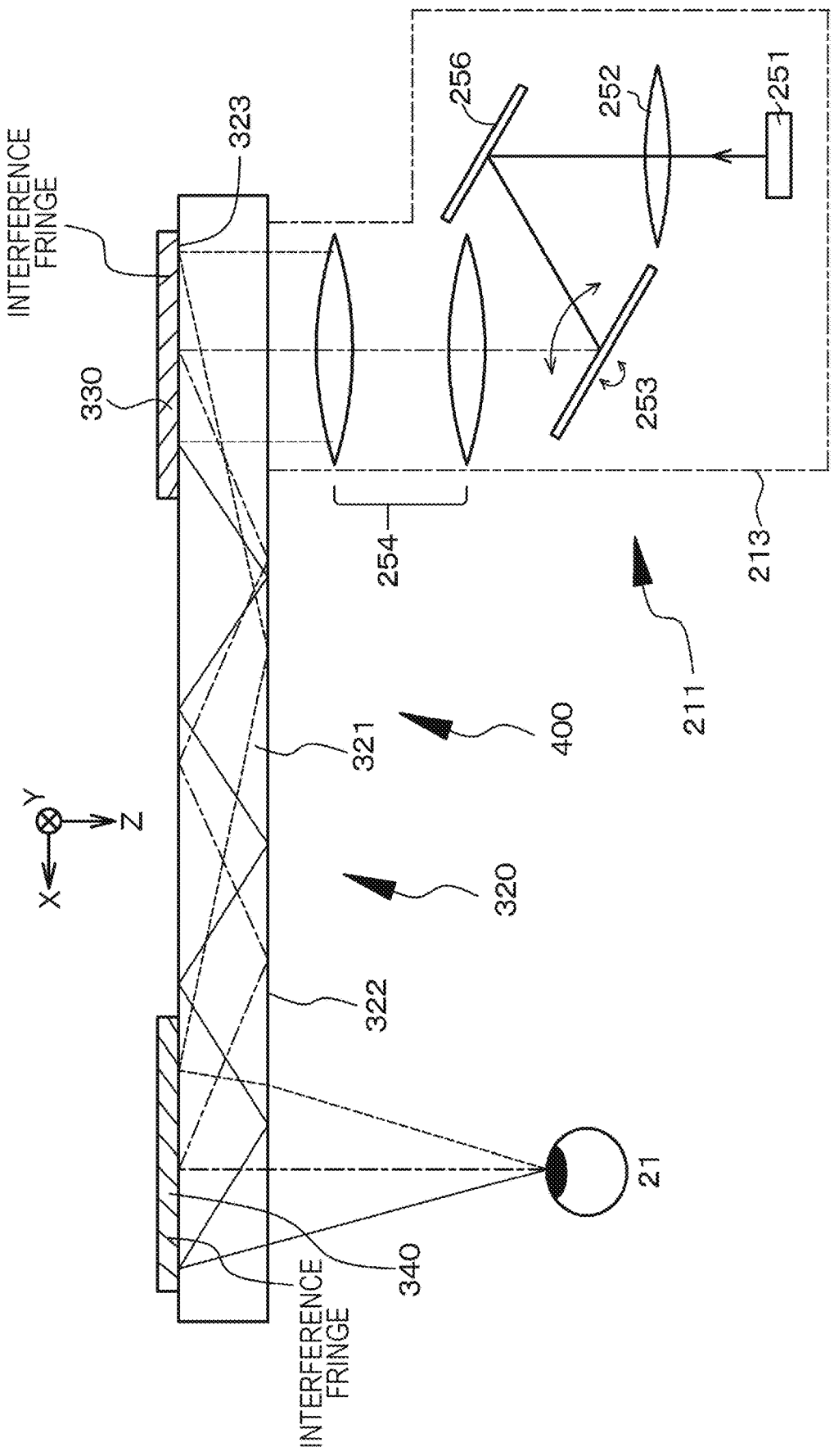
FIG. 18 is a conceptual diagram of an image display device in a display apparatus of Example 6.

Example 6 is also a modification of Examples 1 to 3 and relates to the optical device of the first-B structure and the image forming device of the second configuration. A conceptual diagram of the image display device of the display apparatus (head mounted display) of Example 6 is illustrated in FIG. 18. A light source 251, a collimating optical system 252, a scanning unit 253, a parallel light emitting optical system (relay optical system 254), and the like of the image display device 400 of Example 6 have the same configurations and structures (the image forming device of the second configuration) as those of Example 4. In addition, an optical device 320 of Example 6 has the same configurations and structures as those of the optical device 320 of Example 5. The display apparatus of Example 6 has substantially the same configurations and structures as those of the display apparatus of Examples 1 to 3 except for the above differences, and thus, detailed description thereof is omitted.

Example 7

Figure 19:
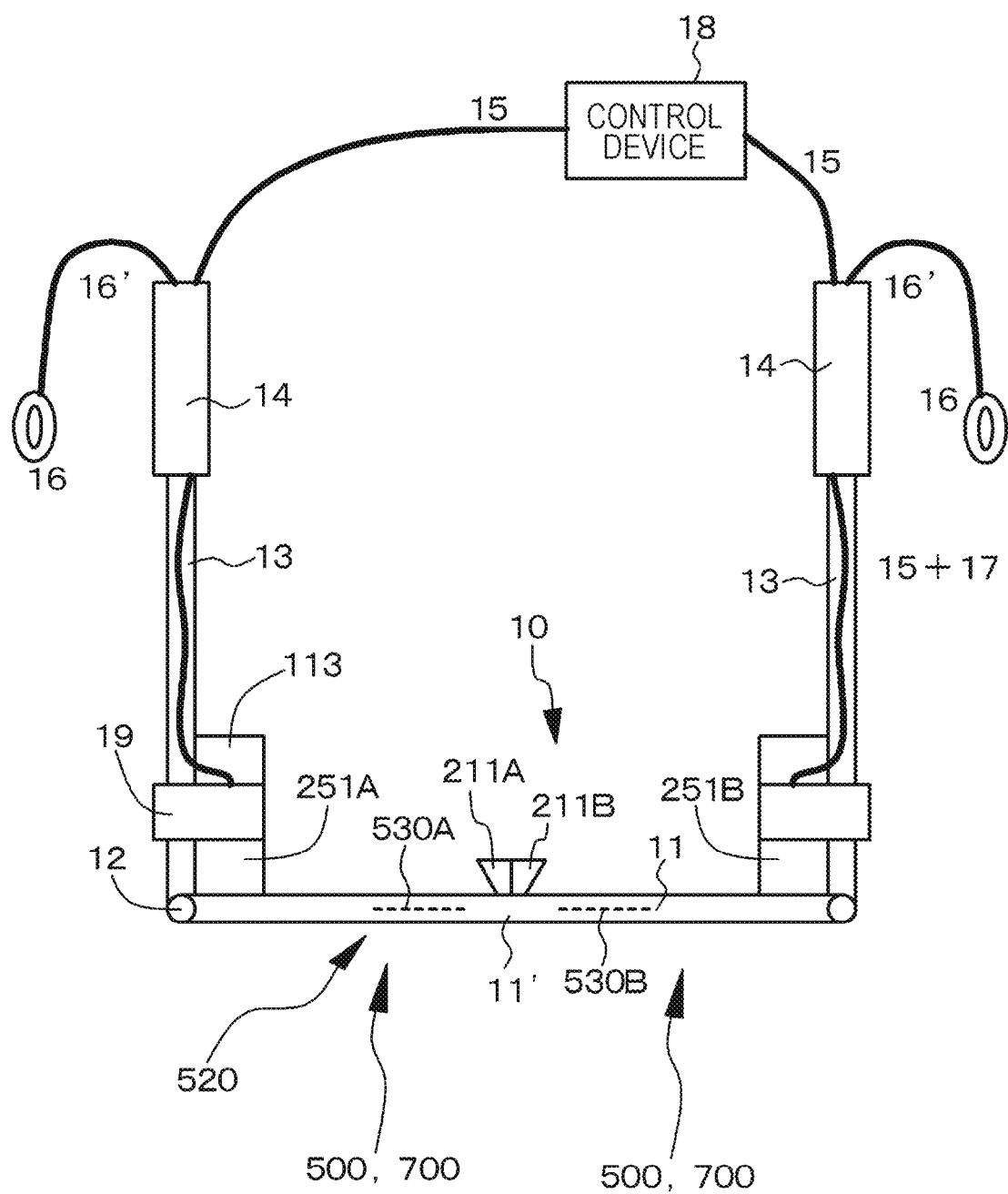
FIG. 19 is a schematic diagram of a display apparatus of Example 7 as viewed from the upper side.

Example 7 is also a modification of the image display device of Examples 1 to 3 and relates to the optical device of the second structure and the image forming device of the second configuration. A schematic diagram of a display apparatus of Example 7 as viewed from the upper side is illustrated in FIG. 19.

In Example 7, an optical device 520 constituting an image display device 500 is configured with transflective mirrors 530A and 530B which light emitted from light sources 251A and 251B is incident on and which emit the light toward observer's pupils 21. In addition, in Example 7, the light emitted from the light source 251 arranged in a casing 213 propagates through an inner portion of an optical fiber (not shown) to be incident on a scanning unit 253, for example, attached to a portion of a rim 11' in the vicinity of a nose pad, and light scanned by the scanning unit 253 is incident on the transflective mirrors 530A and 530B. Alternatively, the light emitted from the light sources 251A and 251B arranged in the casing 213 propagates through an inner portion of an optical fiber (not shown) to be incident on the scanning unit 253, for example, attached to an upper side of portions of the rim 11' corresponding to two eyes, and the light scanned by the scanning unit 253 is incident on the transflective mirrors 530A and 530B. Alternatively, the light being emitted from the light sources 251A and 251B arranged in the casing 213, being incident on the scanning unit 253 arranged in the casing 213, and being scanned by the scanning unit 253 is directly incident on the transflective mirrors 530A and 530B. Next, light reflected by the transflective mirrors 530A and 530B is incident on the observer's pupils. The image forming device may be substantially formed as the image forming device 211 described in Example 4. The display apparatus of Example 7 has substantially the same configurations and structures as those of the display apparatus of Examples 1 to 3 except for the above differences, and thus, detailed description thereof is omitted.

Example 8

Figure 20A:
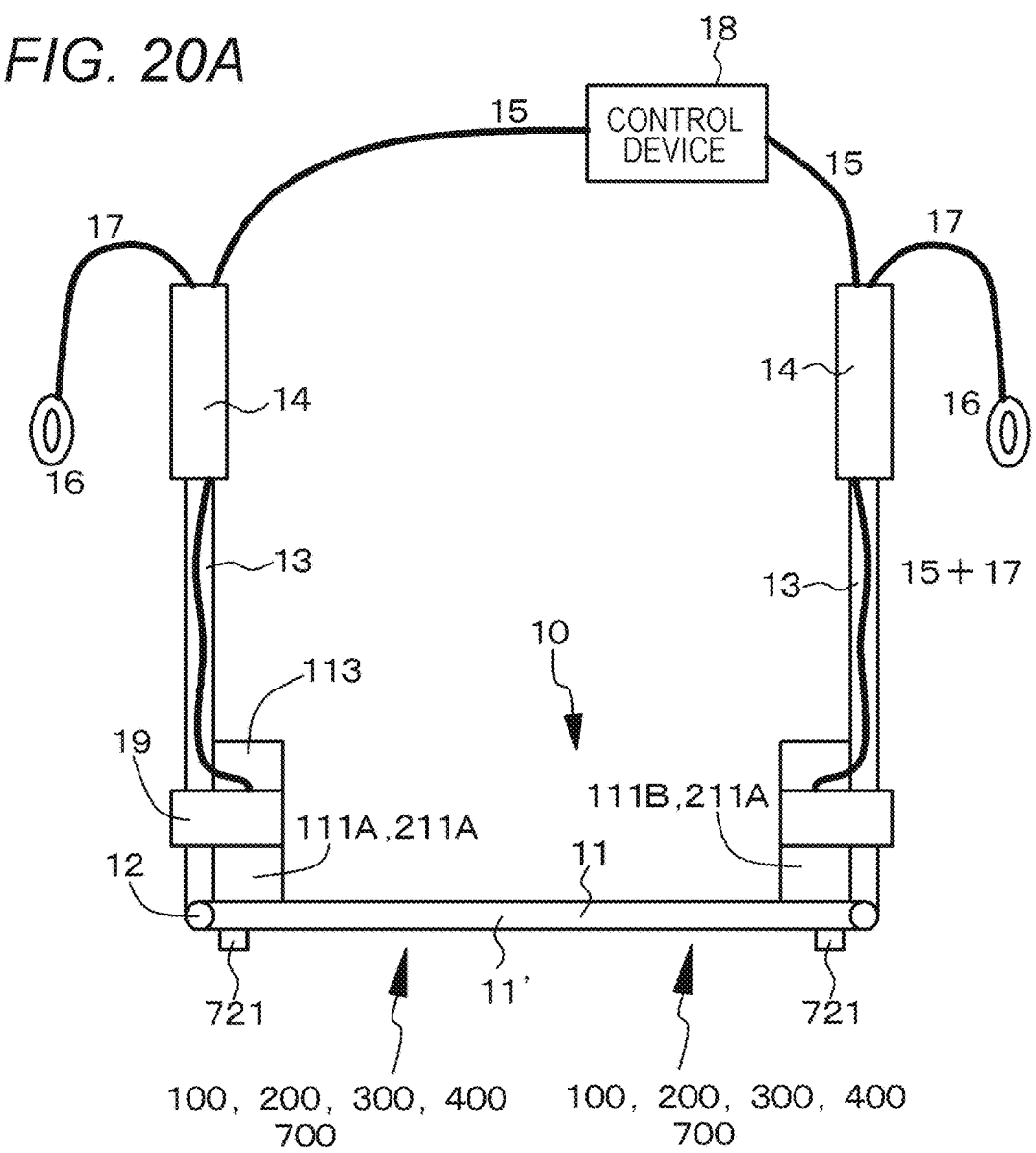
FIGS. 20A and 20B are a schematic diagram of a display apparatus of Example 8 as viewed from the upper side and a schematic diagram of a circuit controlling an illuminance sensor, respectively.
Figure 20B:
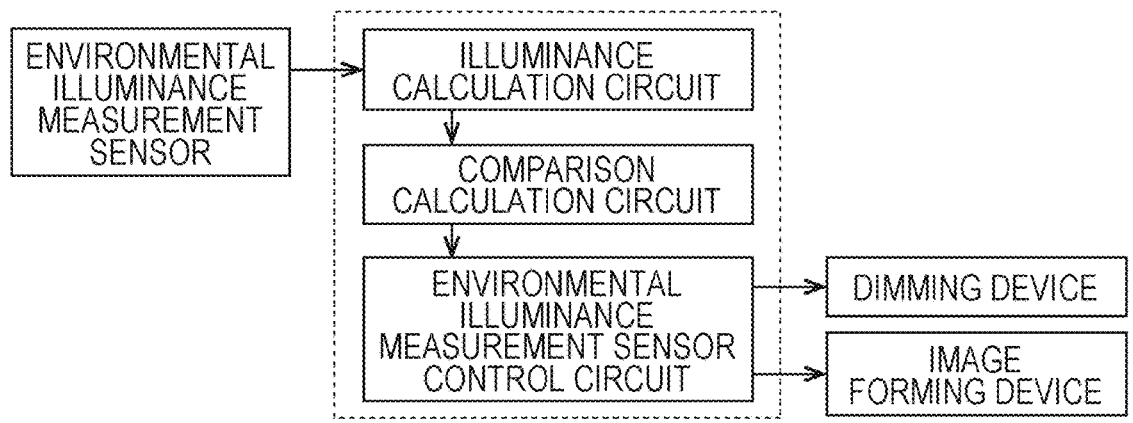

Example 8 is a modification of Example 1. A schematic diagram of a display apparatus of Example 8 as viewed from the upper side is illustrated in FIG. 20A. In addition, a schematic diagram of a circuit controlling an illuminance sensor is illustrated in FIG. 20B.

The display apparatus of Example 8 is configured to include an illuminance sensor (environmental illuminance measurement sensor) 721 measuring illuminance of an environment where the display apparatus is located, and the light blocking ratio of the dimming device 700 is controlled on the basis of a measurement result of the illuminance sensor (environmental illuminance measurement sensor) 721. Simultaneously or independently, the luminance of the image formed by the image forming device 111, 211 is controlled on the basis of the measurement result of the illuminance sensor (environmental illuminance measurement sensor) 721. The environmental illuminance measurement sensor 721 having well-known configurations and structures may be arranged in, for example, in an outer end portion of the dimming device 700. The environmental illuminance measurement sensor 721 is connected through a connector and a wire line (not shown) to a control device 18. A circuit controlling the environmental illuminance measurement sensor 721 is included in the control device 18. The circuit controlling the environmental illuminance measurement sensor 721 is configured to include an illuminance calculation circuit which receives a measurement value from the environmental illuminance measurement sensor 721 and obtains the illuminance, a comparison calculation circuit which compares the value of the illuminance obtained by the illuminance calculation circuit with a standard value, and an environmental illuminance measurement sensor control circuit which controls the dimming device 700 and/or the image forming device 111, 211 on the basis of the value obtained by the comparison calculation circuit. These circuits may be configured with well-known circuits. In the control of the dimming device 700, the control of the light blocking ratio of the dimming device 700 is performed, and on the other hand, in the control of the image forming device 111, 211, the control of the luminance of the image formed by the image forming device 111, 211 is performed. In addition, the control of the light blocking ratio of the dimming device 700 and the control of the luminance of the image of the image forming device 111, 211 may be independently performed or may be performed with a correlation.

For example, when the measurement result of the illuminance sensor (environmental illuminance measurement sensor) 721 becomes a predetermined value (first illuminance measurement value) or more, the light blocking ratio of the dimming device 700 is defined as a predetermined value (first light blocking ratio) or more. On the other hand, when the measurement result of the illuminance sensor (environmental illuminance measurement sensor) 721 becomes a predetermined value (second illuminance measurement value) or less, the light blocking ratio of the dimming device 700 is defined as a predetermined value (second light blocking ratio) or less. Herein, as the first illuminance measurement value, 10 lux may be exemplified; as the first light blocking ratio, any value of 99% to 70% may be exemplified; as the second illuminance measurement value, 0.01 lux may be exemplified; and as the second light blocking ratio, any value of 49% to 1% may be exemplified.

In addition, the illuminance sensor (environmental illuminance measurement sensor) 721 of Example 8 may be applied to the display apparatus described in Examples 2 to 7. In addition, in the case where the display apparatus includes the imaging device, the illuminance sensor (environmental illuminance measurement sensor) 721 may be configured with a light-receiving element for exposure measurement provided to the imaging device.

In the display apparatus of Example 8 or the later-described Example 9, since the light blocking ratio of the dimming device is controlled on the basis of a measurement result of the illuminance sensor (environmental illuminance measurement sensor), the luminance of the image formed by the image forming device is controlled on the basis of a measurement result of the illuminance sensor (environmental illuminance measurement sensor), the light blocking ratio of the dimming device is controlled on the basis of a measurement result of the second illuminance sensor (transmitted light illuminance measurement sensor), or the luminance of the image formed by the image forming device is controlled on the basis of a measurement result of the second illuminance sensor (transmitted light illuminance measurement sensor), high contrast can be exhibited to the virtual image observed by the observer, and optimization of the observation state of the virtual image can be facilitated depending on the illuminance of the peripheral environment where the display apparatus is located.

Example 9

Figure 21A:
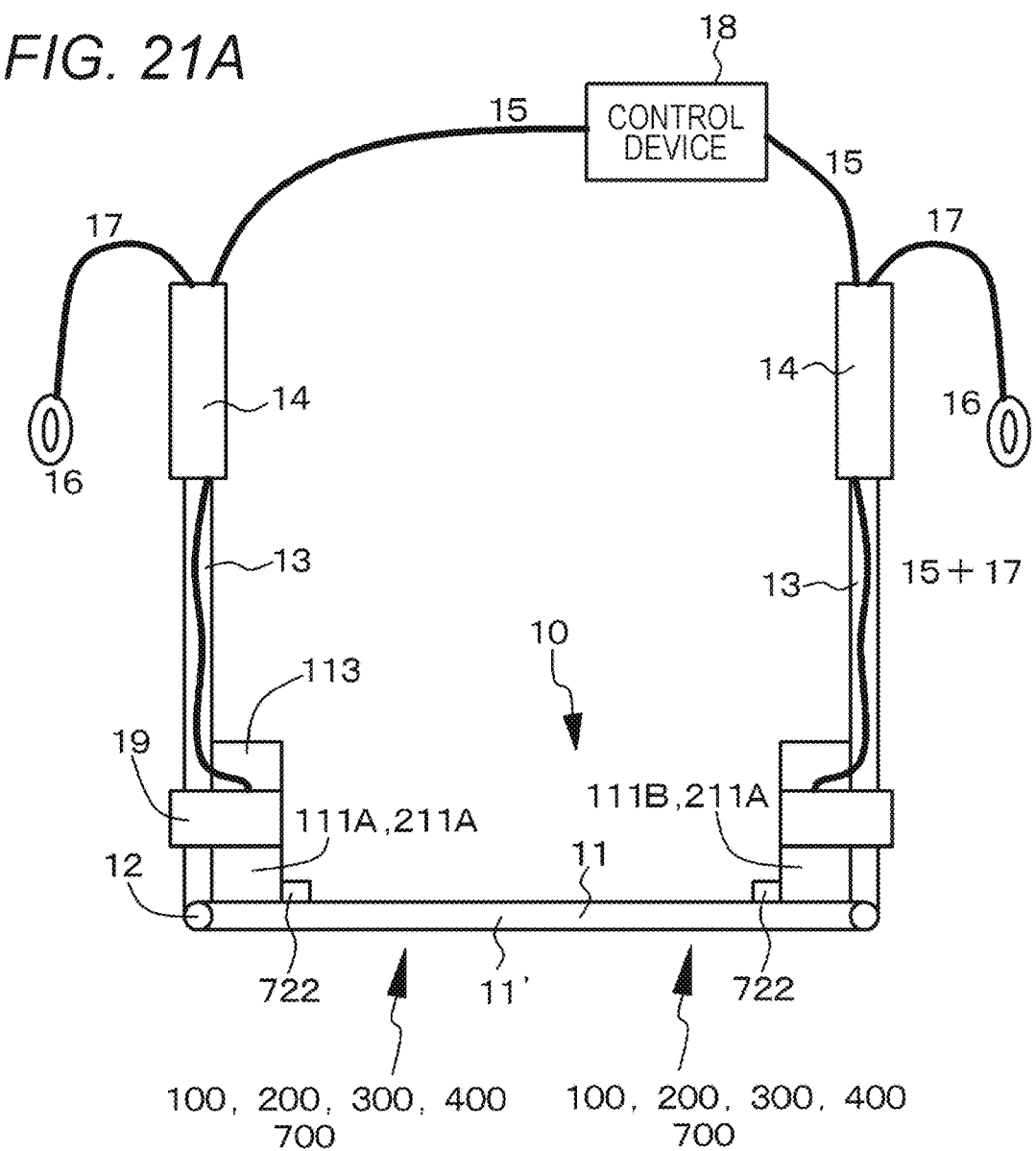
FIGS. 21A and 21B are a schematic diagram of a display apparatus of Example 9 as viewed from the upper side and a schematic diagram of a circuit controlling an illuminance sensor, respectively.
Figure 21B:
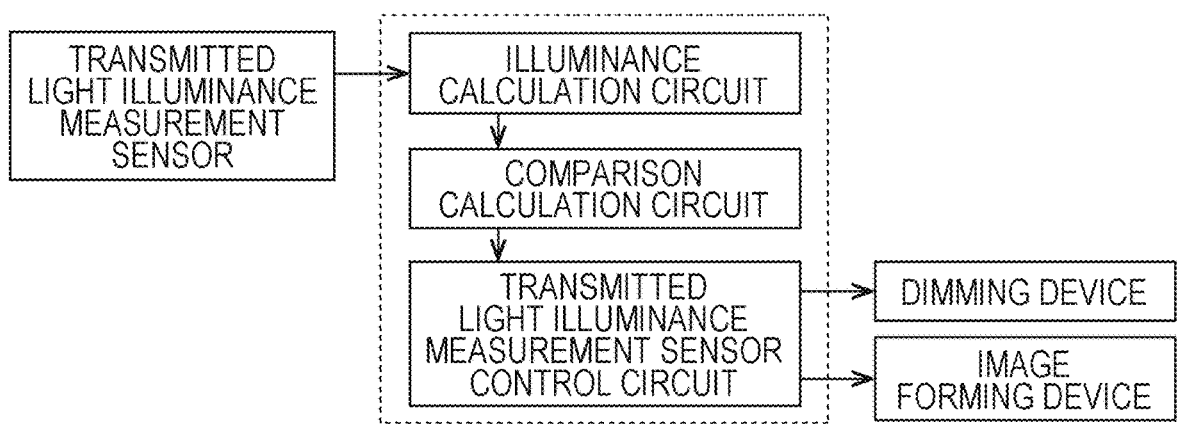

Example 9 is also a modification of Example 1. A schematic diagram of a display apparatus of Example 9 as viewed from the upper side is illustrated in FIG. 21A. In addition, a schematic diagram of a circuit controlling a second illuminance sensor is illustrated in FIG. 21B.

The display apparatus of Example 9 is configured to further include a second illuminance sensor (transmitted light illuminance measurement sensor) 722 measuring illuminance based on light being incident from an external environment and transmitting through the dimming device, namely, measuring whether environment light transmits through the dimming device to be adjusted up to desired illuminance and is incident, and the light blocking ratio of the dimming device 700 is controlled on the basis of a measurement result of the second illuminance sensor (transmitted light illuminance measurement sensor) 722. In addition, simultaneously or independently, the luminance of the image formed by the image forming device 111, 211 is controlled on the basis of a measurement result of the second illuminance sensor (transmitted light illuminance measurement sensor) 722. The transmitted light illuminance measurement sensor 722 having well-known configurations and structures is arranged to be closer to the observer than to the optical device 120, 320, 520. Specifically, the transmitted light illuminance measurement sensor 722 may be arranged in, for example, an inner plane of the casing 113, 213. The transmitted light illuminance measurement sensor 722 is connected through a connector or a wire line (not shown) to the control device 18. The control device 18 includes a circuit controlling the transmitted light illuminance measurement sensor 722. The circuit controlling the transmitted light illuminance measurement sensor 722 is configured to include an illuminance calculation circuit which receives a measurement value from the transmitted light illuminance measurement sensor 722 and obtains the illuminance, a comparison calculation circuit which compares the value of the illuminance obtained by the illuminance calculation circuit with a standard value, and a transmitted light illuminance measurement sensor control circuit which controls the dimming device 700 and/or the image forming device 111, 211 on the basis of the value obtained by the comparison calculation circuit. These circuits may be configured with well-known circuits. In the control of the dimming device 700, the control of the light blocking ratio of the dimming device 700 is performed, and on the other hand, in the control of the image forming device 111, 211, the control of the luminance of the image formed by the image forming device 111, 211 is performed. In addition, the control of the light blocking ratio of the dimming device 700 and the control of the luminance of the image of the image forming device 111, 211 may be independently performed or may be performed with a correlation. Furthermore, in the case where the measurement result of the transmitted light illuminance measurement sensor 722 is not controlled to be desired illuminance in consideration of the illuminance of the environmental illuminance measurement sensor 721, namely, in the case where the measurement result of the transmitted light illuminance measurement sensor 722 is not desired illuminance or in the case where furthermore fine illuminance adjustment is desired, the light blocking ratio of the dimming device may be adjusted while monitoring the value of the transmitted light illuminance measurement sensor 722. At least two second illuminance sensors (transmitted light illuminance measurement sensors) are arranged to perform illuminance measurement based on the light passing through a high light blocking ratio portion (the upper region 701U or the inner region 701C of the dimming device 700) and illuminance measurement based on the light passing through a low light blocking ratio portion (the lower region 701D or the outer region 701S of the dimming device 700).

In addition, the second illuminance sensor (transmitted light illuminance measurement sensor) 722 of Example 9 may be applied to the display apparatus described in Examples 2 to 7. Alternatively, the second illuminance sensor (transmitted light illuminance measurement sensor) 722 of Example 9 and the illuminance sensor (environmental illuminance measurement sensor) 721 of Example 8 may be combined. In this case, various tests are performed, and the control of the light blocking ratio of the dimming device 700 and the control of the luminance of the image of the image forming device 111, 211 may be independently performed or may be performed with a correlation. In the dimming device for right eye and the dimming device for left eye, by adjusting the voltages applied to the first electrode and the second electrode, equalizing between the light blocking ratio of the dimming device for right eye and the light blocking ratio of the dimming device for left eye can be facilitated. A potential difference between the first electrode and the second electrode may be controlled, and the voltage applied to the first electrode and the voltage applied to the second electrode may be independently controlled. The light blocking ratio of the dimming device for right eye and the light blocking ratio of the dimming device for left eye may be controlled on the basis of, for example, a measurement result of the second illuminance sensor (transmitted light illuminance measurement sensor) 722 or may be manually controlled and adjusted by the observer observing brightness of the light passing through the dimming device and the optical device for right eye and brightness of the light passing through the dimming device and the optical device for left eye and by the observer manipulating a switch, a button, a dial, a slider, a knob, or the like.

Example 10

Example 10 is a modification of Examples 1 to 9, and in Example 10, the dimming layer is configured with an electrophoretic dispersion liquid. Hereinafter, a method of fabricating the electrophoretic dispersion liquid will be described.

First, a solution-A was prepared in such a manner that, first, 10 g of carbon black (#40 manufactured by Mitsubishi Chemical Corporation) as electrophoretic particles was added to 1 L of pure water and stirred, and then 1 $cm^3$ of 37% by mass hydrochloric acid and 0.2 g of 4-vinylaniline were added thereto. Meanwhile, a solution-B was prepared in such a manner that 0.3 g of sodium nitrite was dissolved in 10 $cm^3$ of pure water and then heated up to 40° C. Then, the solution-B was slowly added to the solution-A and stirred for 10 hours. Thereafter, the product obtained through reaction was subjected to centrifugal separation to obtain a solid product. Then, the solid product was washed with pure water, and further, was dispersed in acetone, and then was washed by a method such as centrifugal separation. Thereafter, the solid product was dried overnight with a vacuum dryer set to a temperature of 50° C.

Subsequently, into a reaction flask equipped with a nitrogen purge device, an electromagnetic stirrer, and a reflux column, 5 g of the solid product, 100 $cm^3$ of toluene, 15 $cm^3$ of 2-ethylhexyl methacrylate, and 0.2 g of azobisisobutyronitrile (AIBN) were put and mixed. Then, the reaction flask was purged with a nitrogen gas for 30 minutes while stirring. Thereafter, the reaction flask was put into an oil bath and gradually heated up to 80° C. while continuously stirring, and this state was maintained for 10 hours. Thereafter, the reaction flask was cooled to room temperature, and the solid product was subjected to centrifugal separation. After the operation in which the solid product was subjected to centrifugal separation together with tetrahydrofuran (THF) and ethyl acetate was performed three times and the solid product was washed, the solid product was taken out and dried overnight with a vacuum dryer set to a temperature of 50° C. According to this, 4.7 g of brown electrophoretic particles were obtained.

A solution of Isopar G (manufactured by Exxon Mobil Corporation) containing N,N-dimethylpropan-1,3-diamine, 1,2-hydroxyoctadecanoic acid, and 0.5% of methoxysulfonyloxymethane (Solsperse 17000 manufactured by Japan Lubrizol Corporation) and containing 1.5% of sorbitan trioleate (Span 85) was prepared as a dispersion liquid (dispersion medium) serving as an insulating liquid. Then, 0.1 g of electrophoretic particles were added to 9.9 g of a dispersion medium and stirred for 5 minutes using a bead mill. Thereafter, the mixed solution was subjected to centrifugal separation for 5 minutes with a centrifuge machine (rotation speed=2000 rpm) and then beads were removed. In this way, an electrophoretic dispersion liquid could be obtained. Incidentally, the electrophoretic particles are positively charged.

In the dimming device 700 in Example 10, a gap between the first substrate 711A and the second substrate 711B which were formed by glass having a thickness of 0.5 mm was set to 50 µm. The first transparent electrode 712A and the second transparent electrode 712B are configured by an indium-tin complex oxide (ITO) and formed on the basis of a PVD method including a sputtering method in combination with a lift-off method. The first transparent electrode 712A is patterned into a comb-shaped electrode. On the other hand, the second transparent electrode 712B is not patterned and is a so-called solid electrode. The first transparent electrode 712A and the second transparent electrode 712B are connected to the control device 18 through a connector or a wire line (not illustrated).

The light blocking ratio (light transmittance) of the dimming device 700 may be controlled by voltages applied to a first transparent electrode 712A and a second transparent electrode 712B. Specifically, if a relatively positive voltage is applied to the first transparent electrode 712A and a relatively negative voltage is applied to the second transparent electrode 712B, positively charged electrophoretic particles migrate to cover the second transparent electrode 712B. Therefore, the light blocking ratio of the dimming device 700 becomes high. On the other hand, on the contrary, if a relatively negative voltage is applied to the first transparent electrode 712A and a relatively positive voltage is applied to the second transparent electrode 712B, the electrophoretic particles migrate to cover the first transparent electrode 712A. Therefore, the light blocking ratio of the dimming device 700 becomes low. The voltages applied to the first transparent electrode 712A and the second transparent electrode 712B may be controlled by an observer manipulating a control knob provided to the control device 18. Namely, by the observer observing the virtual image from the optical device 120, 320 and adjusting the light blocking ratio of the dimming device 700, the contrast of the virtual image can be improved.

Example 11

Example 11 is a modification of Example 10. In Example 10, a color colored by the dimming device 700 is set to be black as a fixed color. On the other hand, in Example 11, the light passing through the dimming device is colored in a desired color by the dimming device, and in addition, the color colored by the dimming device is variable. Specifically, the dimming device is achieved by stacking a dimming device colored in red, a dimming device colored in yellow, and a dimming device colored in blue. Herein, the electrophoretic dispersion liquid in the dimming device which is colored in red is configured by a dispersion liquid obtained by dispersing, in a solution of Isopar G (manufactured by Exxon Mobil Corporation) containing N,N-dimethylpropan-1,3-diamine, 1,2-hydroxyoctadecanoic acid, and 0.5% of methoxysulfonyloxymethane (Solsperse 17000 manufactured by Japan Lubrizol Corporation) and containing 1.5% of sorbitan trioleate (Span 85), particles, as electrophoretic particles, which are obtained in such a manner that a styrene resin and C. I. Pigment Red 122 are preliminarily mixed with a Henschel mixer, the resultant mixture is then melted and kneaded with a twin screw extruder, and after cooling, the obtained product is coarsely pulverized with a hammer mill and then finely pulverized with a jet mill. In addition, the electrophoretic dispersion liquid in the dimming device which is colored in yellow is configured by a dispersion liquid obtained by dispersing, in a solution of Isopar G (manufactured by Exxon Mobil Corporation) containing N,N-dimethylpropan-1,3-diamine, 1,2-hydroxyoctadecanoic acid, and 0.5% of methoxysulfonyloxymethane (Solsperse 17000 manufactured by Japan Lubrizol Corporation) and containing 1.5% of sorbitan trioleate (Span 85), particles, as electrophoretic particles, which are obtained in such a manner that a styrene resin and C. I. Pigment Yellow 12 are preliminarily mixed with a Henschel mixer, the resultant mixture is then melted and kneaded with a twin screw extruder, and after cooling, the obtained product is coarsely pulverized with a hammer mill and then finely pulverized with a jet mill. Furthermore, the electrophoretic dispersion liquid in the dimming device which is colored in blue is configured by a dispersion liquid obtained by dispersing, in a solution of Isopar G (manufactured by Exxon Mobil Corporation) containing N,N-dimethylpropan-1,3-diamine, 1,2-hydroxyoctadecanoic acid, and 0.5% of methoxysulfonyloxymethane (Solsperse 17000 manufactured by Japan Lubrizol Corporation) and containing 1.5% of sorbitan trioleate (Span 85), particles, as electrophoretic particles, which are obtained in such a manner that a styrene resin and C. I. Pigment Blue 1 are preliminarily mixed with a Henschel mixer, the resultant mixture is then melted and kneaded with a twin screw extruder, and after cooling, the obtained product is coarsely pulverized with a hammer mill and then finely pulverized with a jet mill. Then, the application of a voltage to the electrode in each dimming device is controlled, and thus desired color can be provided to external light emitted from the three-layered dimming device.

The configurations and structures of the display apparatus of Example 11 have similar configurations and structures to those of the display apparatus described in Example 10 except for the above differences, and thus, detailed description thereof is omitted.

Heretofore, the present disclosure is described on the basis of exemplary examples, but the present disclosure is not limited to the examples. The configurations and structure of the display apparatus (head mounted display) and the image display device described in the examples are exemplary ones and may be appropriately changed. For example, a surface relief hologram (refer to US Patent No. 20040062505 A1) may be arranged in the light guiding plate. In the optical device 320, the diffraction grating element may be configured with a transmission type diffraction grating element. Alternatively, in an embodiment, one of the first deflecting unit and the second deflecting unit may be configured with a reflection type diffraction grating element, and the other may be configured with a transmission type diffraction grating element. Alternatively, the diffraction grating element may be a reflection type blazed diffraction grating element. The display apparatus of the present disclosure may be used as a stereoscopic display device. In this case, if necessary, a polarizing plate or a polarizing film may be detachably attached to the optical device, or a polarizing plate or a polarizing film may be adhered to the optical device.

In Examples, although it is described that the image forming device 111, 211 displays a mono-colored (for example, green) image, the image forming device 111, 211 may display a color image, and in this case, the light source may be configured with light sources emitting, for example, red, green, and blue. Specifically, for example, which light may be obtained by mixing red light, green light, and blue light emitted from a red light emitting element, a green light emitting element, and a blue light emitting element by using light pipes and performing luminance equalizing. In some cases, light passing through the dimming device may be configured to be colored in desired color by the dimming device, and in this case, the color colored by the dimming device may be variable. Specifically, for example, a dimming device colored in red, a dimming device colored in green, and a dimming device colored in blue may be stacked.

Figure 22:
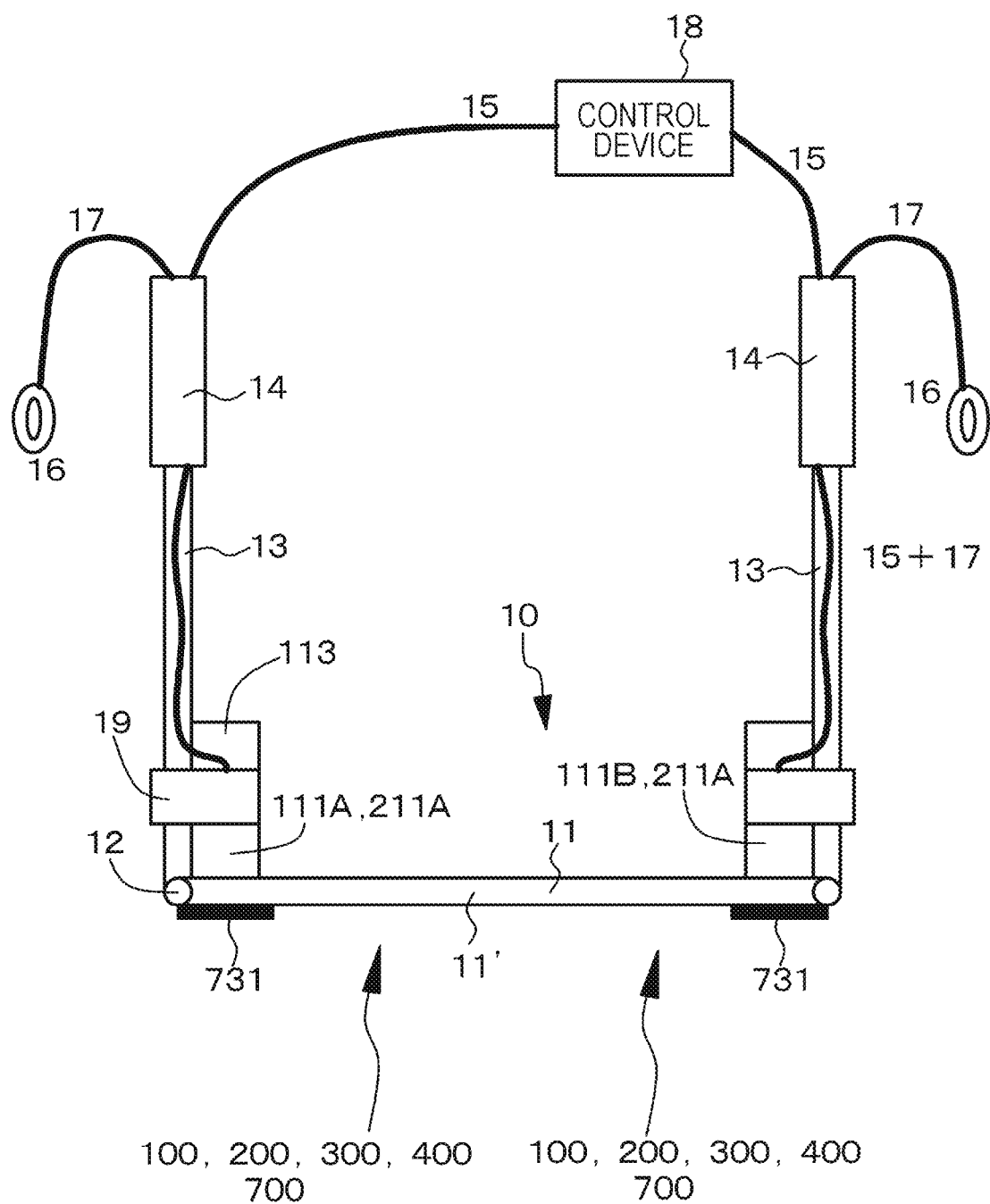
FIG. 22 is a schematic diagram of a modified example of the display apparatus of Example 1 as viewed from the upper side.
Figure 23:
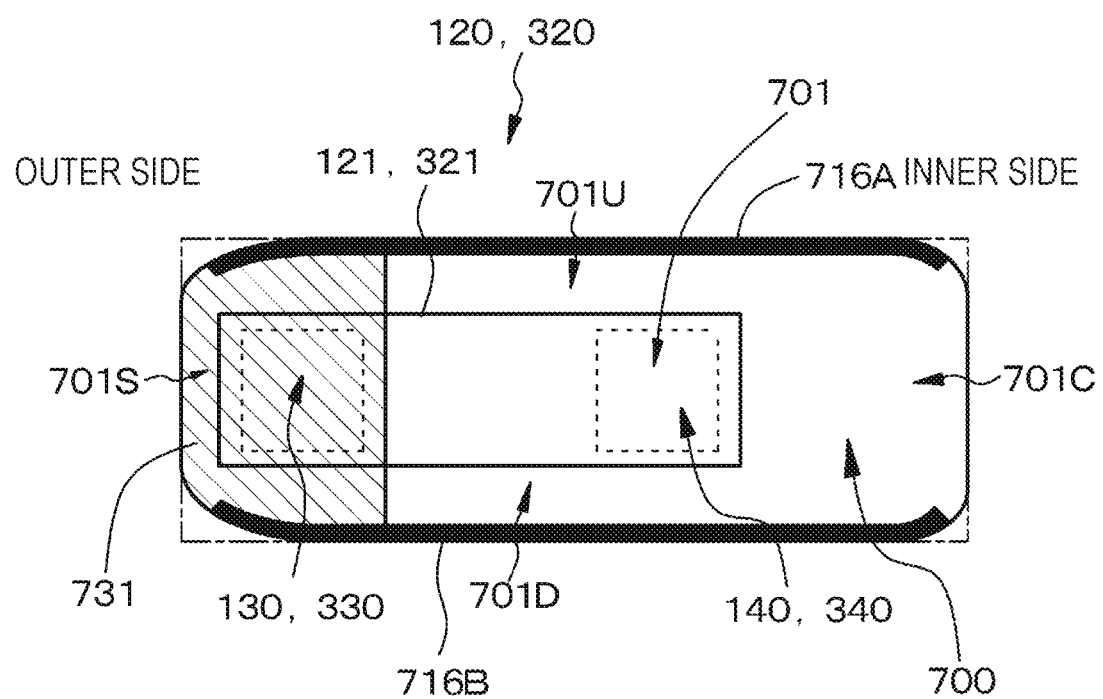
FIG. 23 is a schematic front diagram of an optical device and a dimming device in the modified example of the display apparatus of Example 1 illustrated in FIG. 22.

In addition, the image display device described in Examples 1 to 11 may be modified as described below. Namely, as illustrated in a schematic diagram of FIG. 22 viewed from the upper side and as illustrated in a schematic front diagram of the optical device and the dimming device in FIG. 23, a light blocking member 731 for preventing light use efficiency from being deteriorated due to light leakage to the outside of the light guiding plate 321 is formed on an outer surface of the dimming device 700 facing the first diffraction grating member 330.

Figure 24A:
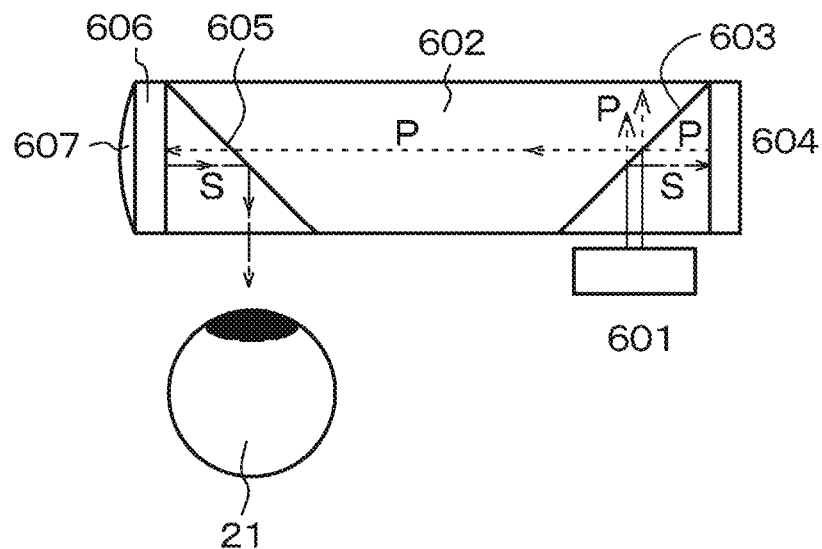
FIGS. 24A and 24B is a schematic diagram of an optical device in the modified example of the display apparatus of Example 7 as viewed from the upper side.
Figure 24B:
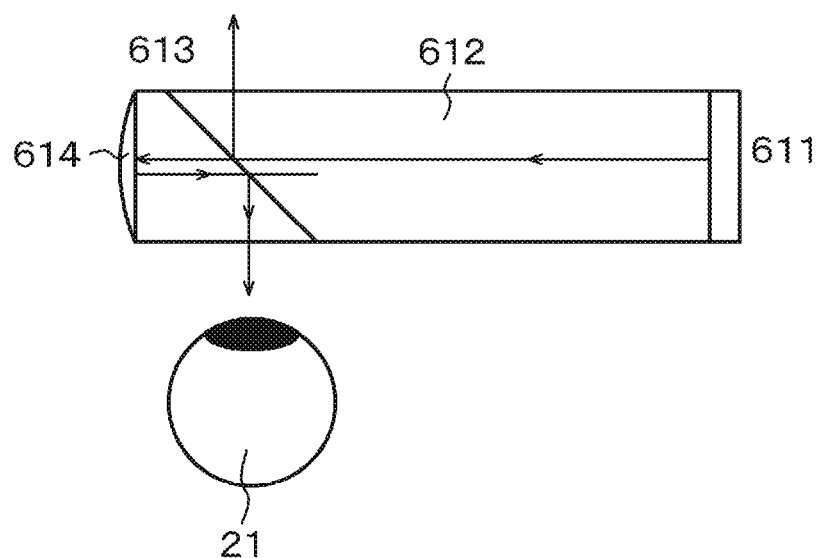

Schematic diagrams of the modified example of the optical device constituting the optical device of the second structure described in Example 7 as viewed from the upper side are illustrated in FIGS. 24A and 24B.

In the example illustrated in FIG. 24A, the light from a light source 601 enters a light guiding member 602 and collides with a polarized beam splitter 603 provided in the light guiding member 602. Among the light beams from the light source 601 which collide with the polarized beam splitter 603, P-polarized light components pass through the polarized beam splitter 603, and S-polarized light components are reflected by the polarized beam splitter 603 to be guided to a liquid crystal display apparatus (LCD) 604 configured with an LCOS as a light valve. An image is formed by the liquid crystal display apparatus (LCD) 604. Since the polarized light components of the light reflected by the liquid crystal display apparatus (LCD) 604 are occupied by the P-polarized light components, the light reflected by the liquid crystal display apparatus (LCD) 604 passes through the polarized beam splitter 603, 605, passes through a ¼ wavelength plate 606, collides with a reflecting plate 607 to be reflected, and passes through a ¼ wavelength plate 606 to be directed to the polarized beam splitter 605. Since the polarized light components of the light at this time are occupied by the S-polarized light components, the light is reflected by the polarized beam splitter 605 to be directed to observer's pupils 21. Heretofore, the image forming device is configured to include the light source 601 and the liquid crystal display apparatus (LCD) 604, the optical device is configured to include the light guiding member 602, the polarized beam splitter 603, 605, the ¼ wavelength plate 606, and the reflecting plate 607, and the polarized beam splitter 605 corresponds to the virtual image forming region of the optical device.

In the example illustrated in FIG. 24B, light from an image forming device 611 propagates through a light guiding member 612 and collides with a transflective mirror 613. A portion of the light passes through the transflective mirror 613, collides with the reflecting plate 614 to be reflected, and collides with the transflective mirror 613 again. A portion of the light is reflected by the transflective mirror 613 to be directed to the observer's pupils 21. Heretofore, the optical device is configured to include the light guiding member 612, the transflective mirror 613 and the reflecting plate 614, and the transflective mirror 613 corresponds to the virtual image forming region of the optical device.

Figure 25A:
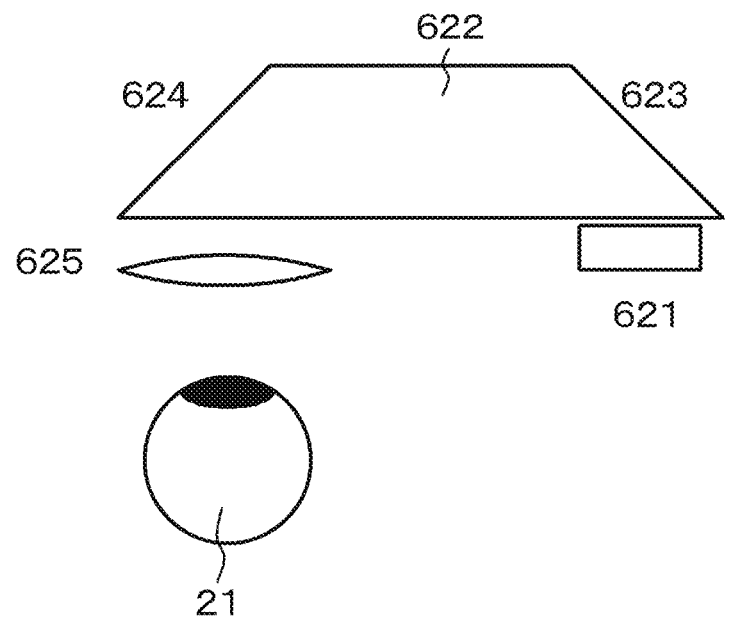
FIGS. 25A and 25B are a schematic diagram of an optical device in another modified example of the display apparatus of Example 7 as viewed from the upper side and a schematic diagram as viewed from the lateral side, respectively.
Figure 25B:
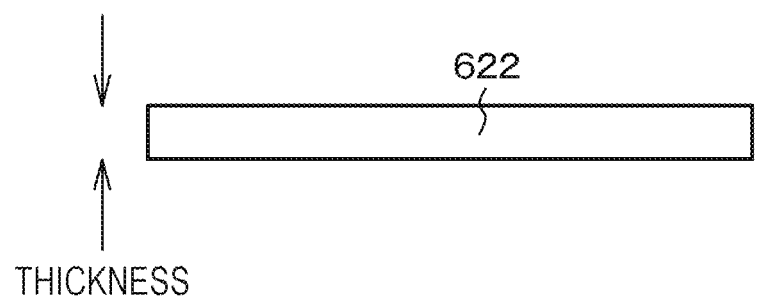
Figure 27:
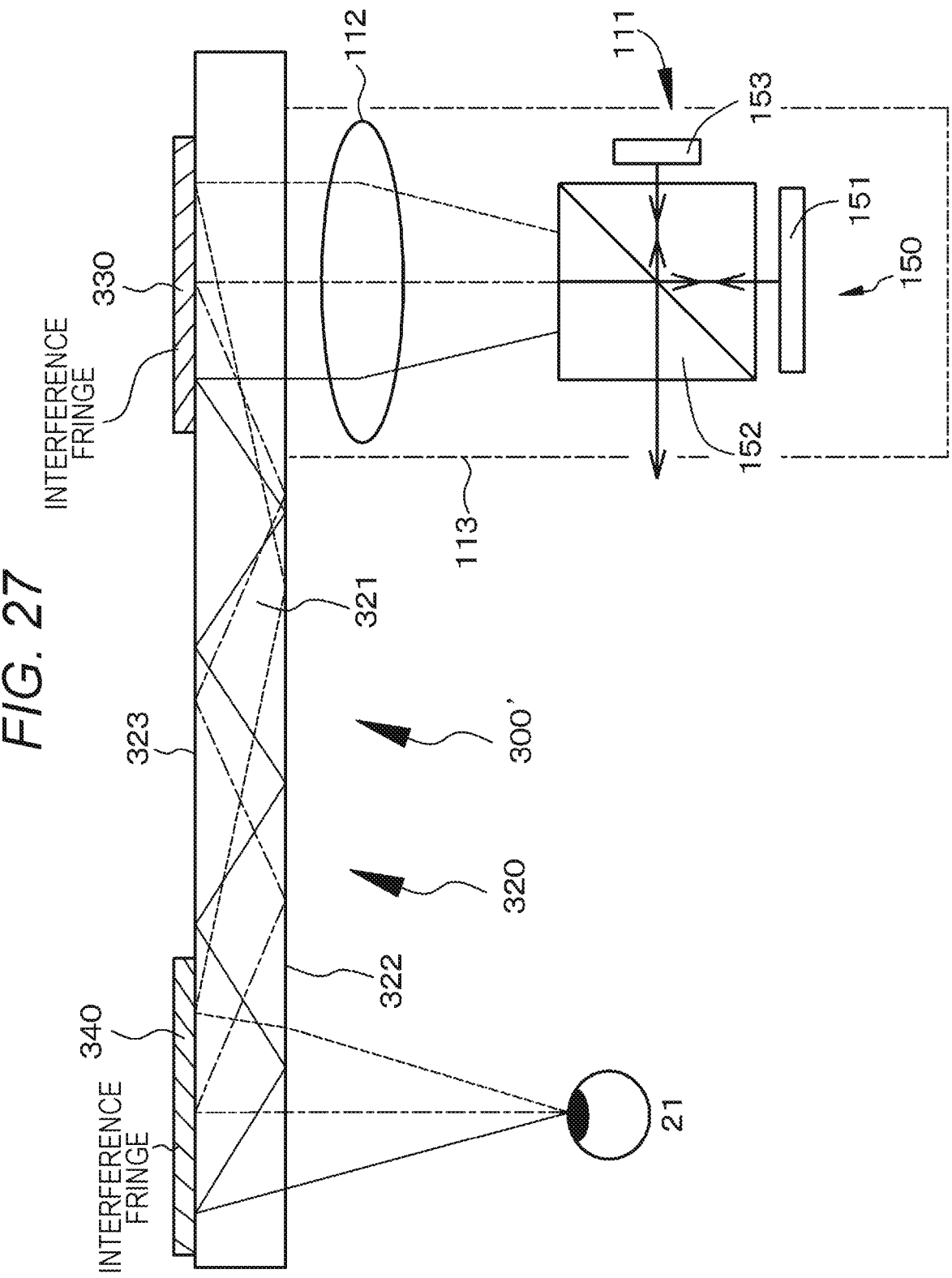
FIG. 27 is a conceptual diagram of an image display device in a modified example of the display apparatus in the related art.

Alternatively, a schematic diagram of an optical device in another modified example of the display apparatus of Example 7 viewed from the upper side and a schematic diagram viewed from the lateral side are illustrated in FIGS. 25A and 25B. The optical device is configured to include a hexahedral prism 622 and a convex lens 625. Light emitted from the image forming device 621 is incident on the prism 622, collides with a prism plane 623 to be reflected, propagates through the prism 622, collides with a prism plane 624 to be reflected, and approaches observer's pupils 21 through a convex lens 625. The prism plane 623 and the prism plane 624 may be slanted in the directions so as to face each other, and a planar shape of the prism 622 is a trapezoid, specifically, an isosceles trapezoid. Mirror coating is performed on the prism plane 623, 624. If the thickness of the portion of the prism 622 facing the pupil 21 is configured to be smaller than 4 mm that is an average diameter of a pupil of a human being, the observer may view an image of an outside world and the virtual image from the prism 622 in an overlapped state.

Figure 8A:
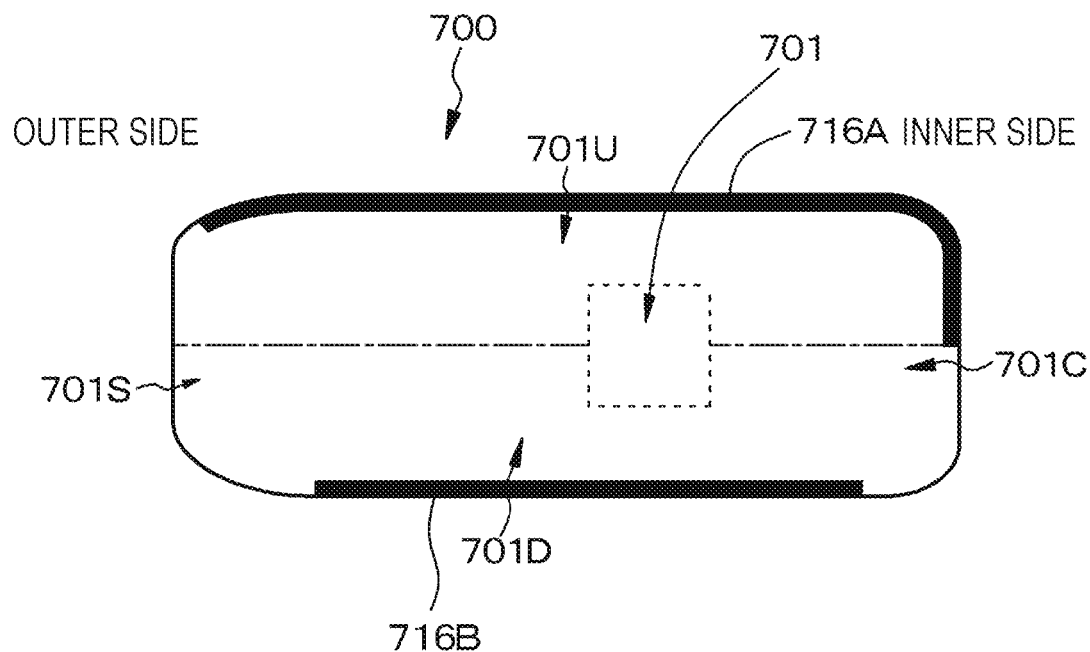
FIGS. 8A and 8B are schematic front diagrams of another modified example of the dimming device in the display apparatus of Example 1.
Figure 8B:
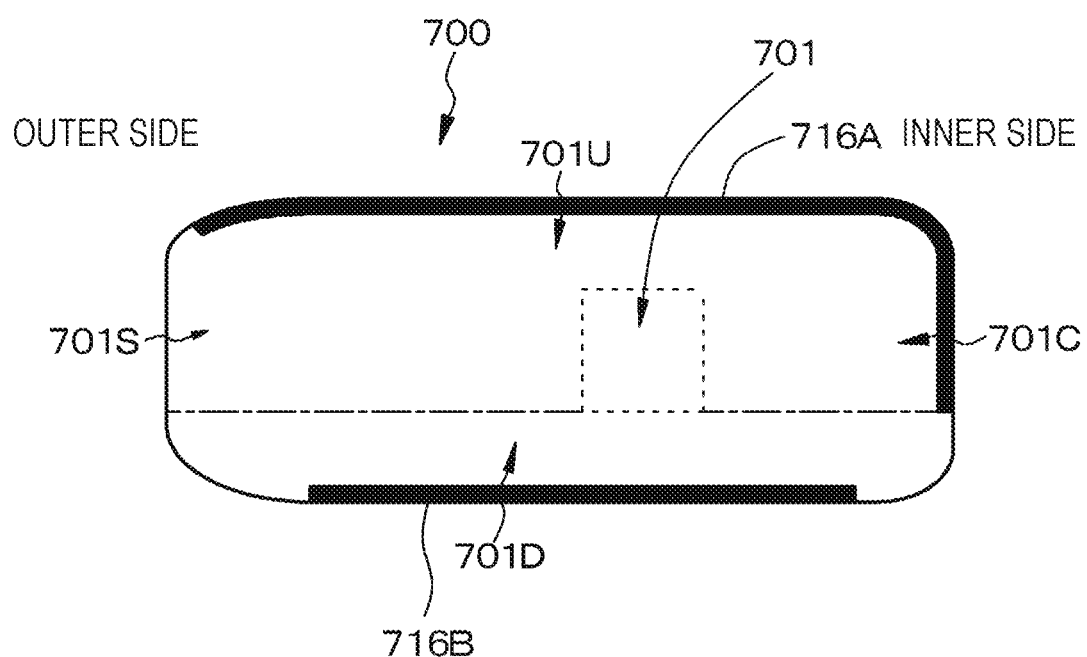
Figure 9:
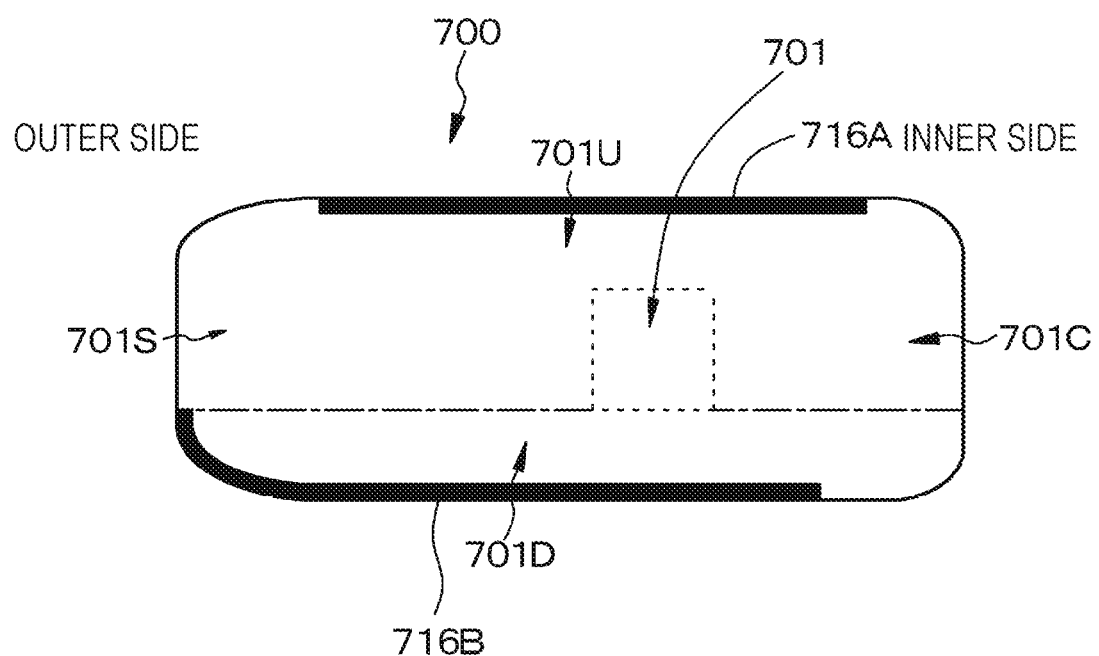
FIG. 9 is a schematic front diagram of still another example of the dimming device in the display apparatus of Example 1.
Figure 12A:
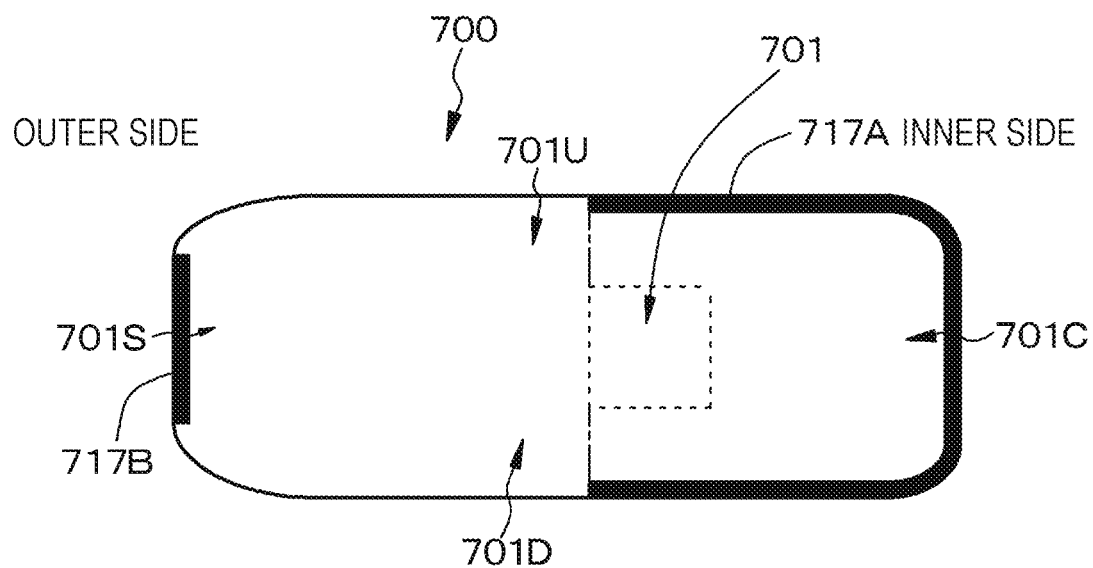
FIGS. 12A and 12B are schematic front diagrams of another modified example of the dimming device in the display apparatus of Example 2.
Figure 12B:
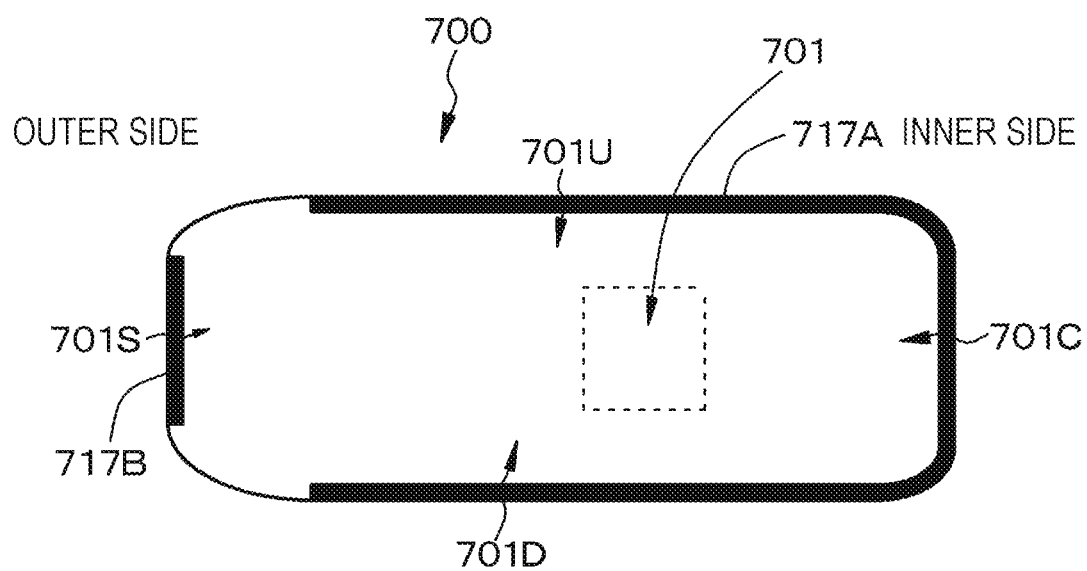

In some cases, an embodiment may be employed where, by dividing the first transparent electrode and/or the second transparent electrode into a plurality of blocks and controlling the light blocking ratio of each block, the light blocking ratio of the portion of the dimming device corresponding to the lower side of the dimming device or the portion of the ear side is controlled. Alternatively, an embodiment may be employed where, by configuring the first transparent electrode or the second transparent electrode as a strip-shaped electrode or a mesh-shaped electrode, or by forming a strip-shaped auxiliary electrode or a mesh-shaped auxiliary electrode on the first transparent electrode or the second transparent electrode, the light blocking ratios of a plurality of regions of the dimming device are independently controlled, so that the light blocking ratio of the portion of the dimming device corresponding to the lower side of the dimming device or the portion of the ear side is controlled. Alternatively, for example, the first electrode 716A of FIG. 8A is provided as it is, and the second electrode 716B is provided so as to overlap with the first electrode 716A. By doing so, an embodiment may be employed where the light blocking ratios of the portion of the upper side of the dimming device and the portion of the nose side are increased, and the light blocking ratios of the portion of the lower side of the dimming device and the portion of the ear side are decreased. Alternatively, for example, the first electrode 717A of FIG. 12B is provided as it is, and the second electrode 717B is provided so as to overlap with the first electrode 717A. By doing so, an embodiment may be employed where the light blocking ratio of the portion of the ear side of the dimming device is lower than the light blocking ratio of the other portion. Furthermore, in some cases, the dimming device may be configured with, for example, a liquid crystal display apparatus driven on the basis of an active matrix method or a simple matrix method, and light transmittance of the portion of the liquid crystal display apparatus corresponding to the portion of the lower side or the ear side of the dimming device may be controlled.

In addition, the present disclosure may have the following configurations.

[A02] <<Display Apparatus: First Aspect>>

A display apparatus including:

(A) a frame mounted on an observer's head;

(B) an image display device attached to the frame; and (C) a dimming device adjusting alight amount of external light being incident from an external portion, wherein the image display device is configured to include:

(a) an image forming device; and (b) an optical device having a virtual image forming region where a virtual image is formed on the basis of light emitted from the image forming device, the optical device overlaps with at least a portion of the dimming device, when an observer's nose side is referred to as an inner side, an observer's ear side is referred to as an outer side, a region of the dimming device facing the virtual image forming region of the optical device is referred to as a virtual image forming region facing region, a region of the dimming device located in an upper side of the virtual image forming region facing region is referred to as an upper region, a region of the dimming device located in a lower side of the virtual image forming region facing region is referred to as a lower region, a region of the dimming device located in an inner side of the virtual image forming region facing region is referred to as an inner region, and a region of the dimming device located in an outer side of the virtual image forming region facing region is referred to as an outer region, at the time of operation of the dimming device, (i) the light blocking ratio of the dimming device is changed over a range of from the upper region to the lower region, the virtual image forming region facing region has a light blocking ratio higher than the light blocking ratio of the lower region, (ii) the light blocking ratio of the dimming device is changed over a range of from the inner region to the outer region, the virtual image forming region facing region has a light blocking ratio higher than the light blocking ratio of the outer region, or (iii) the light blocking ratio of the dimming device is changed over a range of from the upper region to the lower region, and the light blocking ratio of the dimming device is changed over a range of from the inner region to the outer region, the virtual image forming region facing region has a light blocking ratio higher than the light blocking ratios of the lower region and the outer region.

[A02] The display apparatus according to [A01], wherein the dimming device is configured to include:

a first substrate;

a second substrate facing the first substrate;

a first transparent electrode provided on a facing surface of the first substrate facing the second substrate;

a second transparent electrode provided on a facing surface of the second substrate facing the first substrate;

a first electrode formed to be in contact with a portion of the first transparent electrode;

a second electrode formed to be in contact with a portion of the second transparent electrode; and a dimming layer interposed between the first transparent electrode and the second transparent electrode.

[A03] The display apparatus according to [A02], wherein a projection image of the first electrode on the first substrate and a projection image of the second electrode on the first substrate do not overlap with each other.

[A04] The display apparatus according to [A02] or [A03], wherein the dimming layer contains an electrochromic material.

[A05] The display apparatus according to [A04], wherein the dimming layer has a stack structure of a $WO_3$ layer, a $Ta_2O_5$ layer, and an $Ir_xSn_{1-x}O$ layer from the first transparent electrode side.

[A06] The display apparatus according to any one of [A02] to [A05], wherein at the time of operation of the dimming device, the second electrode is applied with a voltage higher than that of the first electrode, the light blocking ratio of the dimming device is changed over a range of from the upper region to the lower region, the virtual image forming region facing region has a light blocking ratio higher than the light blocking ratio of the lower region, the first electrode is arranged in the upper region, and the second electrode is arranged in the lower region.

[A07] The display apparatus according to [A06], wherein the first electrode extends to the inner region.

[A08] The display apparatus according to any one of [A02] to [A05], wherein at the time of operation of the dimming device, the second electrode is applied with a voltage higher than that of the first electrode, the light blocking ratio of the dimming device is changed over a range of from the inner region to the outer region, the virtual image forming region facing region has a light blocking ratio higher than the light blocking ratio of the outer region, the first electrode is arranged in the inner region, and the second electrode is arranged in the outer region.

[A09] The display apparatus according to [A08], wherein the first electrode extends to the upper region.

[A10] The display apparatus according to [A08] or [A09], wherein the first electrode extends to the lower region.

[A11] The display apparatus according to any one of [A02] to [A05], wherein at the time of operation of the dimming device, the second electrode is applied with a voltage higher than that of the first electrode, the light blocking ratio of the dimming device is changed over a range of from the upper region to the lower region, and the light blocking ratio of the dimming device is changed over a range of from the inner region to the outer region, the virtual image forming region facing region has a light blocking ratio higher than the light blocking ratios of the lower region and the outer region, the first electrode is arranged in the upper region, and the second electrode is arranged in the outer region.

[A12] The display apparatus according to [A11], wherein the first electrode extends to the inner region.

[A13] The display apparatus according to [A11] or [A12], wherein the second electrode extends to the lower region.

[A14] The display apparatus according to any one of [A01] to [A13], wherein a frame is configured to include a front portion disposed on an observer's front, two temple portions pivotally attached via hinges to two ends of the front portion, and nose pads, and the dimming device is provided to the front portion.

[A15] The display apparatus according to [A14], wherein the optical device is attached to the dimming device.

[A16] The display apparatus according to [A14] or [A15], wherein the front portion has a rim, and the dimming device is fitted into the rim.

[A17] The display apparatus according to [A16], wherein projection images of the first and second electrodes are included in a projection image of the rim.

[A18] The display apparatus according to any one of [A01] to [A17], wherein the optical device is configured to include:

(b-1) a light guiding plate allowing the light incident from the image forming device to propagate through an inner portion thereof by total reflection and, after that, to emit toward an observer;

(b-2) a first deflecting unit deflecting the light incident on the light guiding plate so that the light incident on the light guiding plate is totally reflected by the inner portion of the light guiding plate; and (b-3) a second deflecting unit deflecting, several times, the light propagating through the inner portion of the light guiding plate by total reflection in order to emit the light propagating through the inner portion of the light guiding plate by total reflection from the light guiding plate, and the virtual image forming region of the optical device is configured by the second deflecting unit.

[B01]<<Display Apparatus: Second Aspect>>

A display apparatus including:

(A) a frame mounted on an observer's head;

(B) an image display device attached to the frame; and (C) a dimming device adjusting a light amount of external light being incident from an external portion, wherein the image display device is configured to include:

(a) an image forming device; and (b) an optical device having a virtual image forming region where a virtual image is formed on the basis of light emitted from the image forming device, the dimming device is configured to include:

a first substrate;

a second substrate facing the first substrate;

a first transparent electrode provided on a facing surface of the first substrate facing the second substrate;

a second transparent electrode provided on a facing surface of the second substrate facing the first substrate;

a first electrode formed to be in contact with a portion of the first transparent electrode;

a second electrode formed to be in contact with a portion of the second transparent electrode; and a dimming layer interposed between the first transparent electrode and the second transparent electrode, the optical device overlaps with at least a portion of the dimming device, and a projection image of the first electrode on the first substrate and a projection image of the second electrode on the first substrate do not overlap with each other.

[B02] The display apparatus according to [B01], wherein a projection image of the virtual image forming region on the first substrate is located between a projection image of the first electrode on the first substrate and a projection image of the second electrode on the first substrate.

[B03] The display apparatus according to [B001] or [B02], wherein the dimming layer contains an electrochromic material.

[B04] The display apparatus according to [B03], wherein the dimming layer has a stack structure of a $WO_3$ layer, a $Ta_2O_5$ layer, and an $Ir_XSn_{1-X}O$ layer from the first transparent electrode side.

[B05] The display apparatus according to any one of [B01] to [B04], wherein at the time of operation of the dimming device, the second electrode is applied with a voltage higher than that of the first electrode, when a region of the dimming device facing the virtual image forming region of the optical device is referred to as a virtual image forming region facing region, a region of the dimming device located in an upper side of the virtual image forming region facing region is referred to as an upper region, and a region of the dimming device located to be lower than the virtual image forming region facing region is referred to as a lower region, the light blocking ratio of the dimming device is changed over a range of from the upper region to the lower region, the virtual image forming region facing region has a light blocking ratio higher than the light blocking ratio of the lower region, the first electrode is arranged in the upper region, and the second electrode is arranged in the lower region.

[B06] The display apparatus according to [B05], wherein when a region of the dimming device located in an inner side of the virtual image forming region facing region is referred to as an inner region, the first electrode extends to the inner region.

[B07] The display apparatus according to any one of [B01] to [B04], wherein at the time of operation of the dimming device, the second electrode is applied with a voltage higher than that of the first electrode, when a region of the dimming device facing the virtual image forming region of the optical device is referred to as a virtual image forming region facing region, a region of the dimming device located in an inner side of the virtual image forming region facing region is referred to as an inner region, and a region of the dimming device located in an outer side of the virtual image forming region facing region is referred to as an outer region, the light blocking ratio of the dimming device is changed over a range of from the inner region to the outer region, the virtual image forming region facing region has a light blocking ratio higher than the light blocking ratio of the outer region, the first electrode is arranged in the inner region, and the second electrode is arranged in the outer region.

[B08] The display apparatus according to [B07], wherein when a region of the dimming device located to be upper than the virtual image forming region facing region is referred to as an upper region, the first electrode extends to the upper region.

[B09] The display apparatus according to [B07] or [B08], wherein when a region of the dimming device located to be lower than the virtual image forming region facing region is referred to as a lower region, the first electrode extends to the lower region.

[B10] The display apparatus according to any one of [B01] to

[B04], wherein at the time of operation of the dimming device, the second electrode is applied with a voltage higher than that of the first electrode, when a region of the dimming device facing the virtual image forming region of the optical device is referred to as a virtual image forming region facing region, a region of the dimming device located in an upper side of the virtual image forming region facing region is referred to as an upper region, a region of the dimming device located in a lower side of the virtual image forming region facing region is referred to as a lower region, a region of the dimming device located in an inner side of the virtual image forming region facing region is referred to as an inner region, and a region of the dimming device located in an outer side of the virtual image forming region facing region is referred to as an outer region, the light blocking ratio of the dimming device is changed over a range of from the upper region to the lower region, the light blocking ratio of the dimming device is changed over a range of from the inner region to the outer region, the virtual image forming region facing region has a light blocking ratio higher than the light blocking ratios of the lower region and the outer region, the first electrode is arranged in the upper region, and the second electrode is arranged in the outer region.

[B11] The display apparatus according to [B10], wherein the first electrode extends to the inner region.

[B12] The display apparatus according to [B10] or [B11], wherein the second electrode extends to the lower region.

[B13] The display apparatus according to any one of [B01] to

[B12], wherein a frame is configured to include a front portion disposed on an observer's front, two temple portions pivotally attached via hinges to two ends of the front portion, and nose pads, and the dimming device is provided to the front portion.

[B14] The display apparatus according to [B13], wherein the optical device is attached to the dimming device.

[B15] The display apparatus according to [B13] or [B14], wherein the front portion has a rim, and the dimming device is fitted into the rim.

[B16] The display apparatus according to [B15], wherein projection images of the first and second electrodes are included in a projection image of the rim.

[B17] The display apparatus according to any one of [B01] to

[B16], wherein the optical device is configured to include:

(b-1) a light guiding plate allowing the light incident from the image forming device to propagate through an inner portion thereof by total reflection and, after that, to emit toward an observer;

(b-2) a first deflecting unit deflecting the light incident on the light guiding plate so that the light incident on the light guiding plate is totally reflected by the inner portion of the light guiding plate; and (b-3) a second deflecting unit deflecting, several times, the light propagating through the inner portion of the light guiding plate by total reflection in order to emit the light propagating through the inner portion of the light guiding plate by total reflection from the light guiding plate, and the virtual image forming region of the optical device is configured by the second deflecting unit.

[C01] The display apparatus according to any one of [A01] to [B17], further including an illuminance sensor (environmental illuminance measurement sensor) measuring illuminance of an environment where the display apparatus is located, wherein the light blocking ratio of the dimming device is controlled on the basis of a measurement result of the illuminance sensor (environmental illuminance measurement sensor).

[C02] The display apparatus according to any one of [A01] to [C01], further including an illuminance sensor (environmental illuminance measurement sensor) measuring illuminance of an environment where the display apparatus is located, wherein luminance of the image formed by the image forming device is controlled on the basis of a measurement result of the illuminance sensor (environmental illuminance measurement sensor).

[C03] The display apparatus according to any one of [A01] to [C02], further including a second illuminance sensor (transmitted light illuminance measurement sensor) measuring illuminance based on light being incident from an external environment and passing through the dimming device, wherein the light blocking ratio of the dimming device is controlled on the basis of a measurement result of the second illuminance sensor (transmitted light illuminance measurement sensor).

[C04] The display apparatus according to any one of [A01] to [C03], further including a second illuminance sensor (transmitted light illuminance measurement sensor) measuring illuminance based on light being incident from an external environment and passing through the dimming device, wherein luminance of the image formed by the image forming device is controlled on the basis of a measurement result of the second illuminance sensor (transmitted light illuminance measurement sensor).

[C05] The display apparatus according to any one of [C03] or [C04], wherein the second illuminance sensor (transmitted light illuminance measurement sensor) is arranged to be closer to the observer than to the optical device.

[C06] The display apparatus according to any one of [A01] to [C05], wherein the light passing through the dimming device is colored in desired color by the dimming device.

[C07] The display apparatus according to [C06], wherein the color to be colored by the dimming device is variable.

[C08] The display apparatus according to [C06], wherein the color to be colored by the dimming device is fixed.

REFERENCE SIGNS LIST

10 Frame
11 Front portion
11' Rim
12 Hinge
13 Temple portion
14 Modern portion
15 Wire line (signal line, power line, and the like)
16 Headphone portion
17 Wire line for headphone portion
18 Control device (control circuit, control unit)
19 Attachment member
21 Pupil
100, 200, 300, 400, 500 Image display device
111, 111A, 111B, 211 Image forming device
112 Optical system (collimating optical system)
113, 213 Casing
120, 320, 520 Optical device
121, 321 Light guiding plate
122, 322 First plane of light guiding plate
123, 323 Second plane of light guiding plate
124, 125 Portion of light guiding plate
130 First deflecting unit
140 Second deflecting unit (virtual image forming region)
330 First deflecting unit (first diffraction grating member)
340 Second deflecting unit (second diffraction grating member, virtual image forming region)
150 Reflection type spatial light modulator
151 Liquid crystal display apparatus (LCD)
152 Polarized beam splitter (PBS)
153 Light source
251, 251A, 251B Light source
252 Collimating optical system
253 Scanning unit
254 Optical system (relay optical system)
256 Total reflection mirror
530A, 530B Transflective mirror
601 Light source
602 Light guiding member
603, 605 Polarized beam splitter
604 Liquid crystal display apparatus
606 ¼ wavelength plate
607 Reflecting plate
611 Image forming device
612 Light guiding member 612
613 Transflective mirror
614 Reflecting plate
621 Image forming device
622 Prism
623, 624 Prism plane
625 Convex lens
700 Dimming device
701 Virtual image forming region facing region
701U Upper region of dimming device
701D Lower region of dimming device
701C Inner region of dimming device
701S Outer region of dimming device
711A First substrate
711B Second substrate
712A First transparent electrode
712B Second transparent electrode
713 $WO_3$ layer
714 $Ta_2O_5$ layer
715 $Ir_xSn_{1-x}O$ layer
716A, 717A, 718A First electrode
716B, 717B, 718B Second electrode
719A Protective layer
719B Sealing member
719C Adhesive 721 Illuminance sensor (environmental illuminance measurement sensor)
722 Second illuminance sensor (transmitted light illuminance measurement sensor)
731 Light blocking member

The invention claimed is:

1. A display apparatus comprising:
a frame;
an image display device attached to the frame;
a dimming device configured to adjust a light amount of external light being incident from an external portion; and
wherein the dimming device is configured to include at least one electrode to cover at least a portion of an outer peripheral portion of the dimming device and wherein the image display device is configured to include:
an image forming device, and
an optical device having a virtual image forming region where a virtual image is formed on the basis of light emitted from the image forming device, the optical device overlaps with at least a portion of the dimming device, when an observer's nose side is referred to as an inner side, an observer's ear side is referred to as an outer side, a region of the dimming device facing the virtual image forming region of the optical device is referred to as a virtual image forming region facing region, a region of the dimming device located in an upper side of the virtual image forming region facing region is referred to as an upper region, a region of the dimming device located in a lower side of the virtual image forming region facing region is referred to as a lower region, a region of the dimming device located in an inner side of the virtual image forming region facing region is referred to as an inner region, and a region of the dimming device located in an outer side of the virtual image forming region facing region is referred to as an outer region, at the time of operation of the dimming device,
(i) the light blocking ratio of the dimming device is changed over a range of from the upper region to the lower region, the virtual image forming region facing region has a light blocking ratio higher than the light blocking ratio of the lower region,
(ii) the light blocking ratio of the dimming device is changed over a range of from the inner region to the outer region, the virtual image forming region facing region has a light blocking ratio higher than the light blocking ratio of the outer region, or
(iii) the light blocking ratio of the dimming device is changed over a range of from the upper region to the lower region, and the light blocking ratio of the dimming device is changed over a range of from the inner region to the outer region, the virtual image forming region facing region has a light blocking ratio higher than the light blocking ratios of the lower region and the outer region.

2. A display apparatus comprising:
a frame;
an image display device attached to the frame;
a dimming device configured to adjust a light amount of external light being incident from an external portion; and
wherein the dimming device is configured to include:
a first electrode to cover at least a portion of an outer peripheral portion of the dimming device;
a first substrate;
a second substrate facing the first substrate;
a first transparent electrode provided on a facing surface of the first substrate facing the second substrate;
a second transparent electrode provided on a facing surface of the second substrate facing the first substrate;
the first electrode formed to be in contact with a portion of the first transparent electrode and a second electrode formed to be in contact with a portion of the second transparent electrode; and
a dimming layer interposed between the first transparent electrode and the second transparent electrode,
wherein a projection image of the first electrode on the first substrate and a projection image of the second electrode on the first substrate do not overlap with each other.

3. The display apparatus according to claim 2, wherein the dimming layer contains an electrochromic material.

4. The display apparatus according to claim 3, wherein the dimming layer has a stack structure of a $WO_3$ layer, a $Ta_2O_5$ layer, and an $Ir_xSn_{1-x}O$ layer from the first transparent electrode side.

5. The display apparatus according to claim 2, wherein at the time of operation of the dimming device, the first electrode is applied with a voltage higher than that of the second electrode, the light blocking ratio of the dimming device is changed over a range of from the upper region to the lower region, the virtual image forming region facing region has a light blocking ratio higher than the light blocking ratio of the lower region, the first electrode is arranged in the upper region, and the second electrode is arranged in the lower region.

6. The display apparatus according to claim 5, wherein the first electrode extends to the inner region.

7. The display apparatus according to claim 2, wherein at the time of operation of the dimming device, the second electrode is applied with a voltage higher than that of the first electrode, the light blocking ratio of the dimming device is changed over a range of from the inner region to the outer region, the virtual image forming region facing region has a light blocking ratio higher than the light blocking ratio of the outer region, the first electrode is arranged in the inner region, and the second electrode is arranged in the outer region.

8. The display apparatus according to claim 7, wherein the first electrode extends to the upper region.

9. The display apparatus according to claim 7, wherein the first electrode extends to the lower region.

10. The display apparatus according to claim 2, wherein at the time of operation of the dimming device, the second electrode is applied with a voltage higher than that of the first electrode, the light blocking ratio of the dimming device is changed over a range of from the upper region to the lower region, and the light blocking ratio of the dimming device is changed over a range of from the inner region to the outer region, the virtual image forming region facing region has a light blocking ratio higher than the light blocking ratios of the lower region and the outer region, the first electrode is arranged in the upper region, and the second electrode is arranged in the outer region.

11. The display apparatus according to claim 10, wherein the first electrode extends to the inner region.

12. The display apparatus according to claim 10, wherein the second electrode extends to the lower region.

* * * * *